United States Patent
Tazawa et al.

(10) Patent No.: US 6,844,693 B2
(45) Date of Patent: Jan. 18, 2005

(54) POSITION CONTROL APPARATUS FOR MOTOR

(75) Inventors: Toru Tazawa, Ibaraki (JP); Tomokuni Iijima, Osaka (JP); Ichiro Oyama, Osaka (JP); Kazushige Narazaki, Katano (JP); Kenichi Suzuki, Daito (JP); Yasuyuki Yokouchi, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/382,430

(22) Filed: Mar. 6, 2003

(65) Prior Publication Data

US 2004/0085035 A1 May 6, 2004

(30) Foreign Application Priority Data

Mar. 29, 2002 (JP) ........................................ 2002-096446

(51) Int. Cl.[7] .............................................. G05B 13/00
(52) U.S. Cl. ........................ 318/561; 318/609; 318/610
(58) Field of Search ................................. 318/560, 565, 318/568.22, 569, 616, 625, 611, 610, 809, 799, 561, 609, 623, 630

(56) References Cited

U.S. PATENT DOCUMENTS

| | | | | | |
|---|---|---|---|---|---|
| 5,256,951 | A | * | 10/1993 | Nashiki et al. | 318/575 |
| 5,304,905 | A | * | 4/1994 | Iwasaki | 318/561 |
| 5,475,291 | A | * | 12/1995 | Yoshida et al. | 318/568.22 |
| 5,532,571 | A | * | 7/1996 | Masaki et al. | 318/809 |
| 5,959,422 | A | * | 9/1999 | Kang | 318/561 |
| 6,252,369 | B1 | * | 6/2001 | Kaku et al. | 318/609 |
| 6,259,221 | B1 | * | 7/2001 | Yutkowitz | 318/561 |
| 6,281,650 | B1 | * | 8/2001 | Yutkowitz | 318/561 |
| 6,470,225 | B1 | * | 10/2002 | Yutkowitz | 700/44 |

FOREIGN PATENT DOCUMENTS

| JP | 03122701 | * | 5/1991 |
|---|---|---|---|
| JP | 5-207768 | * | 8/1993 |
| JP | 10-56790 A | | 2/1998 |
| JP | 2890529 B2 | | 2/1999 |
| JP | 2890529 | * | 2/1999 |
| JP | 2003-2004689 | * | 7/2003 |

* cited by examiner

*Primary Examiner*—Paul Ip
(74) *Attorney, Agent, or Firm*—Akin Gump Strauss Hauer & Feld, L.L.P.

(57) ABSTRACT

An electric motor position control apparatus in accordance with the present invention has a plurality of sets of control parameters including at least the proportional gain of a position control section and the proportional gain of a speed control section beforehand, wherein set selection and the measurement of the response state of an electric motor to a position command at the time when the electric motor is controlled by using the control parameters of the selected set are carried out sequentially, one preferable set is selected depending on the measured response state, the control parameters of the selected set are set, and the control parameters are changed as a set.

31 Claims, 33 Drawing Sheets

FIG. 5

| CONTROL PARAMETER / SET NO. | Kpp1 | Kpp2 | Kvp | Tvi1 | Tvi2 |
|---|---|---|---|---|---|
| 1 | Kpp11 | Kpp21 | Kvp1 | Tvi11 | Tvi21 |
| 2 | Kpp12 | Kpp22 | Kvp2 | Tvi12 | Tvi22 |
| 3 | Kpp13 | Kpp23 | Kvp3 | Tvi13 | Tvi23 |
| ...... | ...... | ...... | ...... | ...... | ...... |
| N | Kpp1N | Kpp2N | KvpN | Tvi1N | Tvi2N |

FIG. 6

| MAGNIFICATION NO. | MAGNIFICATION SETTING VALUE |
|---|---|
| 1 | K1 |
| 2 | K2 |
| 3 | K3 |
| ... | ... |
| M | KM |

FIG 9

| SET NO. | CONTINUOUS OSCILLATION FLAG | SHORT-TIME OSCILLATION FLAG | COIN-CRACK FLAG |
|---|---|---|---|
| 1 | ○ | ○ | × |
| 2 | ○ | ○ | ○ |
| 3 | ○ | ○ | ○ |
| 4 | × | × | × |

○ : FLAG IS NOT SET.
× : FLAG IS SET.

| MAGNIFICATION NO. | CONTINUOUS OSCILLATION FLAG | SHORT-TIME OSCILLATION FLAG | COIN-CRACK FLAG | SETTLING TIME |
|---|---|---|---|---|
| 1 | ◯ | ◯ | ◯ | Tc1 |
| 2 | ◯ | ◯ | ◯ | Tc2 |
| 3 | ◯ | ◯ | ◯ | Tc3 |
| 4 | ◯ | ◯ | × | Tc4 |

◯ : FLAG IS NOT SET.
× : FLAG IS SET.

| APPARATUS CONFIGURATION | START SET NO. |
|---|---|
| DIRECT CONNECTION OF BALL SCREW | 5 |
| BALL SCREW + TIMING BELT | 4 |
| TIMING BELT | 3 |
| RACK AND PINION | 2 |
| OTHER | 1 |

POSITION CONTROL APPARATUS FOR MOTOR

BACKGROUND OF THE INVENTION

The present invention relates to a position control apparatus for controlling the rotation position of an electric motor and more particularly to an electric motor position control apparatus for adjusting control parameters.

As a prior art regarding electric motor position control, an art (a first prior art) described in Japanese Patent Specification No. 2890529 is known. This first prior art will be described below.

FIG. 30 is a block diagram showing the configuration of a control system in an electrical motor position control apparatus in accordance with the first prior art. The control system in the electric motor position control apparatus shown in FIG. 30 is provided with not only a position feedback loop for the rotation position of an electric motor 501 but also a speed feedback loop for controlling the rotation speed of the electric motor 501 and a current feedback loop for controlling the current of the electric motor 501. In the current feedback loop, control is carry out so that an error between a value obtained by digital-to-analog converting the output value of a speed control section 507 and a motor current supplied to the electric motor 501 become zero. In the speed feedback loop, control is carry out so that the output value of a position control section 505 becomes equal to a motor speed calculated by a speed calculation section 506. Then, in the end, in the position feedback loop, control is carry out so that the error between a position detected by a position detector 502, such as a pulse encoder or a linear scale, and a position command value issued from a command issuing section 503 becomes zero.

The output from the position detector 502 is input to a position counter 504 and converted into the rotation position of the electric motor 501. The speed calculation section 506 calculates rotation speed from the output of the position detector 502. As shown in FIG. 30, the error between the rotation position and the position command value issued from the command issuing section 503 is input to the position control section 505, and the position control section 505 outputs a speed command value. The error between this speed command value and the rotation speed from the speed calculation section 506 is input to the speed control section 507, and the speed control section 507 outputs a command value for driving the electric motor 501. This command value is input to a power amplifier 509 via a D/A converter 508. The power amplifier 509 drives the electric motor 501 in accordance with the input from the D/A converter 508.

In FIG. 30, numeral 510 designates a parameter change judgment section having a function of changing the control parameters of the position control section 505 and the speed control section 507. In addition, thick line arrows in FIG. 30 indicate digital amount signals, thin line arrows indicate analog amount signals, and broken line arrows indicates indication signals.

The operation of the parameter change judgment section 510 shown in FIG. 30 will be described below.

First, the speed control section 507 carries out proportional control (P-control). A block diagram showing the entire control system at the time when the speed control section 507 carries out P-control is shown in FIG. 31. FIG. 31 is a block diagram in the case when the response frequency of the current feedback loop can have been set high to the extent that it can be made constant and when the speed feedback loop can be approximated by a linear expression. Furthermore, it is assumed that the gain of a controlled object in consideration of the gain of the current feedback loop, which is made constant, a motor torque constant, the total inertia of the electric motor and a load, the resolution of the position detector 502, etc. is 1/J.

The transfer function $G_2(S)$ of the entire control system shown in FIG. 31 is represented by the following equation (1)

$$G_2(S)=1/\{1+(b_1/b_2)S+(1/b_2)S^2\} \quad (1)$$

wherein $b_1 = \text{Kvp} \cdot K_{FB}/J$, $b_2 = \text{Kpp} \cdot \text{Kvp}/J$, Kvp is the proportional gain of the speed control section 507, Kpp is the proportional gain of the position control section 505, and $K_{FB}$ is the feedback gain of the speed feedback loop.

When the proportional gain Kvp of the speed control section 507 is fixed to a value capable of making the characteristic frequency of a processing apparatus serving as the controlled object negligible, and when the proportional gain Kpp of the position control section 505 is set so as to be higher than the proportional gain Kvp, the servo system gradually becomes vibratory. When it is assumed that the vibration frequency is fi, the vibration frequency fi has a relationship represented by the following equation (2) with respect to the proportional gain Kpp and the proportional gain Kvp.

$$fi=(½π) \cdot (Kpp \cdot Kvp/J)^{1/2} [Hz] \quad (2)$$

At this time, the vibration frequency fi is measured while the electric motor 501 is driven by a position command issued from the command issuing section 503. Then, on the basis of the equation (2), the gain of 1/J of the controlled object including the constants, such as the inertia of the electric motor 501 and the load, is obtained.

Then, the operation of the speed control section 507 is switched to integral-plus-proportional control (IP-control). When it is assumed that the proportional gain and the integral gain of the speed control section 507 is Kvp and $K_{VI}$, respectively, and that the integral gain $K_{VI}$ of the speed control section 507 is nonzero (a value other than zero), a block diagram at this time is shown in FIG. 32. The transfer function $G_1(S)$ of the entire control system at this time is represented by the following equation (3).

$$G_1(S)=1/\{1+(a_2/a_3)S+(a_1/a_3)S^2+(1-/a_3)S^3\} \quad (3)$$

wherein $a_1 = \text{Kvp} \cdot K_{FB}/J$, $a_2 = K_{VI} \cdot K_{FB}/J$, and $a_3 \text{Kpp} \cdot K_{VI}/J$.

In the control system in accordance with the first prior art configured as described above, while the relationship among the three gains, that is, the proportional gain Kvp and the integral gain $K_{VI}$ of the speed control section 507 and the proportional gain Kpp of the position control section 505, are maintained constant, the above-mentioned three gains are raised gradually until a resonance state occurs between the response frequency component of the electric motor 501 and the characteristic frequency of the processing apparatus serving as the controlled object. After the resonance state has occurred, the above-mentioned three gains are lowered gradually in reverse and the gains at the time when the resonance stops are set as optimum gains.

In addition, as another prior art relating to electric motor position control, an art (a second prior art) disclosed in the publication of Japanese Laid-open Patent Application No. Hei 10-56790 is available. An electric motor position control apparatus in accordance with the second prior art will be described below by using the drawings.

FIG. 33 is a block diagram showing the system configuration of the electric motor position control apparatus in accordance with the second prior art.

In FIG. 33, an electric motor 601 is driven by motor torque, and a load machine 602 is driven by the motor 601. The rotation position and the rotation speed of the electric motor 601 are detected by a rotation detector 603. A torque control circuit 604 matches the motor torque with a torque command signal. A position command signal generation circuit 605 generates a position command signal serving as a position command for the electric motor 601 and the load machine 602 and outputs the position command signal to a feedforward circuit 608. The feedforward circuit 608 receives the position command signal and outputs a feedforward signal, a response target position signal and a response target speed signal.

As shown in FIG. 33, the position control apparatus in accordance with the second prior art is provided with a speed compensation circuit 606, a position compensation circuit 607, a switch 609, a torque command signal generation circuit 610 for drive tests and an automatic adjustment circuit 611.

Next, the operation of the position control apparatus in accordance with the second prior art configured as described above will be described.

First, the switch 609 is switched to its contact (b), whereby the torque command signal generation circuit 610 for drive tests outputs a torque command signal, such as a pseudo-random signal, to the torque control circuit 604. The torque command signal generation circuit 610 for drive tests outputs the torque command signal to the torque control circuit 604 and carries out a drive test on the electric motor 601. The torque command signal and the rotation speed of the electric motor 601 obtained at this time are input to the automatic adjustment circuit 611.

The automatic adjustment circuit 611 calculates the parameters of its built-in high-order transfer function model by using the method of least squares, for example, thereby identifying a transfer function in the range from the torque command signal of the controlled object to the rotation speed of the electric motor in detail. The absolute value of the smallest complex zero point of the identified transfer function is selected as an estimated antiresonance frequency $\omega z e$. In addition, a total inertia Je is estimated from the gain characteristic in the low frequency range. Either a two-inertia system optimum gain Kopt calculated by using this estimated antiresonance frequency $\omega z e$ and the estimated total inertia Je or a limit gain Kmax obtained by using the frequency characteristic, gain margin and phase margin of the transfer function, whichever smaller, is determined as the speed gain Kv of the speed compensation circuit 606. The position gain Kp and the position integral gain KpI of the position compensation circuit 607 are determined on the basis of the determined speed gain Kv by using predetermined calculation equations. In addition, the gain parameters of the feedforward circuit 608 are calculated and determined by using the estimated antiresonance frequency $\omega z e$ and the estimated total inertia Je.

As described above, in the first prior art disclosed in Japanese Patent No. 2890529, while the relationship among a plurality of gains was maintained constant, the resonance state occurring between the electric motor and the controlled object was detected, and optimum control parameters were determined. In the case when the controlled object has a resonance frequency, the values of the control parameters are made larger by inserting a filter for suppressing the component of the resonance frequency, whereby responsivity can be raised; however, this kind of adjustment method was insufficient for the adjustment of the control parameters.

Furthermore, in the second prior art disclosed in the publication of Japanese Laid-open Patent Application No. Hei 10-56790, in order to set the control parameters so as to be stable for the controlled object having a resonance characteristic, it is necessary to measure the estimated value of the antiresonance frequency of the controlled object and the frequency resonance value of the controlled object. In order to obtain these values, operations, such as measurements conducted by supplying test signals, were necessary.

SUMMARY OF THE INVENTION

In order to solve the above-mentioned various problems in the prior arts, the present invention is intended to provide an electric motor position control apparatus capable of attaining control parameter adjustment having high responsivity in a short time without measuring the frequency characteristic of a controlled object beforehand even when the controlled object has a resonance frequency.

In order to attain the above-mentioned object, an electric motor position control apparatus in accordance with the present invention has a plurality of sets of control parameters including at least the proportional gain of a position control section and the proportional gain of a speed control section beforehand, wherein set selection and the measurement of the response state of an electric motor to a position command at the time when the electric motor is controlled by using the control parameters of the selected set are carried out sequentially, one of desirable sets is selected depending on the measured response state, and the control parameters of the selected set are set in the apparatus. In the electric motor position control apparatus in accordance with the present invention configured as described above, control parameters are changed as a set, whereby the number of adjustment times can be reduced and the control parameters can be adjusted in a short time.

In addition, an electric motor position control apparatus in accordance with another aspect of the present invention has a plurality of sets of control parameters including at least the proportional gain of a position control section and the proportional gain of a speed control section beforehand, wherein set selection and the measurement of the response state of an electric motor to a position command at the time when the electric motor is controlled by using the control parameters of the selected set are carried out sequentially starting from a set of control parameters including a low proportional gain of the speed control section, the measurement of the response state is stopped at the time when vibration continuation is detected, one of the sets is selected on the basis of the result of the response obtained up to that time, and the control parameters of the selected set are set. In the electric motor position control apparatus in accordance with the present invention configured as described above, the measurement of the response state is stopped at the time when vibration continuation is detected, whereby the number of adjustment times can be reduced and the control parameters can be adjusted in a short time.

Furthermore, an electric motor position control apparatus in accordance with another aspect of the present invention has a plurality of sets of control parameters including at least the proportional gain of a position control section and the proportional gain of a speed control section beforehand, wherein set selection and the measurement of the response state of an electric motor to a position command at the time when the electric motor is controlled by using the control parameters of the selected set are carried out sequentially; in the case when vibration continuation is detected, a set including a plurality of proportional gains of the speed control selection, which are lower than those of the present set, is selected next; in the case when continuous oscillation is not detected, a set including a plurality of proportional gains of the speed control selection, which are higher than those of the present set, is selected next. At the time when no set is available as a set to be selected next after set selection is repeated as described above, one preferable set is selected on the basis of the result of the response obtained up to that time, and the control parameters of the selected set are set. In the electric motor position control apparatus in accordance with the present invention configured as described above, the number of adjustment times can be reduced, whereby the control parameters can be adjusted in a short time.

Still further, an electric motor position control apparatus in accordance with another aspect of the present invention has a plurality of sets of control parameters including at least the proportional gain of a position control section and the proportional gain of a speed control section beforehand, wherein a set is selected and the response state of an electric motor to a position command at the time when the electric motor is controlled by using the control parameters of the selected set is measured, and one desirable control parameter set is selected depending on this response state. Moreover, the apparatus is configured so that, in the case when setting the selected control parameter set, a start set can be designated externally. In the electric motor position control apparatus in accordance with the present invention configured as described above, any given start set can be designated, whereby the number of adjustment times can be reduced and the control parameters can be adjusted in a short time.

Still further, an electric motor position control apparatus in accordance with another aspect of the present invention has a plurality of sets of control parameters including at least the proportional gain of a position control section and the proportional gain of a speed control section beforehand, wherein a set is selected and the response state of an electric motor to a position command at the time when the electric motor is controlled by using the control parameters of the selected set is measured, and one desirable control parameter set is selected depending on this response state. Moreover, the apparatus is configured so that, in the case when the control parameters of the selected set are set, the response state is measured from a start set related to a load configuration pattern input externally. In the electric motor position control apparatus in accordance with the present invention configured as described above, the start set best suited for the load configuration pattern input has been determined, whereby the number of adjustment times can be reduced and the control parameters can be adjusted in a short time.

Still further, an electric motor position control apparatus in accordance with another aspect of the present invention is configured so that, when it is detected that the period in which the amplitude of a vibration component having a predetermined frequency or more and included in the detection position or detection speed of an electric motor or the amplitude of a vibration component having a predetermined frequency or more and included in a torque command input to an electric motor drive section has a first predetermined value or more is a first predetermined time or more, the control parameters of a set, having the proportional gain of the speed control section lower than the proportional gain of the speed control section of the present set, are set immediately. In the electric motor position control apparatus in accordance with the present invention configured as described above, even in the case when vibration occurs during the control parameter adjustment, the vibration can be dampened securely in a short time, and the control parameter adjustment can be adjusted safely.

Still further, an electric motor position control apparatus in accordance with another aspect of the present invention has a plurality of sets of control parameters including at least the proportional gain of a position control section and the proportional gain of a speed control section beforehand on the basis of at least one of a position command value, a speed command value, a detection position and a detection speed. Furthermore, in this position control apparatus, a set is selected and the response state of an electric motor to a position command at the time when the electric motor is controlled by using the control parameters of the selected set is measured, one desirable set is selected depending on this response state, and the control parameters of the selected set are set. In the electric motor position control apparatus in accordance with the present invention configured as described above, the control parameters are adjusted on the basis of at least one of the position command value, the speed command value, the detection position and the detection speed, whereby the control parameters can be adjusted so that control having excellent responsivity for the position command can be attained.

Still further, an electric motor position control apparatus in accordance with another aspect of the present invention has a plurality of sets of control parameters including at least the proportional gain of a position control section and the proportional gain of a speed control section beforehand, wherein a set is selected and the response state of an electric motor to a position command at the time when the electric motor is controlled by using the control parameters of the selected set is measured, and one desirable control parameter set is selected depending on this response state. Moreover, the apparatus is configured so that, after the control parameters of the selected set are set, the electric motor is controlled a predetermined number of times thereby to make a reconfirmation as to whether vibration occurs or not, whereby stable control parameters can be set securely.

Still further, an electric motor position control apparatus in accordance with another aspect of the present invention has a plurality of sets of control parameters including at least the proportional gain of a position control section and the proportional gain of a speed control section beforehand, wherein a set is selected and the response state of an electric motor to a position command at the time when the electric motor is controlled by using the control parameters of the selected set is measured, and one desirable control parameter set is selected depending on this response state. Moreover, the control parameters of the selected set are set; next, at least one of the control parameters having been set at present is fixed, and the remaining control parameters are changed, whereby the parameters to be changed are adjusted depending on the response state of the electric motor to the position command at the time when the electric motor is controlled. In the electric motor position control apparatus in accordance with the present invention configured as described above, the apparatus is configured so that, after the control parameters are adjusted as a set, the control parameters are adjusted individually, whereby adjustment having high responsivity can be attained.

Still further, an electric motor position control apparatus in accordance with another aspect of the present invention is configured to stop the adjustment of control parameters at the time when a target index input externally is satisfied in the adjustment process of the control parameters and sets the control parameters obtained at that time as the result of the adjustment. In the electric motor position control apparatus in accordance with the present invention configured as described above, the control parameters can be adjusted in a short time.

Still further, an electric motor position control apparatus in accordance with another aspect of the present invention is provided with a notch filter disposed in a position control system or a speed control system and having a variable notch frequency and a notch frequency correction section for sequentially correcting the notch frequency of the notch filter so as to reduce frequency components having a predetermined frequency or more and included in the detection position or detection speed. In the electric motor position control apparatus in accordance with the present invention configured as described above, a notch filter for suppressing oscillation owing to the resonance frequency of a controlled object is generated automatically, whereby control parameter adjustment having high responsivity can be attained without measuring the frequency response of the controlled object.

Still further, an electric motor position control apparatus in accordance with another aspect of the present invention is provided with a notch frequency storage section wherein, at the time when a control parameter set is changed, the set immediately before the change and the notch frequency immediately before the change are stored so as to be related to each other, and at the time when a control parameter set output from a control parameter adjustment section is changed to a set selected in the past, the notch frequency stored so as to be related to the set obtained after the change is reset to the frequency of the notch filter. In the electric motor position control apparatus in accordance with the present invention configured as described above, even in the case when the notch frequency of the notch filter is changed owing to vibration or the like during control parameter adjustment, it can be returned securely to the notch frequency obtained at the time when control is carried out by using the set selected in the past.

Still further, an electric motor position control apparatus in accordance with another aspect of the present invention is provided with a notch frequency storage section. At the time when a control parameter set is changed, this notch frequency storage section stores the set immediately before the change and the notch frequency immediately before the change so as to be related to each other; at the time when a control parameter set output from a control parameter adjustment section is changed to a set selected in the past, the storage section resets the notch frequency stored so as to be related to the set obtained after the change to the notch frequency of the notch filter and prohibits the change of the notch frequency of the notch filter in a subsequent predetermined time. In the electric motor position control apparatus in accordance with the present invention configured as described above, after the notch frequency of the notch filter is returned to the notch frequency obtained at the time when control is carried out by using the set selected in the past, the notch frequency can be prevented from being changed by vibration in the middle of vibration dampening, whereby the notch frequency can be returned securely.

Still further, an electric motor position control apparatus in accordance with another aspect of the present invention is configured so as to limit the detection period of the detection of a frequency component having a predetermined frequency or more and included in the detection position or the detection speed depending on a command. In the electric motor position control apparatus in accordance with the present invention configured as described above, incorrect detection of the frequency component having a predetermined frequency or more and included in the detection position or detection speed is prevented, whereby control parameter adjustment having high responsivity can be attained.

Still further, an electric motor position control apparatus in accordance with another aspect of the present invention is configured to temporarily stop inertia estimation operation when it is detected that the amplitude of a vibration component having a predetermined frequency or more and included in the detection position or the detection speed has a predetermined value or more. In the electric motor position control apparatus in accordance with the present invention configured as described above, the inertia estimation operation can be stabilized, and control parameter adjustment having stability can be attained.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF DRAWINGS

FIG. 5 is a table showing an example of a list of sets of control parameters in accordance with Embodiment 1 of the present invention;

FIG. 6 is a table showing an example of a list of magnification setting values in accordance with Embodiment 1 of the present invention;

FIG. 9 is a table showing an example of set numbers and the results of evaluation conditions in accordance with Embodiment 1 of the present invention;

FIG. 10 is a table showing an example of magnification setting values and the results of evaluation conditions in accordance with Embodiment 1 of the present invention;

FIG. 19 is a table showing an example of a list of apparatus configurations related to start set numbers;

It will be recognized that some or all of the drawings are schematic representations for purposes of illustration and do not necessarily depict the actual relative sizes or locations of the elements shown.

DETAILED DESCRIPTION OF THE INVENTION

Preferred embodiments of an electric motor position control apparatus in accordance with the present invention will be described below referring to the accompanying drawings.

<<Embodiment 1>>

Figure 1:
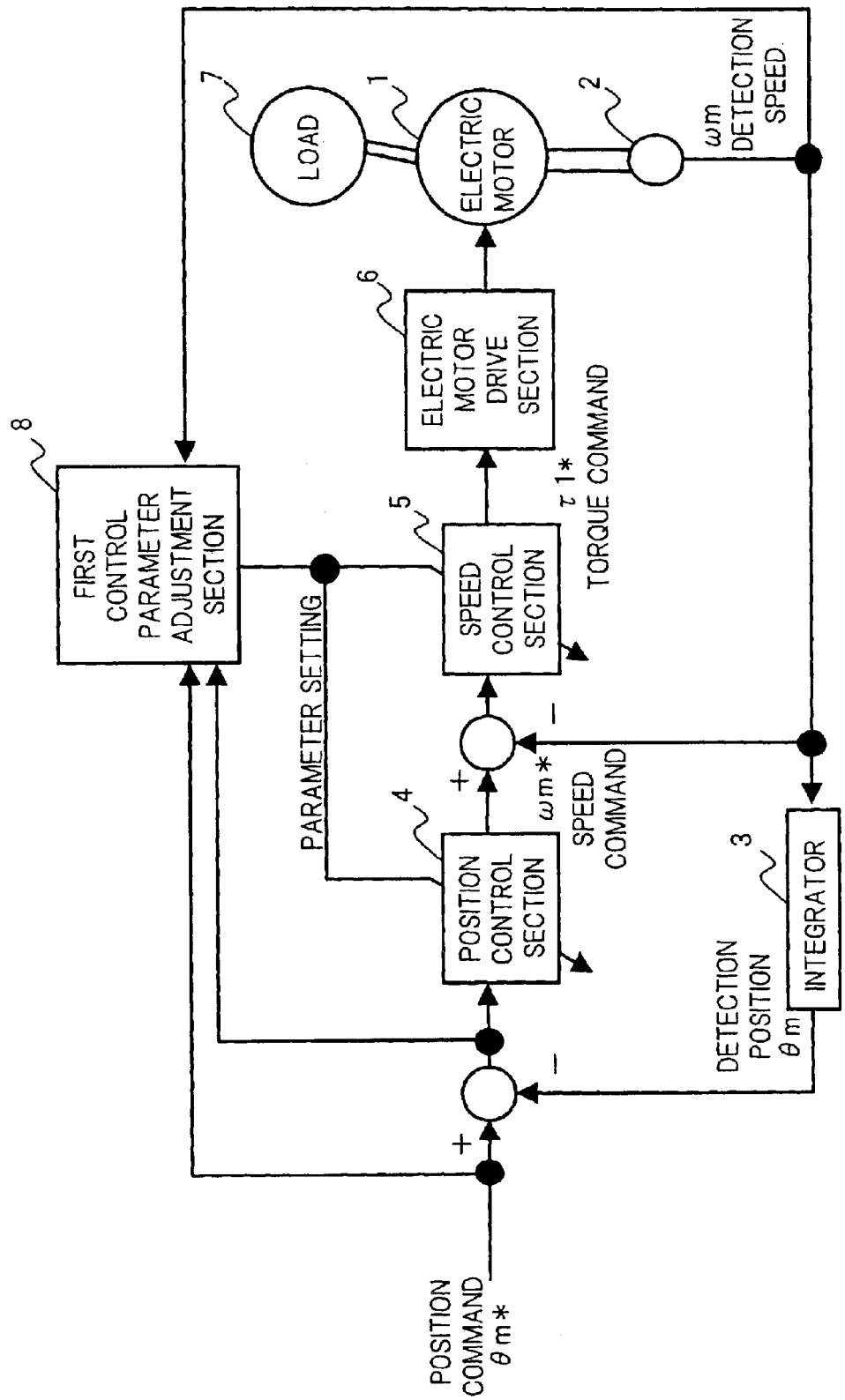
FIG. 1 is a block diagram showing the configuration of an electric motor position control apparatus in accordance with Embodiment 1 of the present invention.

FIG. 1 is a block diagram showing the configuration of the control system of an electric motor position control apparatus in accordance with Embodiment 1 of the present invention. In FIG. 1, the detection speed $\omega m$ of an electric motor 1 is output from a speed detection section 2. The detection speed $\omega m$ is input to an integrator 3, and a detection position $\theta m$ is calculated. The error between a position command $\theta m^*$ and the detection position $\theta m$ is calculated by a subtraction section and input to a position control section 4. The position control section 4 outputs a speed command $\omega m^*$ for carrying out control so that the error between the position command $\theta m^*$ and the detection position $\theta m$ becomes zero. As a specific operation of the position control section 4, the result of the proportional control of the error $(\theta m^* - \omega m)$ is output as the speed command $\omega m^*$ as represented by the following equation (4), for example.

$$\omega m^* = Kpp(\theta m^* - \theta m) \quad (4)$$

In the expression (4), Kpp is the proportional gain of the position control section 4.

The error between the speed command $\omega m^*$ and the detection speed $\omega m$ is calculated by a subtraction section and input to a speed control section 5. To an electric motor drive section 6, the speed control section 5 outputs a torque command $\tau 1^*$ for carrying out control so that the error between the speed command $\omega m^*$ and the detection speed $\omega m$ becomes zero. As a specific operation of the speed control section 5, the result of the proportional-plus-integral of the error $(\omega m^* - \omega m)$ is output as the torque command $\tau 1^*$ as represented by the following equation (5), for example.

$$\tau 1^* = Kvp\{(\omega m^* - \omega m) + (1/Tvi)\int(\omega m^* - \omega m)\} \quad (5)$$

In the equation (5), Kvp is the proportional gain of the speed control section 5, and Tvi is the integral time constant of the speed control section 5.

The electric motor drive section 6 drives the electric motor 1 connected to a load 7 in accordance with the torque command τ1* from the speed control section 5.

The detection speed ωm, the position command θm* and the position error (θm*−θm) between the position command θm* and the detection position θm are input to a first control parameter adjustment section 8, and the first control parameter adjustment section 8 sets the control parameters of the position control section 4 and the speed control section 5.

The configuration and operation of the first control parameter adjustment section 8 will be described below in detail referring to FIG. 2 to FIG. 10.

Figure 2:
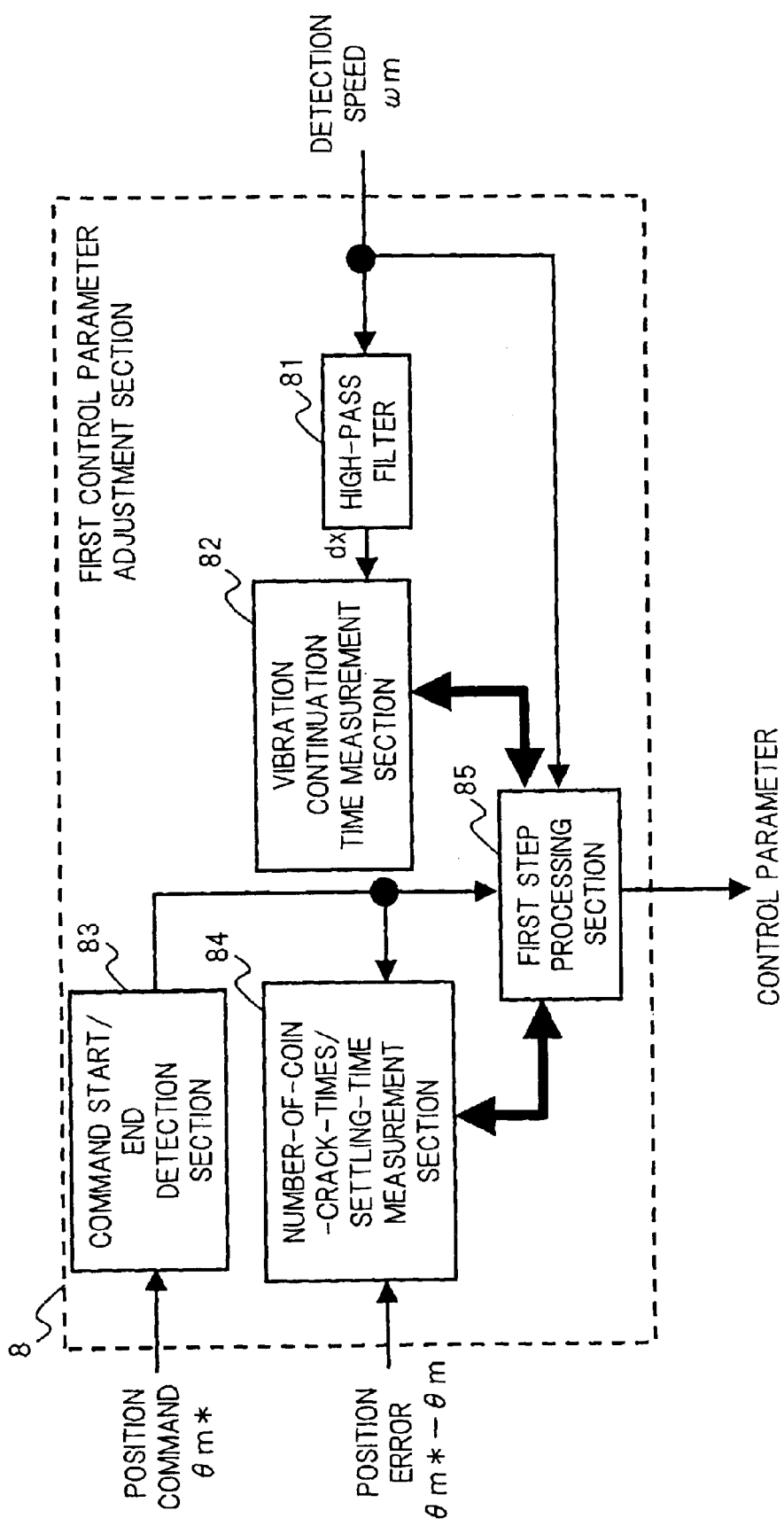
FIG. 2 is a block diagram showing an example of the configuration of a first parameter adjustment section in accordance with Embodiment 1 of the present invention.

FIG. 2 is a block diagram showing the configuration of the first control parameter adjustment section 8.

As shown in FIG. 2, the first control parameter adjustment section 8 comprises a high-pass filter 81, a vibration continuation time measurement section 82, a command start/end detection section 83, a number-of-COIN-crack-times/settling-time measurement section 84 and a first step processing section 85.

First, the operations of the high-pass filter 81, the vibration continuation time measurement section 82, the command start/end detection section 83 and the number-of-COIN-crack-times/settling-time measurement section 84 will be described.

Figure 3:
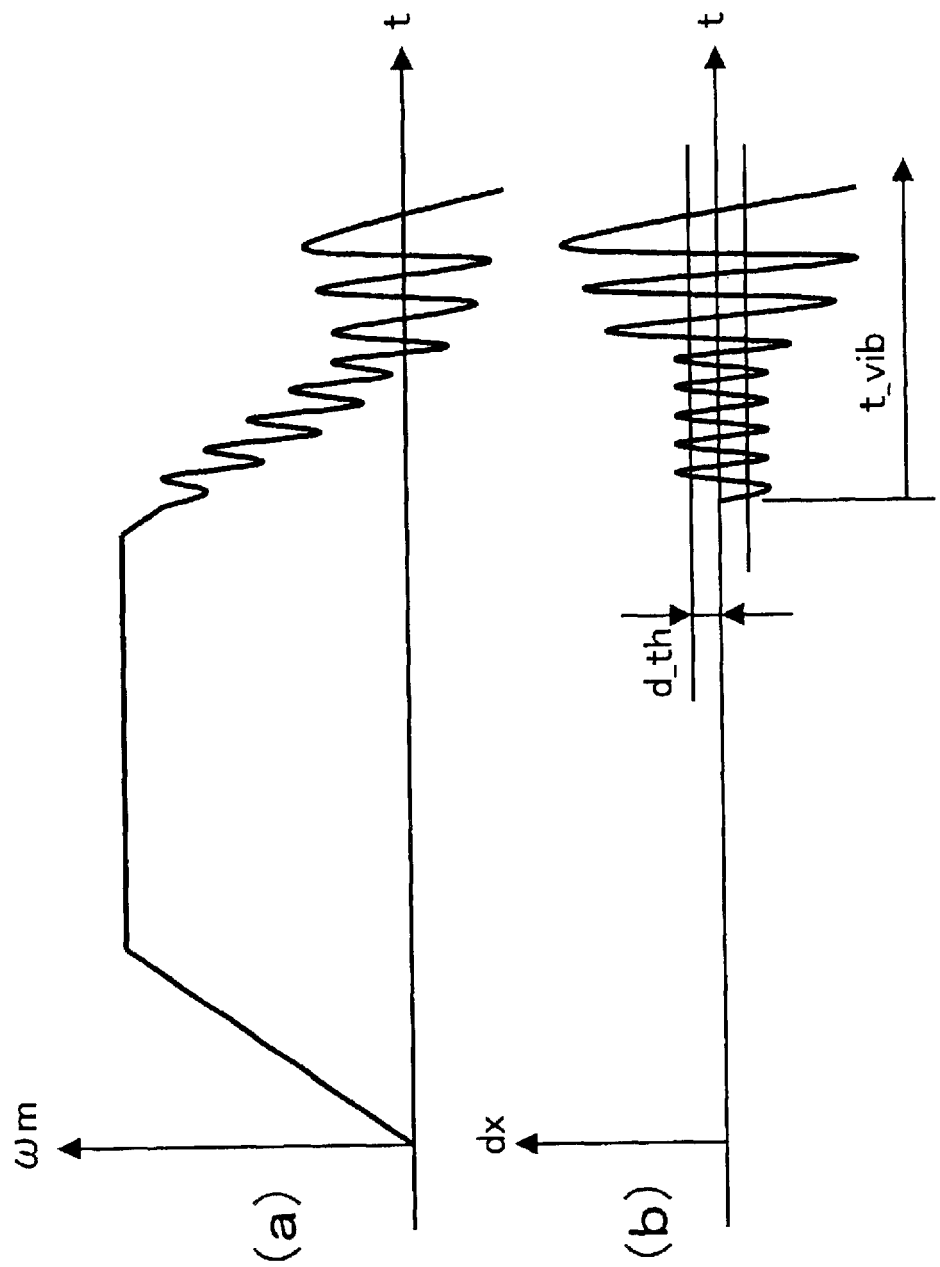
FIG. 3 is operation waveforms diagrams illustrating the operation of a vibration continuation time measurement section in accordance with Embodiment 1 of the present invention.

FIG. 3 is a waveform diagram showing an example of an operation waveform for describing the operations of the high-pass filter 81 and the vibration continuation time measurement section 82.

The high-pass filter 81 receives the detection speed ωm and outputs a vibration component dx having a predetermined frequency or more and included in the detection speed ωm. The portion (a) of FIG. 3 is a waveform diagram showing the time-related change of the detection speed ωm input to the high-pass filter 81, and the portion (b) of FIG. 3 is a waveform diagram showing the time-related change of the vibration component dx output from the high-pass filter 81.

As shown in the portion (b) of FIG. 3, the vibration continuation time measurement section 82 measures a continuation time (hereafter referred to as a vibration continuation time t_vib) during which the amplitude of the vibration component dx has a predetermined value d_th or more. For example, the amplitude value of a vibration component included in a speed detection value at the time when sound generates while the electric motor 1 undergoes position control is obtained beforehand and the obtained amplitude value is set as the predetermined value d_th of the amplitude of the vibration component dx. Then, if the vibration continuation time t_vib measured is not less than a first predetermined time T_vib1, a continuous oscillation flag is set. In addition, if the vibration continuation time t_vib is not less than a second predetermined time T_vib2 that is shorter than the first predetermined time T_vib1, a short-time oscillation flag is set. As the value of the second predetermined time T_vib2, a time being allowable as an oscillation time in operation is desirable. Furthermore, as the first predetermined time T_vib1, a time during which it is determined that oscillation has occurred completely is desirable.

The command start/end detection section 83 detects position command start and position command end from the position command θm* having been input. The detection of the position command start of the position command θm* is made possible, for example, by calculating the time-related change of the position command θm* and by detecting the change of the calculated value from zero to nonzero (a value other than zero). In addition, the detection of the position command end of the position command θm* is made possible, for example, by calculating the time-related change of the position command θm* and by detecting the change of the calculated value from nonzero to zero.

Figure 4:
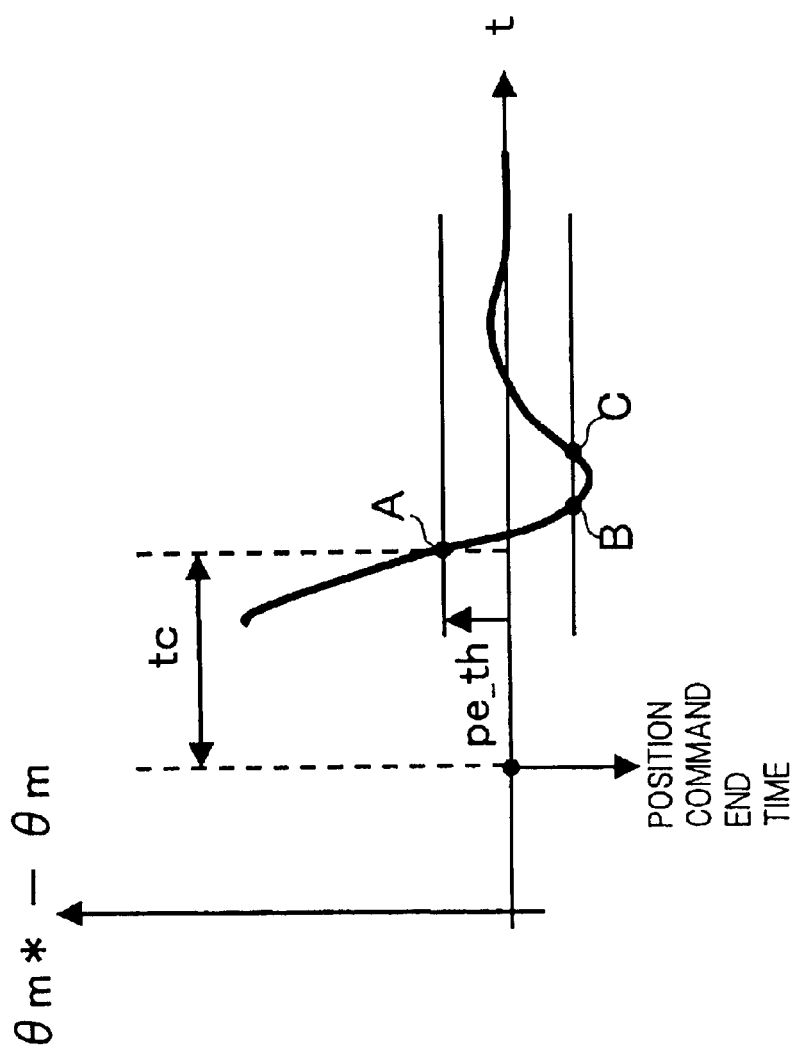
FIG. 4 is an operation waveform diagram illustrating the operation of a number-of-COIN-crack-times/settling-time measurement section in accordance with Embodiment 1 of the present invention.

FIG. 4 is a waveform diagram showing an example of an operation for explaining the operation of the number-of-COIN-crack-times/settling-time measurement section 84. FIG. 4 is a waveform diagram showing the time-related change of the position error (θm*−θm). As shown in FIG. 4, the number-of-COIN-crack-times/settling-time measurement section 84 measures the number of times the position error (θm*−θm) crosses a preset positioning tolerance pe_th (the number of times is hereafter referred to as the number of COIN-crossing times n_cross) in a period from the position command end to the position command start on the basis of the position error (θm*−θm) having been input and a detection signal from the command start/end detection section 83. The crossing herein means the change of the position error (θm*−θm) from a value larger than the preset positioning tolerance pe_th to a value smaller than that or the change thereof in the opposite direction, as shown at points A, B and C of FIG. 4. If the number of COIN-crossing times n_cross exceeds a predetermined number of times Nc1, a COIN-crack flag is set. It is desired that the predetermined number of times Nc1 is two. Furthermore, the time (hereafter, referred to as a settling time tc) from the time of the position command end to the time when the position error (θm*−θm) becomes the preset positioning tolerance pe_th or less first is measured.

Next, the first step processing section 85 of the first control parameter adjustment means 8 will be described.

The first step processing section 85 has a plurality of control parameter sets beforehand to which set numbers (set No.) shown in FIG. 5 are assigned, for example. In FIG. 5, Kpp1 and Tvi1 are control parameters that are set when the detection speed ωm is smaller than a predetermined value ωm_th; Kpp1 is the proportional gain of the position control section 4, and Tvi1 is the integral time constant of the speed control section 5. Kpp2 and Tvi2 are control parameters that are set when the detection speed ωm has the predetermined value ωm_th or more; Kpp2 is the proportional gain of the position control section 4, and Tvi2 is the integral time constant of the speed control section 5. Kvp is the proportional gain of the speed control section 5. In FIG. 5, the set numbers are assigned, beginning with a set having a lower value of the proportional gain Kvp of the speed control section 5. In other words, in FIG. 5, a relationship of Kvp1<Kvp2< . . . <KvpN is established.

The first step processing section 85 has such a magnification setting table as shown in FIG. 6, for example. This table is used at step 5a and the subsequent steps of the flowchart shown in FIG. 8 and described later. In FIG. 6, magnification numbers are assigned in increasing order of magnification setting values K1, K2, K3, . . . , KM. In other words, in FIG. 6, a relationship of K1<K2< . . . <KM is established.

The adjustment processing operation of the first step processing section 85 will be described below by using the flowcharts shown in FIGS. 7 and 8. It is indicated that "A" at the bottom of FIG. 7 continues to "A" at the top of FIG. 8.

At step 1a, a set having a set number=1 is selected, and the control parameters of the selected set number=1 are set in the position control section 4 and the speed control section 5.

Figure 7:
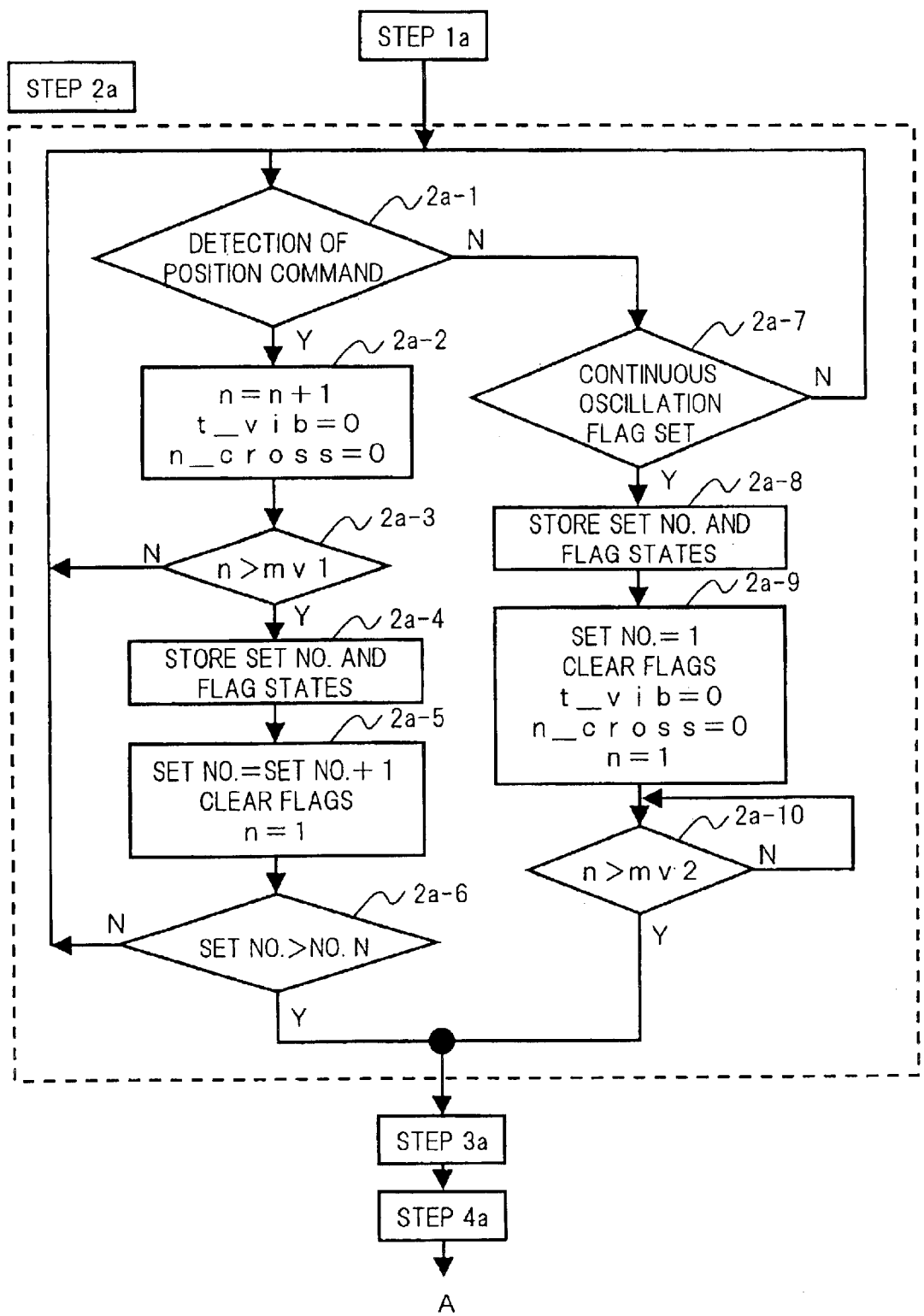
FIG. 7 is a first flowchart showing the operation of the first control parameter adjustment section in accordance with Embodiment 1 of the present invention.

At step 2a subsequent to step 1a, two processing flows are available depending on the detection result of the position command start as shown in FIG. 7.

A first processing flow is a process that is carried out when the position command start is detected. This corresponds to the flowchart shown on the left side at step 2a of FIG. 7. The detection of the position command start at step 2a-1 is carried out by the command start/end detection section 83 as described above. When the position command start is detected, the number of operation times n is incremented by 1. Simultaneously, the vibration continuation time t_vib of the vibration continuation time measurement section 82 and the number of COIN-crossing times n_cross of the number-of-COIN-crack-times/settling-time measurement section 84 are reset to zero (at step 2a-2).

Next, at step 2a-3, a judgment is made as to whether the number of operation times n is larger than a predetermined number of times mv1 or not. This predetermined number of times mv1 has been set beforehand. If the number is larger, the present set number and the respective flag states of the continuation oscillation flag, the short-time oscillation flag and the COIN-crack flag are stored so as to be related at step 2a-4. Next, at step 2a-5, a set having a set number value incremented by 1 is selected, and the control parameters of the selected set are set. The continuation oscillation flag, the short-time oscillation flag and the COIN-crack flag are cleared, and the number of operation times n is initialized (n=1). When the set number is incremented by 1 at step 2a-5 and if it becomes larger than the maximum set number (N) included in the first step processing section 85, this state is detected at step 2a-6, and the procedure advances to step 3a.

A second processing flow at step 2a, corresponding to the flowchart shown on the right side at step 2a of FIG. 7, is a process that is carried out when the position command start is not detected but when it is detected that the continuous oscillation flag is set. As described above, the continuous oscillation flag is set when the vibration continuation time t_vib measured is not less than the first predetermined time T_vib1. The state of the continuous oscillation flag is input from the above-mentioned vibration continuation time measurement section 82. When it is detected that the continuous oscillation flag is set (at step 2a-7), the present set number and the respective flag states of the continuous oscillation flag, the short-time oscillation flag and the COIN-crack flag are stored so as to be related (at step 2a-8). Next, at step 2a-9, set number 1 is selected, and the control parameters of the selected set are set. In addition, the continuous oscillation flag, the short-time oscillation flag and the COIN-crack flag are cleared, the number of operation times n is initialized (n=1), and the vibration continuation time t_vib of the vibration continuation time measurement section 82 and the number of COIN-crossing times n_cross of the number-of-COIN-crack-times/settling-time measurement section 84 are reset to zero. Then, set number 1 is selected, and the control parameters of the selected set are set. The setting of the control parameters of the selected set is done immediately after vibration continuation is detected; this is a process for quickly suppressing vibration. The proportional gain Kvp of the speed control section 5 of set number 1 is low, thereby being most suited for this process. Then, the operations of the vibration continuation time measurement section 82 and the number-of-COIN-crack-times/settling-time measurement section 84 are stopped temporarily until the procedure advances to step 3a that is described later. This is because it is not necessary to set the continuous oscillation flag, the short-time oscillation flag and the COIN-crack flag in an oscillation dampening process. Then, at step 2a-10, the number of operation times n for the detection of the position command start is counted. In the case when it is judged that the number of operation times n has become larger than a predetermined number of times mv2, the procedure advances to step 3a.

FIG. 9 is a table showing an ex&le of set numbers and the results of evaluation conditions in accordance with Embodiment 1. In FIG. 9, ○ indicates that the flag is not set, and × indicates that the flag is set. At step 3a, in accordance with such results stored at step 2a as shown in FIG. 9, among the sets in which the continuous oscillation flag, the short-time oscillation flag and the COIN-crack flag are all not set, a set having the highest proportional gain of the speed control section 5 is judged as the set to be selected. In the case of the example shown in FIG. 9, the set having set number 3 is judged as the set to be selected, and the procedure advances to step 4a.

At step 4a, the control parameters of the selected set are set, operation is carried out a predetermined number of times mv3, and carries out a check for stable operation. In the case when it is detected that the short-time oscillation flag is set until the number of operation times reaches the predetermined number of times mv3, on the basis of the results of such evaluation conditions stored at step 2a as shown in FIG. 9, among the sets in which the continuous oscillation flag, the short-time oscillation flag and the COIN-crack flag are all not set, excluding the set selected at present, a set having the highest proportional gain of the speed control section 5 is judged as the set to be selected newly. In the case when the set selected at step 3a lacks stable operation performance, reselection of an optimum set is made possible by the processing at this step 4a.

Next, at step 5a, control parameters having higher responsivity are set. Among the control parameters having been set at present, the control parameters other than the proportional gain Kpp1 of the position control section 4 at the time when the detection speed ωm is smaller than the predetermined value ωm_th are fixed. Then, adjustment is carried out on the basis of the response state of the electric motor 1 by changing only the proportional gain Kpp1. The change of the proportional gain Kpp1 is carried out by selecting a magnification setting value from such a magnification setting table as shown in FIG. 6 and by setting the product Kpp1s of the proportional gain Kpp1 of the position control section 4 of the set selected at the end time of step 4a and the selected magnification setting value as the proportional gain Kpp1 of the position control section 4 at the time when the detection speed ωm is smaller than the predetermined value ωm_th.

First, magnification number=1 is selected, and the proportional gain Kpp1s of the position control section 4 at the time when the detection speed ωm is smaller than the predetermined value ωm_th is set so as to be Kpp1s=Kpp1×K1.

Figure 8:
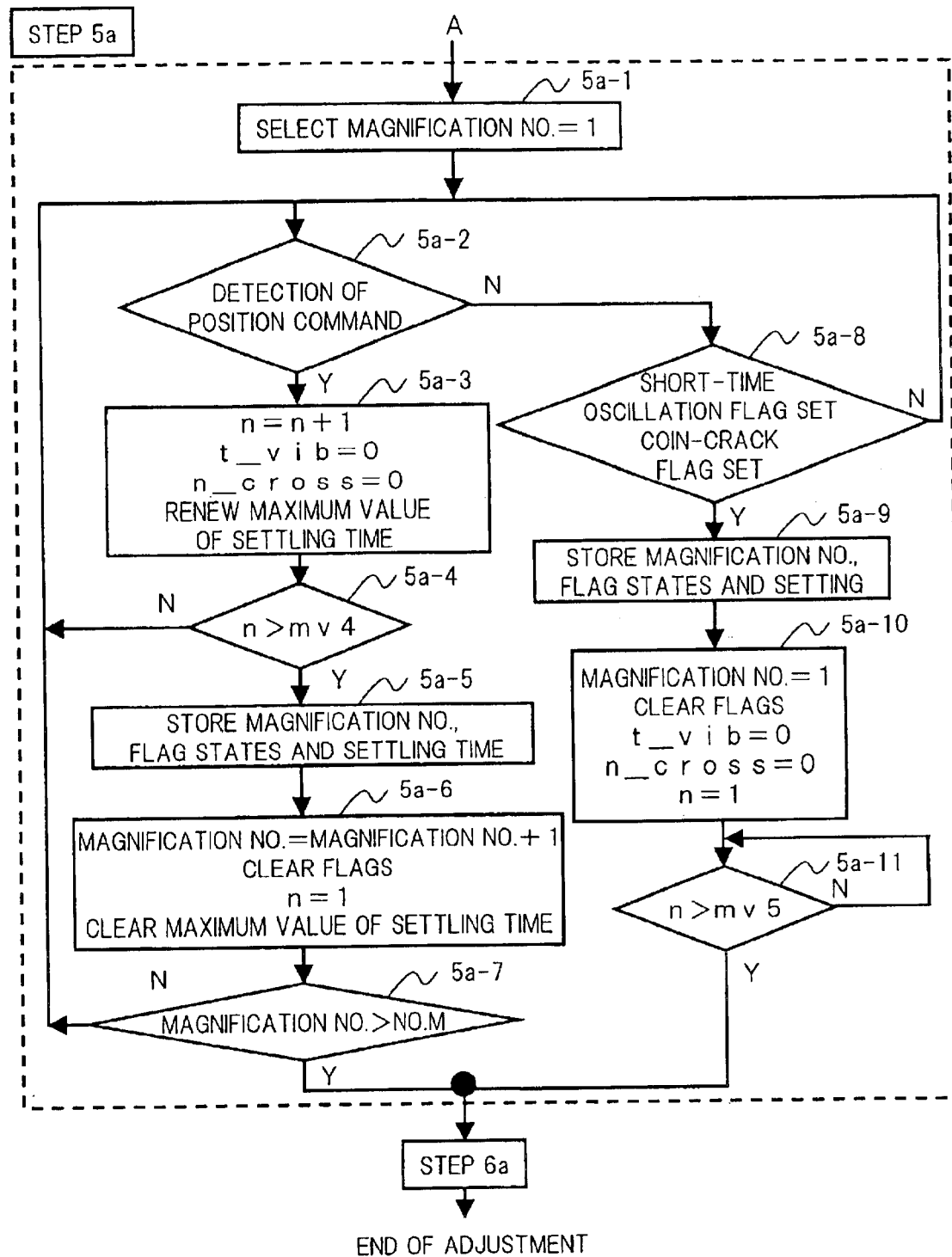
FIG. 8 is a second flowchart showing the operation of the first control parameter adjustment section in accordance with Embodiment 1 of the present invention.

At step 5a subsequent to step 4a, two processing flows are available depending on the result of the detection of the position command start as shown in FIG. 8 after the selection of magnification number=1.

A first processing flow is a process to be carried out when the position command start is detected. This corresponds to the flowchart shown on the left side at step 5a of FIG. 8. The detection of the position command start at step 5a -2 is carried out by the command start/end detection section 83. When the start of the position command is detected, the number of operation times n is incremented by 1. Simultaneously, the vibration continuation time t_vib of the vibration continuation time measurement section 82 and the number-of-COIN-crossing times n_cross of the number-of-COIN-crack-times/settling-time measurement section 84 are reset to zero. In the case when the settling time tc measured at that time is longer than the settling time tc measured in the past in the condition that the same magnification number was selected, the settling time tc measured at that time is renewed as the maximum value of the settling time corresponding to the same magnification number (at step 5a-3).

Next, at step 5a-4, a judgment is made as to whether the number of operation times n is larger than a predetermined number of times mv4 or not. This predetermined number of times mv4 has been set beforehand. When the number of operation times n is not larger than the predetermined number of times mv4, the procedure returns to step 5a-2. When the number of operation times n is larger than the predetermined number of times mv4, the present magnification number, the respective flag states of the continuous oscillation flag, the short-time oscillation flag and the COIN-crack flag, and the maximum value of the settling time are stored so as to be related (at step 5a-5). Next, at step 5a-6, the magnification setting value obtained by incrementing the magnification number by 1 is selected at step 5a-6, and Kpp1 is calculated by using the selected magnification setting value and set. In addition, the continuous oscillation flag, the short-time oscillation flag and the COIN-crack flag are cleared, the number of operation times n is initialized (n=1), and the maximum value of the settling time is cleared. When the value of the magnification number is incremented by 1 and when it is judged that the magnification number is larger than the maximum magnification number included in the first step processing section 85 at step 5a-7, the procedure advances to step 6a.

A second processing flow at step 5a is a process to be carried out when the position command start is not detected and when it is detected that one of the continuous oscillation flag, the short-time oscillation flag and the COIN-crack flag is set. This corresponds to the flowchart shown on the right side at step 5a of FIG. 8.

When the position command start is not detected and when it is detected that one of the continuous oscillation flag, the short-time oscillation flag and the COIN-crack flag is set, the present magnification number, the respective flag states of the continuous oscillation flag, the short-time oscillation flag and the COIN-crack flag, and the maximum value of the settling time are stored so as to be related at step 5a-9.

Next, at step 5a-10, magnification number 1 is selected, Kpp1 is set by using the selected magnification setting value, the continuous oscillation flag, the short-time oscillation flag and the COIN-crack flag are cleared. And further, the number of operation times n is initialized (n=1), and the vibration continuation time t_vib of the vibration continuation time measurement section 82 and the number of COIN-crossing times n_cross of the number-of-COIN-crack-times/settling-time measurement section 84 are reset to zero. The selection of magnification number 1 at this step is carried out as a process for quickly suppressing any unstable state wherein one of the continuous oscillation flag, the short-time oscillation flag and the COIN-crack flag is set.

At step 5a-11, the number of operation times n for the detection of the position command start is counted. In the case when it is judged that the number of operation times n is larger than a predetermined number of times mv5, the procedure advances to step 6a.

FIG. 10 is a table showing an example of magnification setting values and the results of evaluation conditions in accordance with Embodiment 1. In FIG. 10, ○ indicates that the flag is not set, and × indicates that the flag is set.

At step 6a, in accordance with such results stored at step 5a as shown in FIG. 10, among the sets in which the continuous oscillation flag, the short-time oscillation flag and the COIN-crack flag are all not set, a magnification number having the shortest settling time is selected. Then, the product Kpp1s of Kpp1 of the set selected at the end of step 3a and the magnification setting value of the magnification number selected at step 6a is determined as the proportional gain of the position control section 4 that is set at the time when the detection speed ωm is smaller than the predetermined value ωm_th, thereby ending the adjustment processing operation of the first step processing section 85.

By the above-mentioned adjustment processing operation of the first step processing section 85, the control parameters of the position control section 4 and the speed control section 5 are adjusted automatically. By the operation of the first control parameter adjustment section 8 in accordance with Embodiment 1 as described above, the control parameters having the shortest settling time are set without causing vibration and coin breakage, whereby it is possible to provide an electric motor position control apparatus having excellent responsivity.

In the adjustment operation of the first control parameter adjustment section 8 in accordance with Embodiment 1, at step 5a and the subsequent steps shown in FIG. 8, the proportional gain setting value Kpp1s of the position control section 4 at the time when the detection speed ωm is smaller than the predetermined value ωm_th may occasionally become larger than the proportional gain Kpp2 of the position control section 4 at the time when the detection speed ωm is not less than the predetermined value ωm_th. In this case, the switching from the proportional gain Kpp2 to the proportional gain setting value Kpp1s is done gradually over a predetermined time. This is because, if the error between the proportional gain Kpp2 and the proportional gain setting value Kpp1s is large, abrupt change in value occurs at the time of switching, thereby being apt to cause vibration components.

As described above, the electric motor position control apparatus in accordance with Embodiment 1 of the present invention is configured so as to have sets of control parameters including the proportional gain of the position control section 4, the proportional gain of the speed control section 5, etc. and so as to carry out adjustment to select a set of optimum control parameters. Hence, in the electric motor position control apparatus in accordance with Embodiment 1, the number of times the control responsivity of the electric motor is measured can be reduced, whereby the adjustment of the control parameters can be carried out in a short time.

Furthermore, in the electric motor position control apparatus in accordance with Embodiment 1 of the present invention, the control parameters are adjusted so that the control parameters are switched depending on the operation state of the electric motor, whereby it is possible to carry out control parameter adjustment so that the error between the position command and the detection position is made close to zero in a shorter time after position command end.

<<Embodiment 2>>

Figure 11:
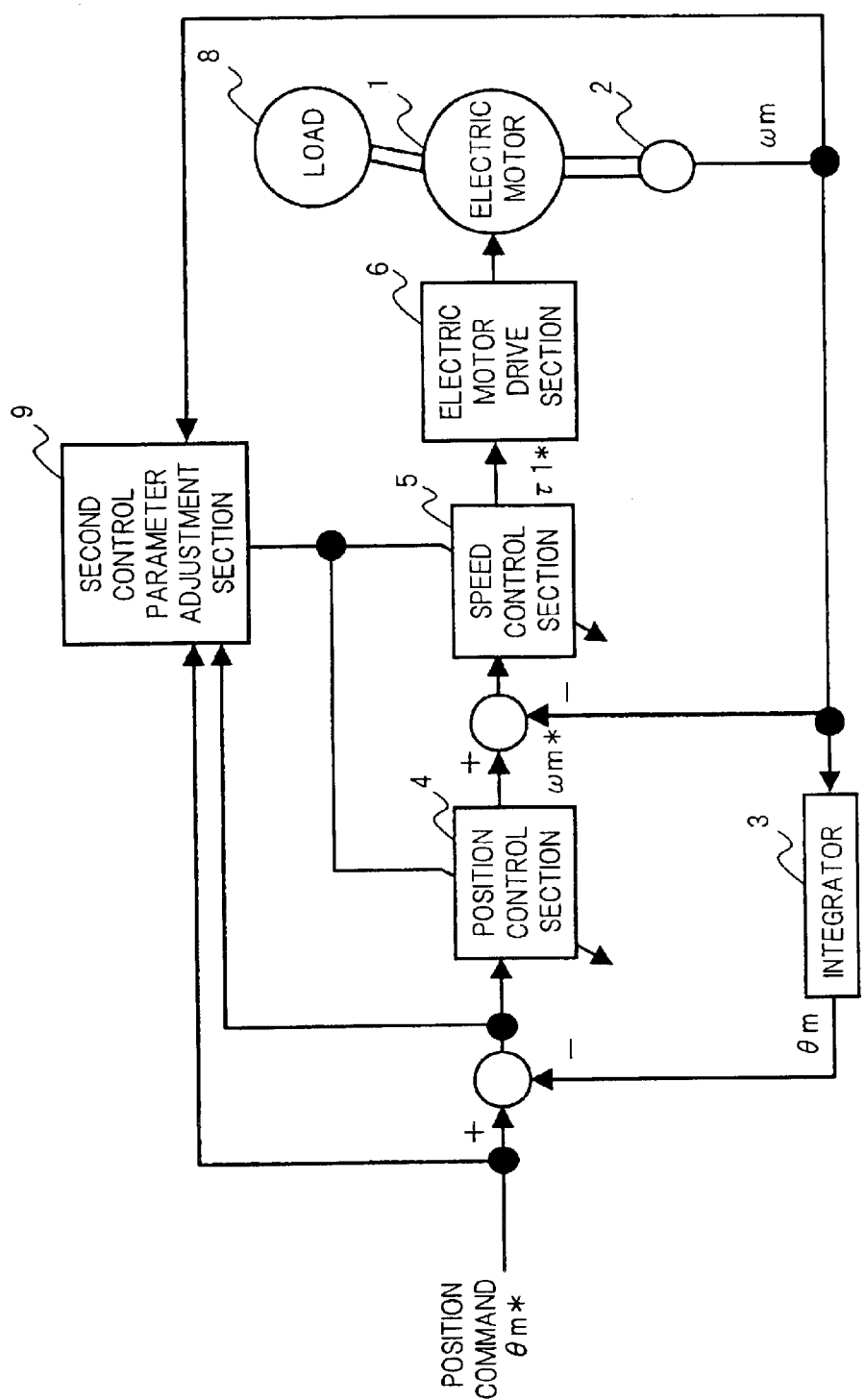
FIG. 11 is a block diagram showing the configuration of an electric motor position control apparatus in accordance with Embodiment 2 of the present invention.

An electric motor position control apparatus in accordance with Embodiment 2 of the present invention will be described below by using FIGS. 11 to 14. FIG. 11 is a block diagram showing the configuration of the control system of the electric motor position control apparatus in accordance with Embodiment 2 of the present invention. In the explanation of Embodiment 2, components having the same configurations and functions as those of the components in accordance with the above-mentioned Embodiment 1 are designated by the same numerals and their explanations are omitted. The configuration of the electric motor position control apparatus in accordance with Embodiment 2 is different from that of the above-mentioned Embodiment 1 in that a second control parameter adjustment section 9 is provided instead of the first control parameter adjustment section 8.

Figure 12:
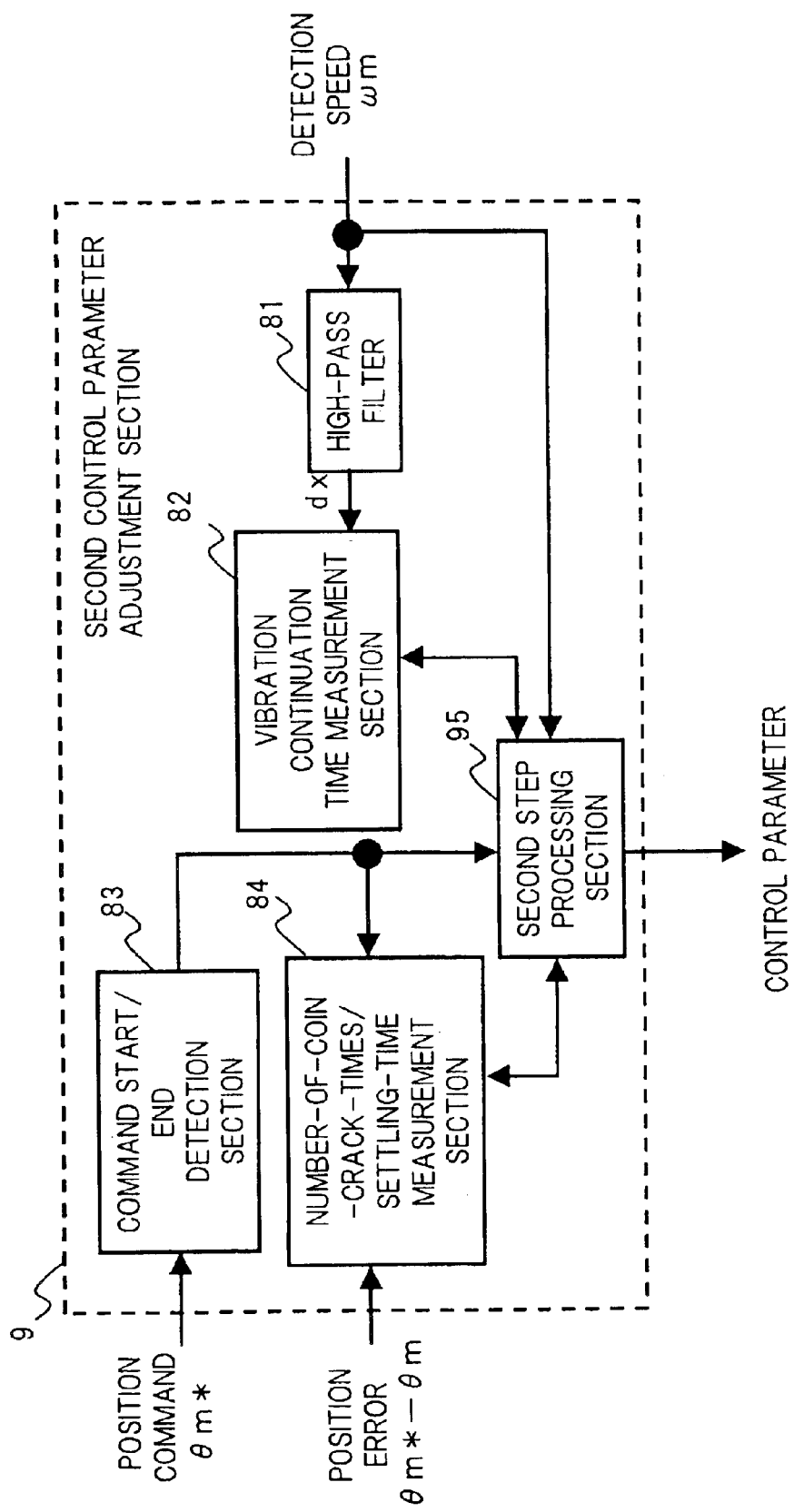
FIG. 12 is a block diagram showing an example of the configuration of a second control parameter adjustment section in accordance with Embodiment 2 of the present invention.

FIG. 12 is a block diagram showing the configuration of the second control parameter adjustment section 9. As shown in FIG. 12, the second control parameter adjustment section 9 comprises a high-pass filter 81, a vibration continuation time measurement section 82, a command start/end detection section 83 and a number-of-COIN-crack-times/settling-time measurement section 84, just like the first control parameter adjustment section 8 in accordance with Embodiment 1. The configuration of the second control parameter adjustment section 9 is different from that of the above-mentioned first control parameter adjustment section 8 in that a second step processing section 95 is provided instead of the first step processing section 85.

The second step processing section 95 in accordance with Embodiment 2 will be described below.

Just like the first step processing section 85, the second step processing section 95 has a plurality of control parameter sets beforehand to which such set numbers as shown in FIG. 5 are assigned, for example. In addition, just like the first step processing section 85, the second step processing section 95 has such a magnification setting table as shown in FIG. 6, for example.

The adjustment processing operation of the second step processing section 95 will be described by using flowcharts shown in FIGS. 13 and 14. "A" at the bottom of FIG. 13 continues to "A" at the top of FIG. 14.

Step 1b, step 3b, step 4b, step 5b and step 6b in the adjustment processing operation of the second step processing section 95 carry out processes similar to those of step 1a, step 3a, step 4a, step 5a and step 6a, respectively, explained in Embodiment 1; hence, explanations of those processes are omitted.

Figure 13:
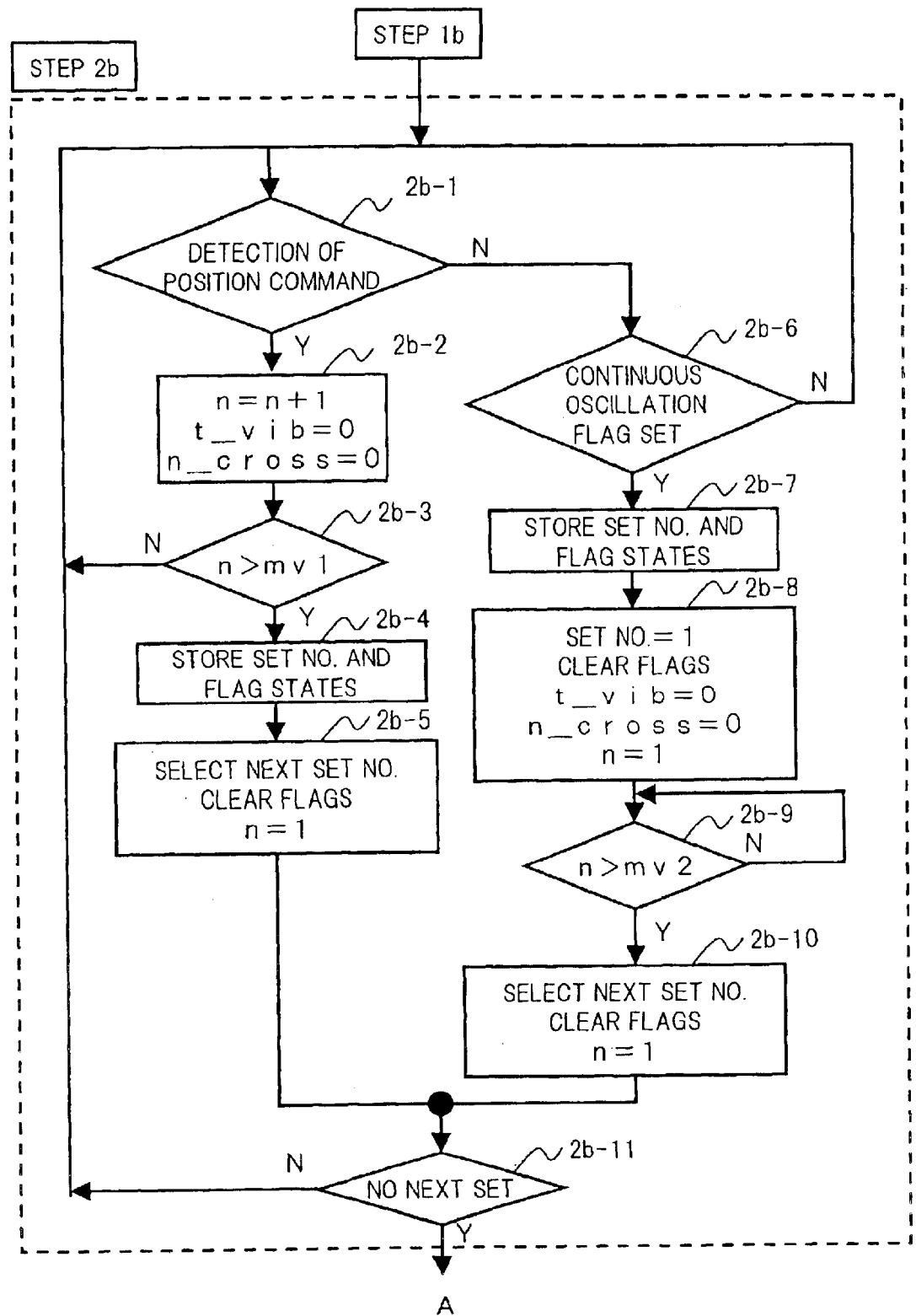
FIG. 13 is a first flowchart showing the operation of the second control parameter adjustment section in accordance with Embodiment 2 of the present invention.

At step 2b subsequent to step 1b, two processing flows are available depending on the detection result of the position command start as shown in FIG. 13.

A first processing flow is a process to be carried out when the position command start is detected. This corresponds to the flowchart shown on the left side at step 2b of FIG. 13. The detection of the position command start at step 2b-1 is carried out by the command start/end detection section 83. When the position command start is detected, the number of operation times n is incremented by 1. Simultaneously, the vibration continuation time t_vib of the vibration continuation time measurement section 82 and the number of COIN-crossing times n_cross of the number-of-COIN-crack-times/settling-time measurement section 84 are reset to zero (at step 2b-2).

Next, at step 2b-3, a judgment is made as to whether the number of operation times n is larger than a predetermined number of times mv1 or not. This predetermined number of times mv1 has been set beforehand. When the number of operation times n is larger than the predetermined number of times mv1, the present set number and the respective flag states of the continuous oscillation flag, the short-time oscillation flag and the COIN-crack flag are stored so as to be related (at step 2b-4). At step 2b-5, the next set is selected, the control parameters of the selected set are set, the continuous oscillation flag, the short-time oscillation flag and the COIN-crack flag are cleared, and the number of operation times n is initialized (n=1).

The selection of the next set at step 2b-5 is carried out as described below. This first processing flow is carried out only when the continuous oscillation flag is not set. The process at the time when the continuous oscillation flag is set will be described later. Since the first processing flow is done when the continuous oscillation flag is not set, a set having a larger set number is selected when set selection is carried out at step 2b-5. Hence, there is a possibility that responsivity can be raised in the first processing flow. Therefore, a set number between the present set number and the minimum set number among set numbers of sets selected in the past and storing the information that the continuous oscillation flags were set is selected as the next set. As the next set, a set number at the almost exact center between the present set number and the above-mentioned minimum set number is particularly desirable. If sets selected in the past and storing the setting that the continuous oscillation flags were set are not present, a set number between the present set number and the maximum set number are selected. Even in this case, it is desirable to select a set number at the almost exact center between the two set numbers.

A second processing flow at step 2b, corresponding to the flowchart shown on the right side at step 2b of FIG. 13, is a process to be carried out when the position command start is not detected and when it is detected that the continuous oscillation flag is set. The state of the continuous oscillation flag is input from the above-mentioned vibration continuation time measurement section 82. When it is detected that the continuous oscillation flag is set (at step 2b-6), the present set number and the respective flag states of the continuous oscillation flag, the short-time oscillation flag and the COIN-crack flag are stored so as to be related (at step 2b-7). Next, at step 2b-8, set number 1 is selected, the control parameters of the selected set are set, the continuous oscillation flag, the short-time oscillation flag and the COIN-crack flag are cleared, and the number of operation times n is initialized (n=1). And the vibration continuation time t_vib of the vibration continuation time measurement section 82 and the number of COIN-crossing times n_cross of the number-of-COIN-crack-times/settling-time measurement section 84 are reset to zero. Then, set number 1 is selected, and the control parameters of the selected set are set. The setting of the control parameters of the selected set is done immediately after vibration continuation is detected; this is a process for quickly suppressing vibration. The proportional gain Kvp of the speed control section 5 of set number 1 is low, thereby being most suited for this process. Then, the operations of the vibration continuation time measurement section 82 and the number-of-COIN-crack-times/settling-time measurement section 84 are stopped temporarily. This is because it is not necessary to set the continuous oscillation flag, the short-time oscillation flag and the COIN-crack flag in an oscillation dampening process. Then, at step 2b-9, a judgment is made as to whether the number of operation times n is larger than a predetermined number of times mv2 or not. When it is judged that the number of operation times n is larger than the predetermined number of times mv2 at step 2b-10, the next set is selected, the control parameters of the selected set are set, the continuous oscillation flag, the short-time oscillation flag and the COIN-crack flag are cleared, and the number of operation times n is initialized (n=1).

The selection of the next set at step 2b-10 is carried out as described below. It is presumed that the continuous oscillation flag was set because the control parameter was set too high. Hence, it is presumed that a set for stable operation is a set having a smaller set number. Therefore, a set number between the set number at the time when it is detected that the continuous oscillation flag is set and the largest set number among set numbers of sets selected in the past and storing the setting that the continuous oscillation flags are not set is selected as the next set. A set number at the almost exact center between the above-mentioned two set numbers is particularly desirable. If sets selected in the past and storing the setting that the continuous oscillation flags are not set are not present, a set number between the set number at the time when it is detected that the continuous oscillation flag is set and the smallest set number is selected. In this case, a set number at the almost exact center between the two set numbers is also desirable.

If the process at the time when the position command start is detected and the process at the time when it is detected that the continuous oscillation flag is set are carried out continuously at step 2b as described above, there is a case wherein no set is available as a set to be selected next (at step 2b-11). At the time of this state, the procedure advances to step 3b.

An adjustment processing operation subsequent to step 3b in accordance with Embodiment 2 is the same as the adjustment processing operation subsequent to step 3a in accordance with the above-mentioned Embodiment 1. In other words, as shown in FIG. 14, the same processes as those at step 3a, step 4a, step 5a and step 6a in accordance with Embodiment 1 are carried out in the order of step 3b, step 4b, step 5b and step 6b, whereby the adjustment processing operation of the second step processing section 95 is completed.

As described above, in Embodiment 2, the control parameters of the position control section 4 and the speed control section 5 are adjusted automatically. As a result, in the electric motor position control apparatus in accordance with Embodiment 2, the control parameters having the shortest settling time are set without causing vibration and coin breakage, whereby adjustment capable of obtaining excellent responsivity is attained.

Figure 14:
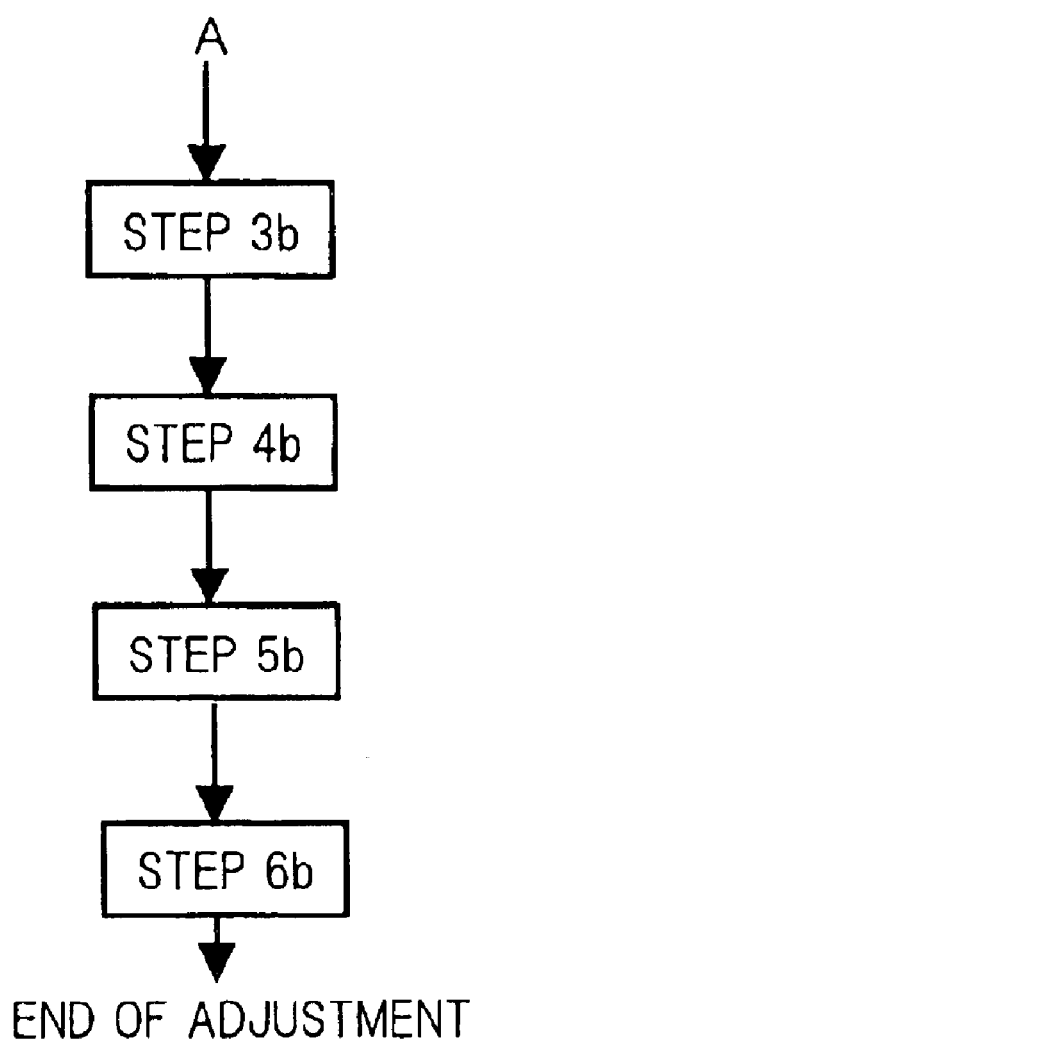
FIG. 14 is a second flowchart showing the operation of the second control parameter adjustment section in accordance with Embodiment 2 of the present invention.

In the adjustment processing operation of the second control parameter adjustment section 9 in accordance with Embodiment 2, at step 5b and the subsequent steps shown in FIG. 14, the proportional gain setting value Kpp1s of the position control section 4 at the time when the detection speed ωm is smaller than the predetermined value ωm_th may occasionally become larger than the proportional gain Kpp2 of the position control section 4 at the time when the detection speed ωm is not less than the predetermined value ωm_th. In this case, the switching from the proportional gain Kpp2 to the proportional gain setting value Kpp1s is done gradually over a predetermined time. This is done because, if the error between the proportional gain Kpp2 and the proportional gain setting value Kpp1s is large, abrupt change occurs at the time of switching, thereby being apt to cause vibration components.

As described above, the electric motor position control apparatus in accordance with Embodiment 2 of the present invention has sets of control parameters including the proportional gain of the position control section 4, the proportional gain of the speed control section 5, etc. and carries out adjustment to select a set of optimum control parameters, whereby the number of times the control responsivity of the electric motor is measured can be reduced and the adjustment of the control parameters can be carried out in a short time.

Furthermore, in the electric motor position control apparatus in accordance with Embodiment 2 of the present invention, by efficiently selecting a set to be selected next at step 2b in which the response state of the electric motor 1 is measured by using the parameters of the selected set, the number of sets to be selected can be reduced. As a result, in Embodiment 2, the adjustment of the control parameters can be carried out in a short time.

Still further, in the electric motor position control apparatus in accordance with Embodiment 2 of the present invention, the control parameters are adjusted so that the control parameters are switched depending on the operation state of the electric motor, whereby it is possible to carry out control parameter adjustment so that the error between the position command and the detection position is made close to zero in a shorter time after position command end.

<<Embodiment 3>>

Figure 15:
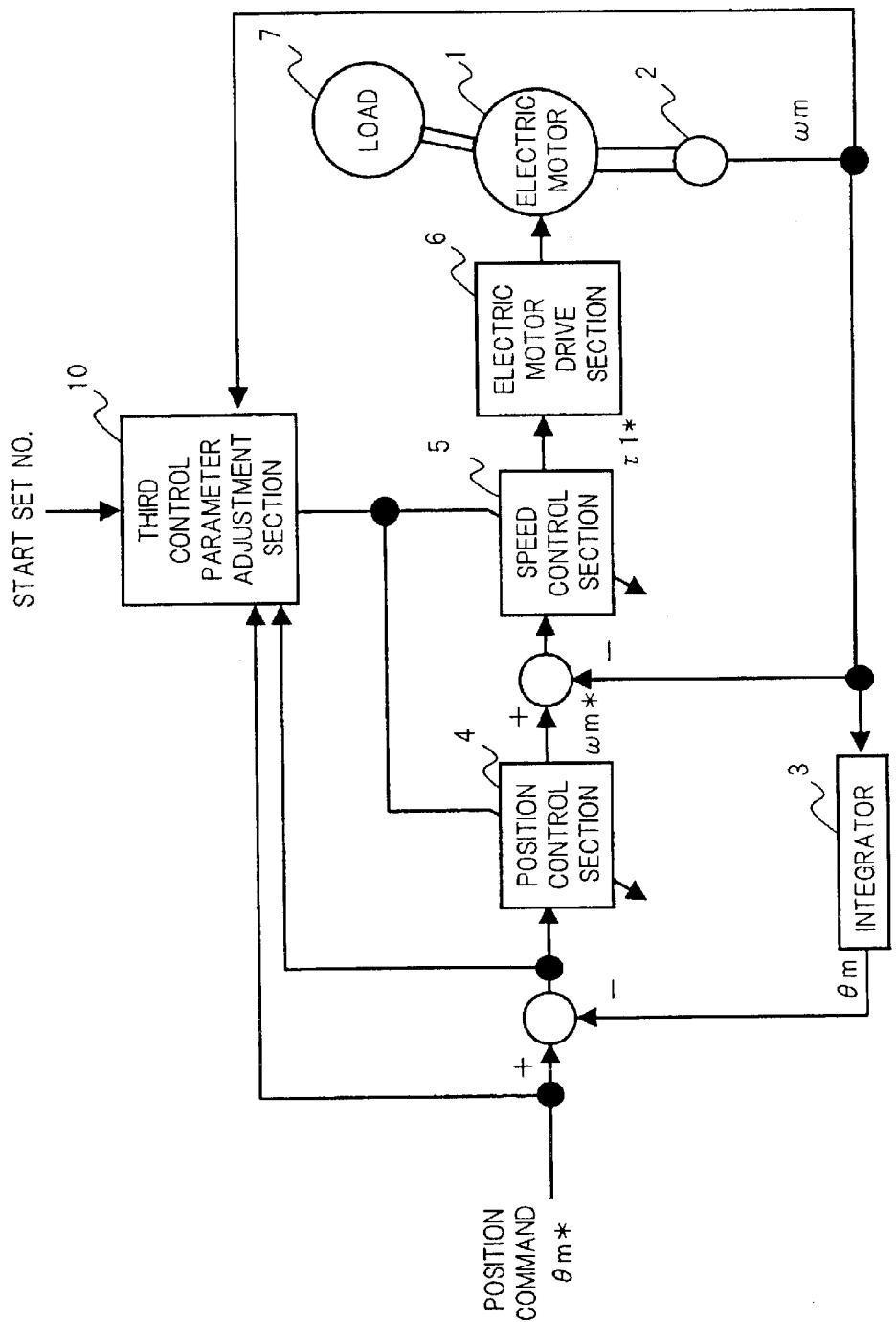
FIG. 15 is a block diagram showing the configuration of an electric motor position control apparatus in accordance with Embodiment 3 of the present invention.

An electric motor position control apparatus in accordance with Embodiment 3 of the present invention will be described below by using FIGS. 15 to 17. FIG. 15 is a block diagram showing the configuration of the control system of the electric motor position control apparatus in accordance with Embodiment 3 of the present invention. In the explanation of Embodiment 3, components having the same configurations and functions as those of the components in accordance with the above-mentioned Embodiment 1 are designated by the same numerals and their explanations are omitted. The configuration of the electric motor position control apparatus in accordance with Embodiment 3 is different from that of the above-mentioned Embodiment 1 in that a third control parameter adjustment section 10 is provided instead of the first control parameter adjustment section 8.

Figure 16:
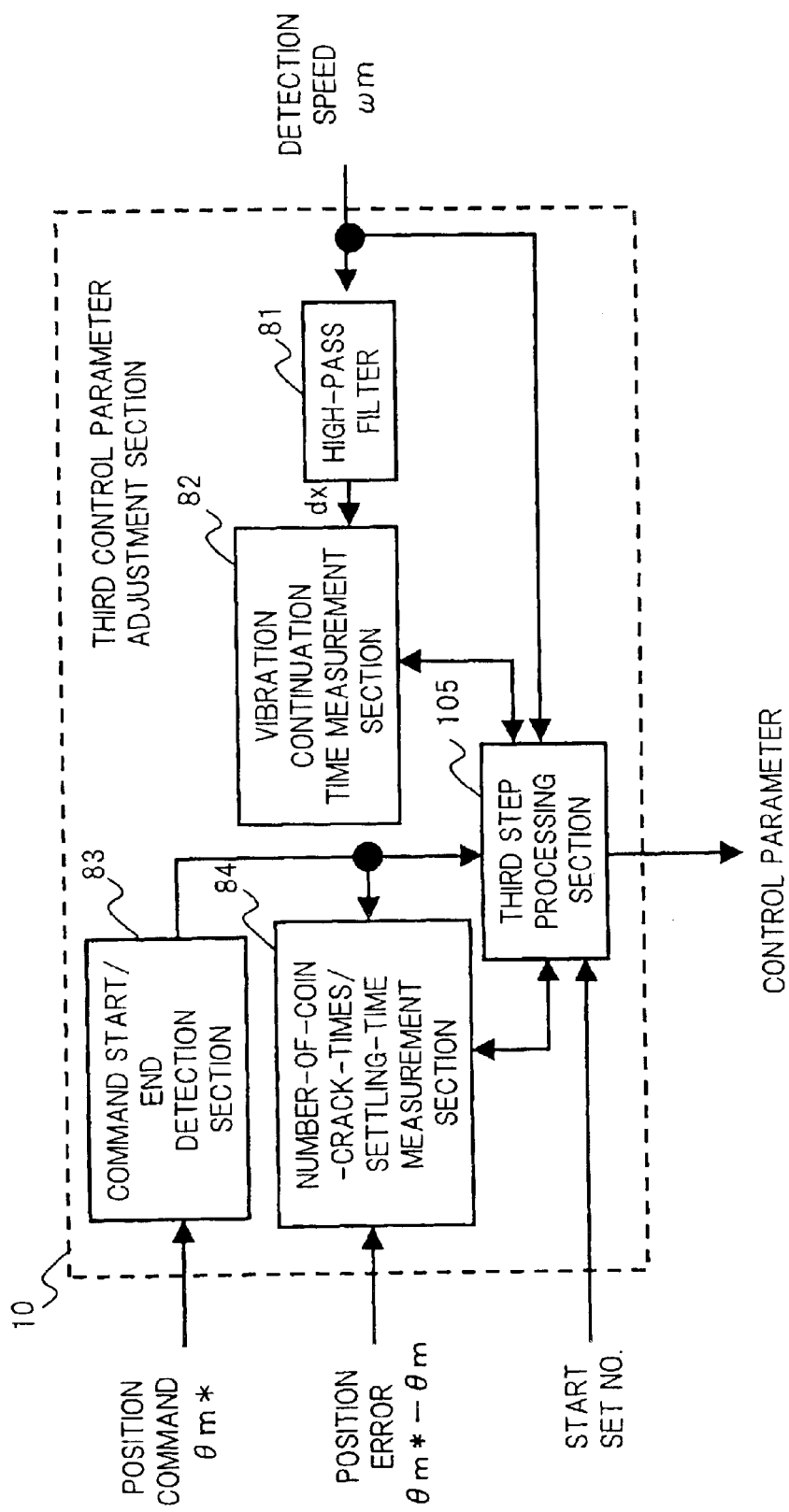
FIG. 16 is a block diagram showing an example of the configuration of a third control parameter adjustment section in accordance with Embodiment 3 of the present invention.

FIG. 16 is a block diagram showing the configuration of the third control parameter adjustment section 10. As shown in FIG. 16, the third control parameter adjustment section 10 comprises a high-pass filter 81, a vibration continuation time measurement section 82, a command start/end detection section 83 and a number-of-COIN-crack-times/settling-time measurement section 84, just like the first control parameter adjustment section 8 in accordance with Embodiment 1. The configuration of the third control parameter adjustment section 10 is different from that of the above-mentioned first control parameter adjustment section 8 in that a third step processing section 105 is provided instead of the first step processing section 85.

The third step processing section 105 in accordance with Embodiment 3 will be described below.

Just like the first step processing section 85, the third step processing section 105 has a plurality of control parameter sets beforehand to which set numbers shown in FIG. 5 are assigned, for example. In addition, just like the first step processing section 85, the third step processing section 105 has such a magnification setting table as shown in FIG. 6, for example.

The adjustment processing operation of the third step processing section 105 will be described by using a flowchart shown in FIG. 17.

Figure 17:
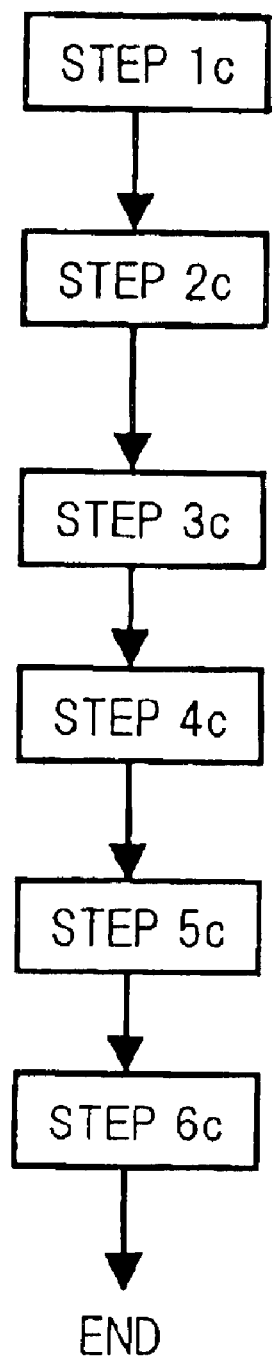
FIG. 17 is a first flowchart showing the operation of the third control parameter adjustment section in accordance with Embodiment 3 of the present invention.

As shown in FIG. 17, in Embodiment 3, an adjustment process is carried out in the order of step 1c, step 2c, step 3c, step 4c, step 5c and step 6c. In this adjustment process, step 2c, step 3c, step 4c, step 5c and step 6c carry out the same processes as those of step 2a, step 3a, step 4a, step 5a and step 6a described in the above-mentioned Embodiment 1; hence, explanations of these processes are omitted.

In the operation of the first step processing section 85 in accordance with the above-mentioned Embodiment 1, the set to be selected first at step 1a is a set having the lowest proportional gain Kvp, and set number 1 is assigned thereto. However, in the case when both the electric motor 1 and the load 7 driven by the electric motor 1 are rigid bodies and they are connected to each other via a member having a large spring constant, no resonance frequency is caused; hence, by sufficiently raising the proportional gain of the speed control section 5, high responsivity can be obtained. Therefore, in this kind of case, by providing an intermediate set number at the time of selecting the first set, the selection of a set having high responsivity can be carried out in a short time. Hence, in the electric motor position control apparatus in accordance with Embodiment 3, a set having a start set number designated externally is selected as the first set at step 1c of the adjustment processing operation, and the control parameters of the selected set are set in the position control section 4 and the speed control section 5.

As described above, the electric motor position control apparatus in accordance with Embodiment 3 has sets of control parameters including the proportional gain of the position control section and the proportional gain of the speed control section and starts the adjustment processing operation from the start set number designated externally. In Embodiment 3, the adjustment processing operation for the control parameters is carried out in this way, whereby the number of times the control responsivity of the electric motor is measured can be reduced and the adjustment of the control parameters can be carried out in a short time.

Still further, in the electric motor position control apparatus in accordance with Embodiment 3 of the present invention, the control parameters are adjusted so that the control parameters are switched depending on the operation state of the electric motor, whereby it is possible to carry out control parameter adjustment so that the error between the position command and the detection position is made close to zero in a shorter time after position command end.

<<Embodiment 4>>

Figure 18:
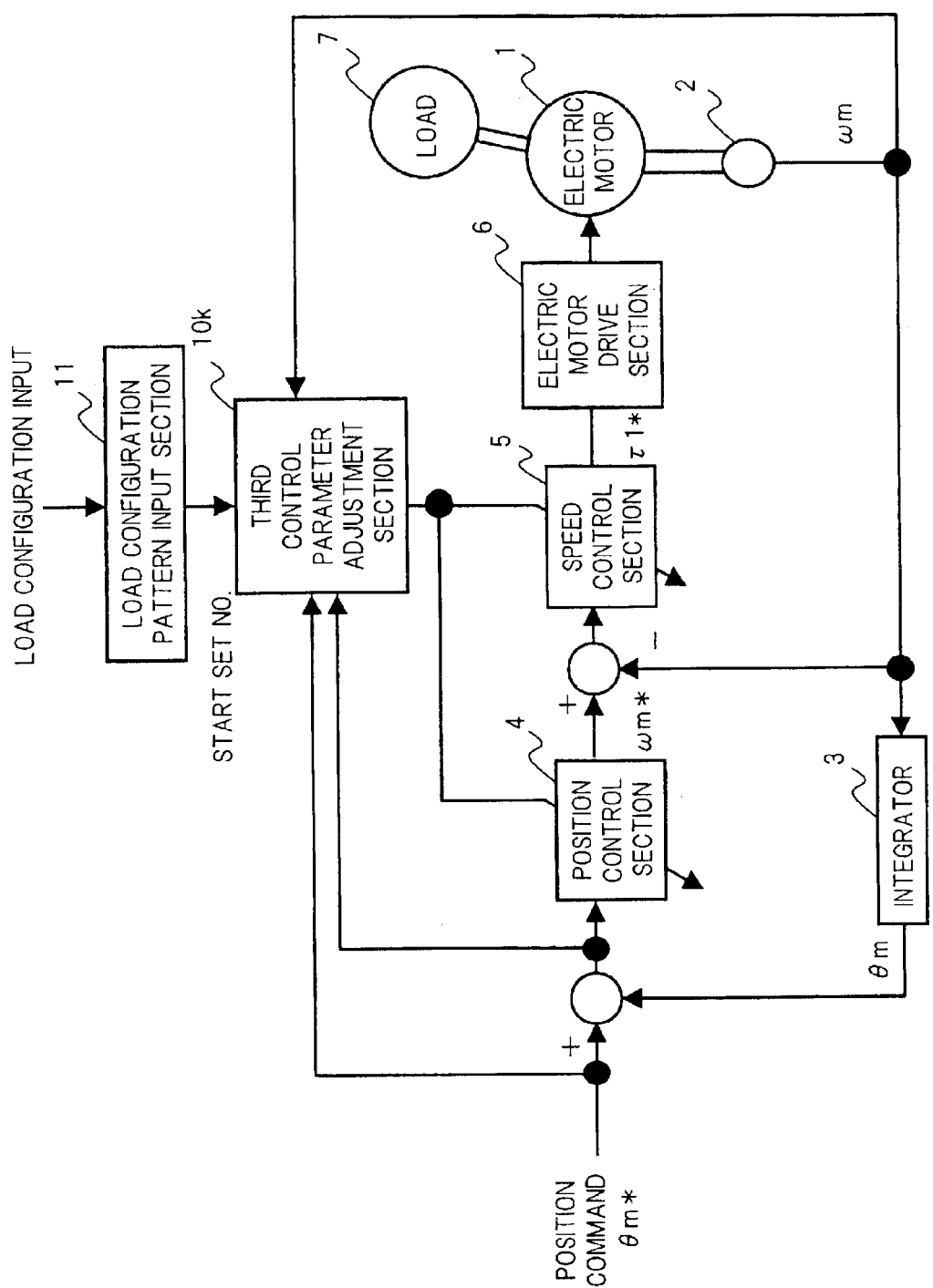
FIG. 18 is a block diagram showing the configuration of an electric motor position control apparatus in accordance with Embodiment 4 of the present invention.
Figure 20:
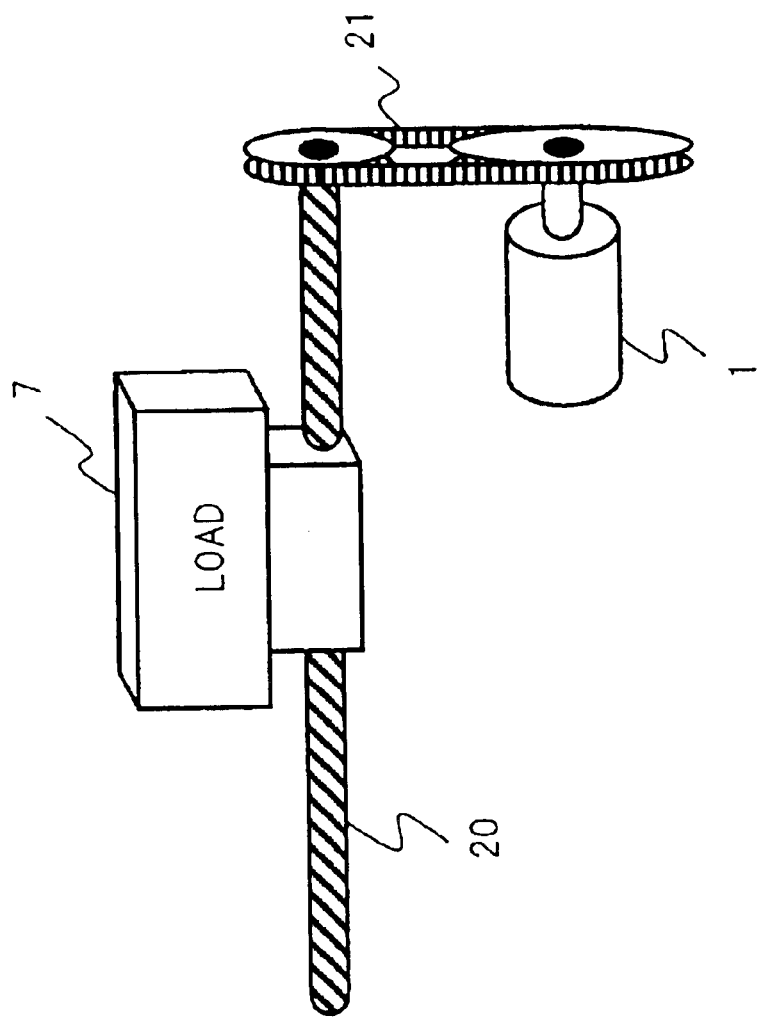
FIG. 20 is a configuration view showing an example of an apparatus configuration.

An electric motor position control apparatus in accordance with Embodiment 4 of the present invention will be described below by using FIGS. 18 to 20. FIG. 18 is a block diagram showing the configuration of the control system of the electric motor position control apparatus in accordance with Embodiment 4 of the present invention. In the explanation of Embodiment 4, components having the same configurations and functions as those of the components in accordance with the above-mentioned Embodiments 1 to 3 are designated by the same numerals and their explanations are omitted. The configuration of the electric motor position control apparatus in accordance with Embodiment 4 is different from that of the above-mentioned Embodiment 3 in that a load configuration pattern input section 11 is provided.

The load configuration pattern input section 11 in accordance with Embodiment 4 will be described below by using figures.

The load configuration pattern input section 11 has a table wherein apparatus configurations are related to start set numbers as shown in FIG. 19, for example. The apparatus configurations represent how the electric motor 1 and the load 7 driven by this electric motor 1 are connected to each other. For example, as shown in FIG. 20, the load 7 is installed on a ball screw 20, and the electric motor 1 is connected to the shaft of the ball screw 20 via a timing belt 21. The apparatus configuration in this case is referred to as "ball screw+timing belt." The table shown in FIG. 19 has been prepared and stored beforehand. As a method for preparing this kind of table, a start set number is determined on the basis of the general distribution of resonance frequencies in the case of an apparatus configuration concerned, for example. When it is judged that a resonance frequency is high, the start set number is made higher; when it is judged that the resonance frequency is low, the start set number is made lower.

As the operation of the load configuration pattern input section 11, when information on an apparatus configuration is input externally, a start set number based on the table shown in FIG. 19 is output to a third control parameter adjustment section 10k. The third control parameter adjustment section 10k carries out the control parameter adjustment operation described in the above-mentioned Embodiment 3.

As described above, since the electric motor position control apparatus in accordance with Embodiment 4 is configured so that an apparatus configuration is input, it is possible to start from a start set that is related to control parameter adjustment processing operation, whereby the number of times the control responsivity of the electric motor is measured can be reduced and the adjustment of the control parameters can be carried out in a short time.

<<Embodiment 5>>

Figure 21:
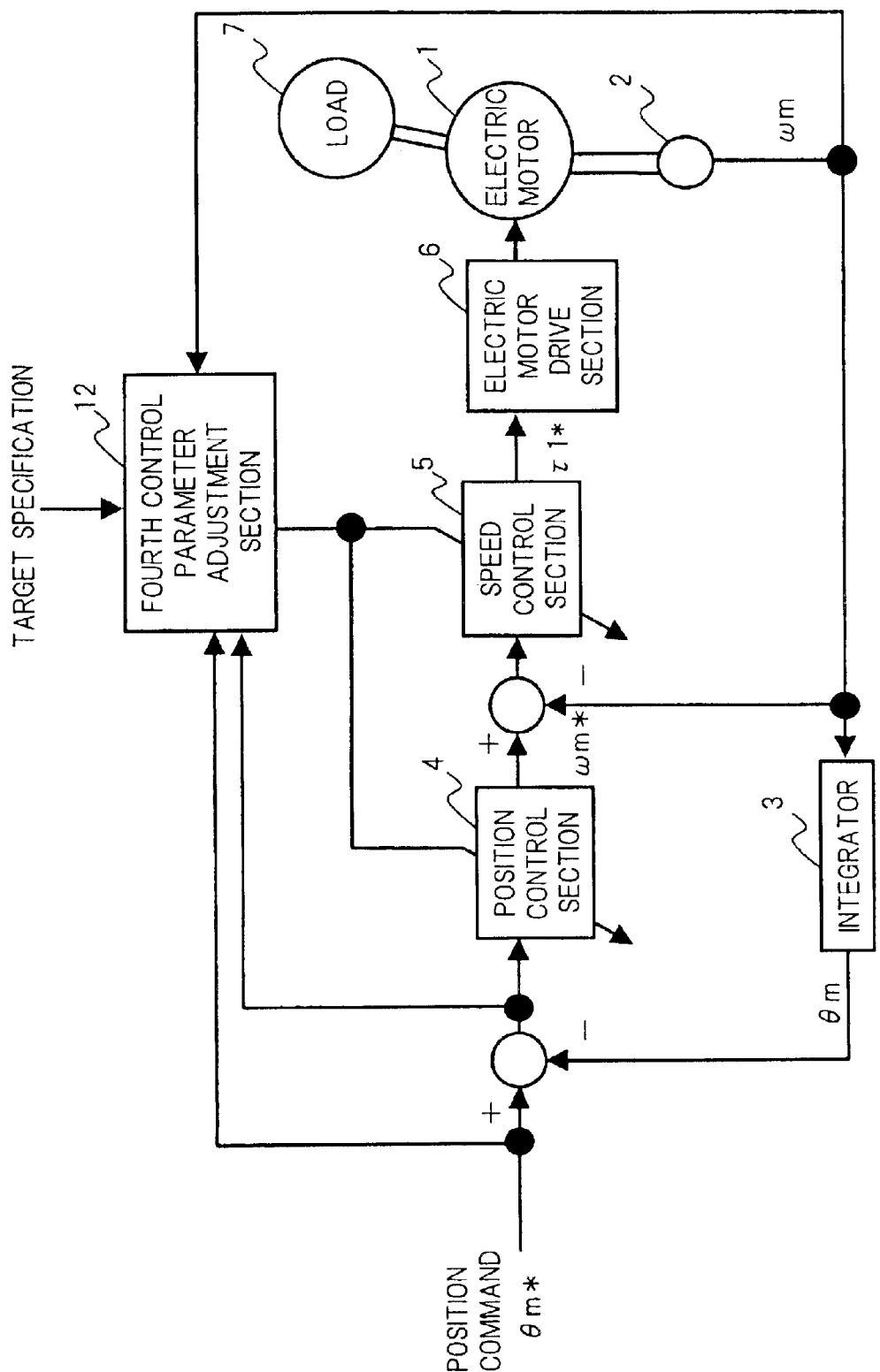
FIG. 21 is a block diagram showing the configuration of an electric motor position control apparatus in accordance with Embodiment 5 of the present invention.

An electric motor position control apparatus in accordance with Embodiment 5 of the present invention will be described below by using FIGS. 21 and 22. FIG. 21 is a block diagram showing the configuration of the control system of the electric motor position control apparatus in accordance with Embodiment 5 of the present invention. In the explanation of Embodiment 5, components having the same configurations and functions as those of the components in accordance with the above-mentioned Embodiment 1 are designated by the same numerals and their explanations are omitted. The configuration of the electric motor position control apparatus in accordance with Embodiment 5 is different from that of the above-mentioned Embodiment 1 in that a fourth control parameter adjustment section 12 is provided instead of the first control parameter adjustment section 8.

Figure 22:
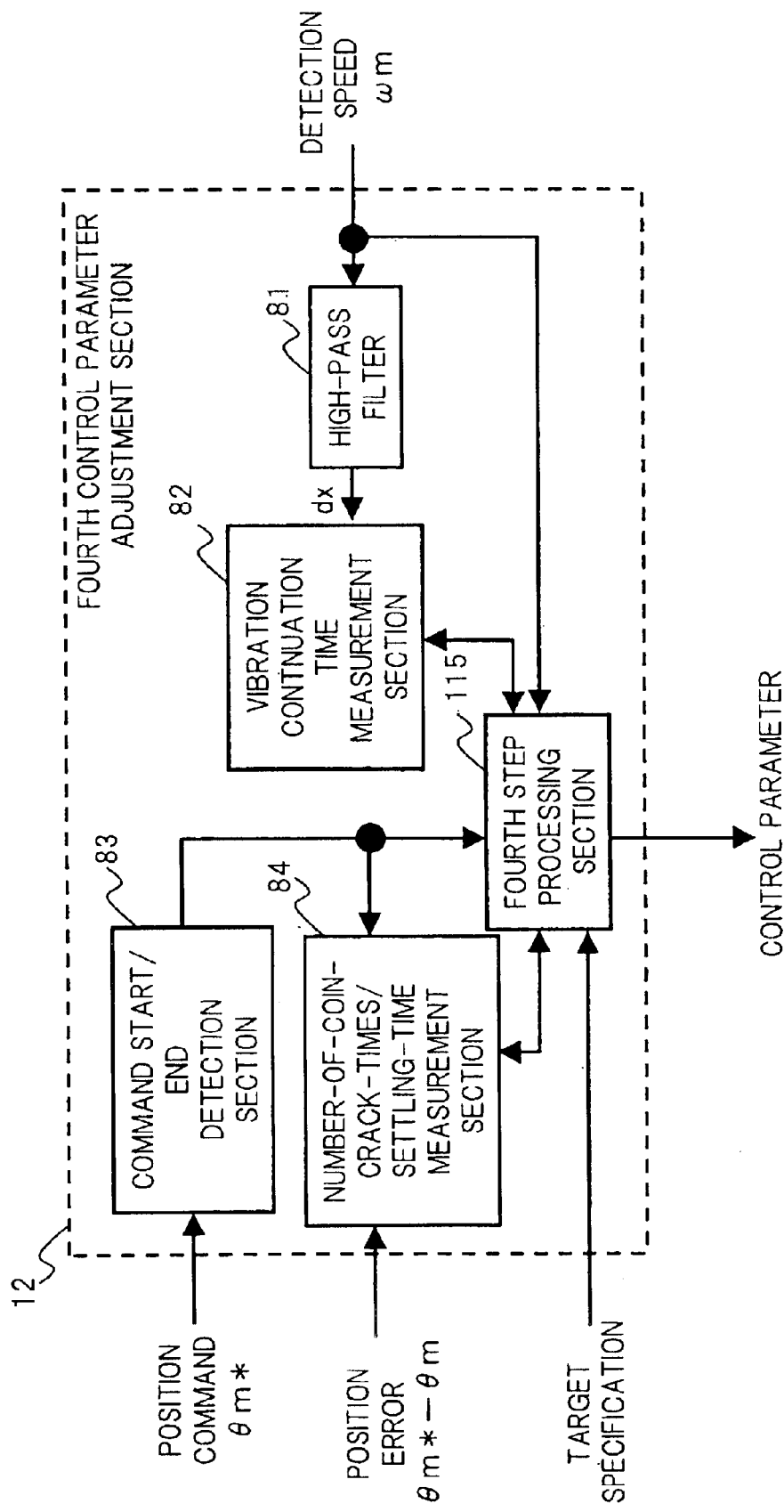
FIG. 22 is a block diagram showing an example of the configuration of a fourth control parameter adjustment section in accordance with Embodiment 5 of the present invention.

FIG. 22 is a block diagram showing the configuration of the fourth control parameter adjustment section 12. As shown in FIG. 22, the fourth control parameter adjustment section 12 comprises a high-pass filter 81, a vibration continuation time measurement section 82, a command start/end detection section 83 and a number-of-COIN-crack-times/settling-time measurement section 84, just like the first control parameter adjustment section 8 in accordance with Embodiment 1. The configuration of the fourth control parameter adjustment section 12 is different from that of the above-mentioned first control parameter adjustment section 8 in that a fourth step processing section 115 is provided instead of the first step processing section 85.

The fourth step processing section 115 in accordance with Embodiment 5 will be described below.

The fourth step processing section 115 is configured to carry out an operation similar to that of the first step processing section 85 in accordance with the above-mentioned Embodiment 1 and also configured that, in the case when the measurement result in the measurement process of the respectively of the electric motor 1 satisfies a target specification having been input externally, the control parameters having been set at that time are used as adjustment results and the adjustment processing operation is completed.

Since the adjustment processing operation is completed in the middle of the control parameter adjustment processing operation at the time when the target specification having been input externally is satisfied, whereby the adjustment processing time can be shortened.

<<Embodiment 6>>

Figure 23:
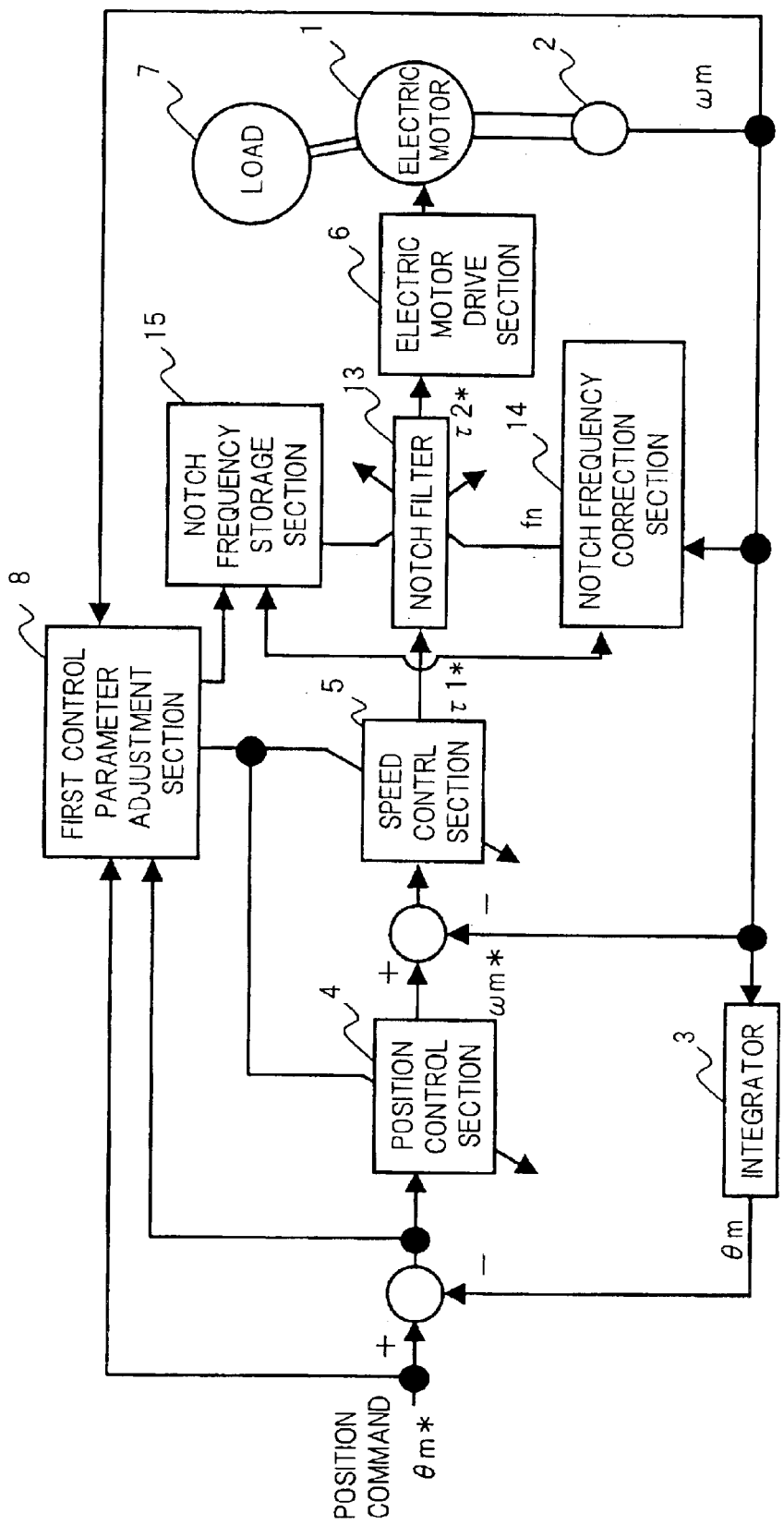
FIG. 23 is a block diagram showing the configuration of an electric motor position control apparatus in accordance with Embodiment 6 of the present invention.
Figure 24:
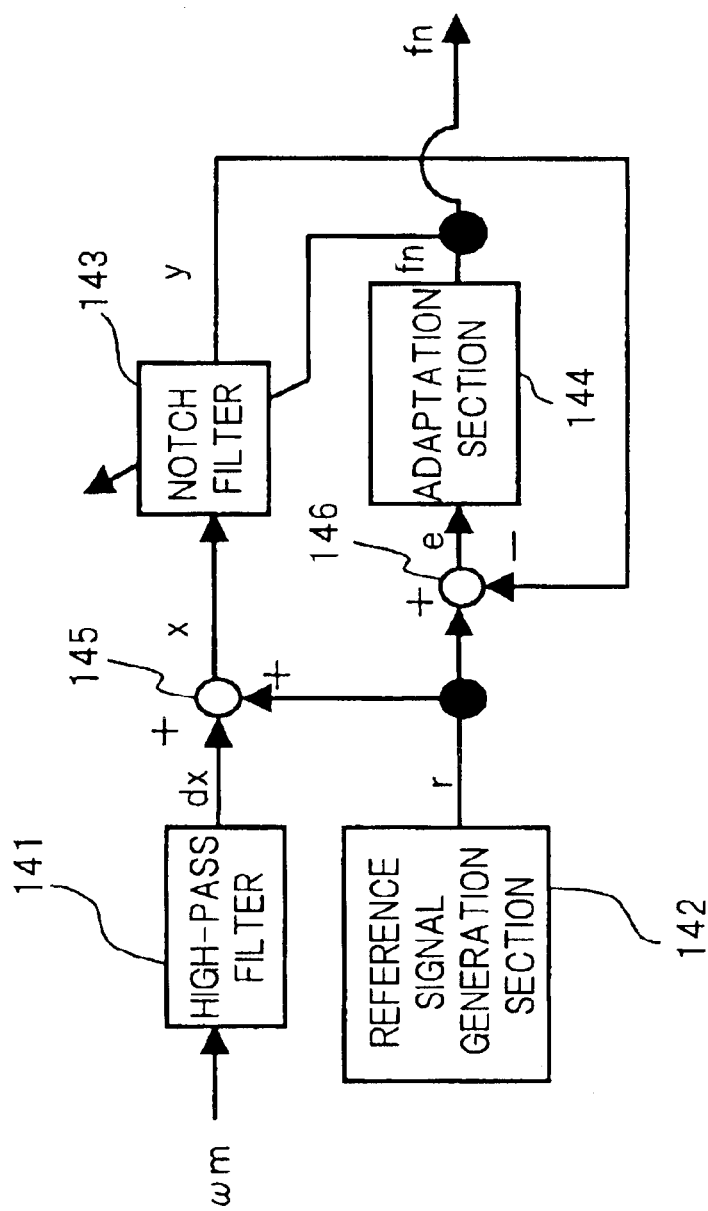
FIG. 24 is a block diagram showing an example of the configuration of a notch frequency correction section in accordance with Embodiment 6 of the present invention.

An electric motor position control apparatus in accordance with Embodiment 6 of the present invention will be described below by using FIGS. 23 to 25. FIG. 23 is a block diagram showing the configuration of the control system of the electric motor position control apparatus in accordance with Embodiment 6 of the present invention. In the explanation of Embodiment 6, components having the same configurations and functions as those of the components in accordance with the above-mentioned Embodiment 1 are designated by the same numerals and their explanations are omitted. The configuration of the electric motor position control apparatus in accordance with Embodiment 6 is different from that of the above-mentioned Embodiment 1 in that a notch filter 13, a notch frequency correction section 14 and a notch frequency storage section 15 are provided.

The notch filter 13 receives a torque command $\tau1^*$ output from the speed control section 5 and outputs the result of the filter processing as a new torque command $\tau2^*$ to the electric motor drive section 6. The electric motor drive section 6 drives the electric motor 1 depending on the torque command $\tau2^*$.

In addition, the detection speed cm is input to the notch frequency correction section 14, and the notch frequency fn of the notch filter 13 is corrected sequentially so that the frequency component having a predetermined frequency or more and included in the detection speed ωm reduces. The operation of the notch frequency storage section 15 will be described later.

An example of a specific operation of the notch frequency correction section 14 will be described by using FIG. 24. FIG. 24 is a block diagram showing an example of the configuration of the notch frequency correction section 14. The notch frequency correction section 14 comprises a high-pass filter 141, a reference signal generation section 142, a notch filter 143 and an adaptation section 144. The notch filter 143 of the notch frequency correction section 14 has the same configuration as that of the notch filter 13.

The operation of the notch frequency correction section 14 configured as described above will be described below.

When the detection speed ωm is input to the notch frequency correction section 14, the detection speed ωm is passed through the high-pass filter 141, and the high-pass filter 141 outputs the vibration component dx included in the detection speed ωm. The reference signal generation section 142 outputs a reference signal r. The reference signal r and the vibration component dx are input to an adder 145, and the addition value x is input to the notch filter 143. The notch filter 143 outputs a signal y that was obtained by filtering. Furthermore, the signal y from the notch filter 143 and the reference signal r are input to a subtracter 146, and the error e of these are input to the adaptation section 144. The adaptation section 144 sequentially corrects the notch frequency fn so that the error e reduces. The correction of the notch frequency fn can be attained by using the known gradient method, for example. As a literature describing the gradient method, "Theory of Digital Signal Processing 3," the first edition, p165–p166, written by Takashi Yahagi, published on Dec. 10, 1986 by CORONA PUBLISHING CO., LTD., is available.

The notch frequency fn from the adaptation section 144 is set in the notch filter 143 of the notch frequency correction section 14 and also set in the notch filter 13 simultaneously. The reference signal generation section 142 outputs a signal indicating zero as the result of the reduction of the vibration component dx, for example.

Figure 25:
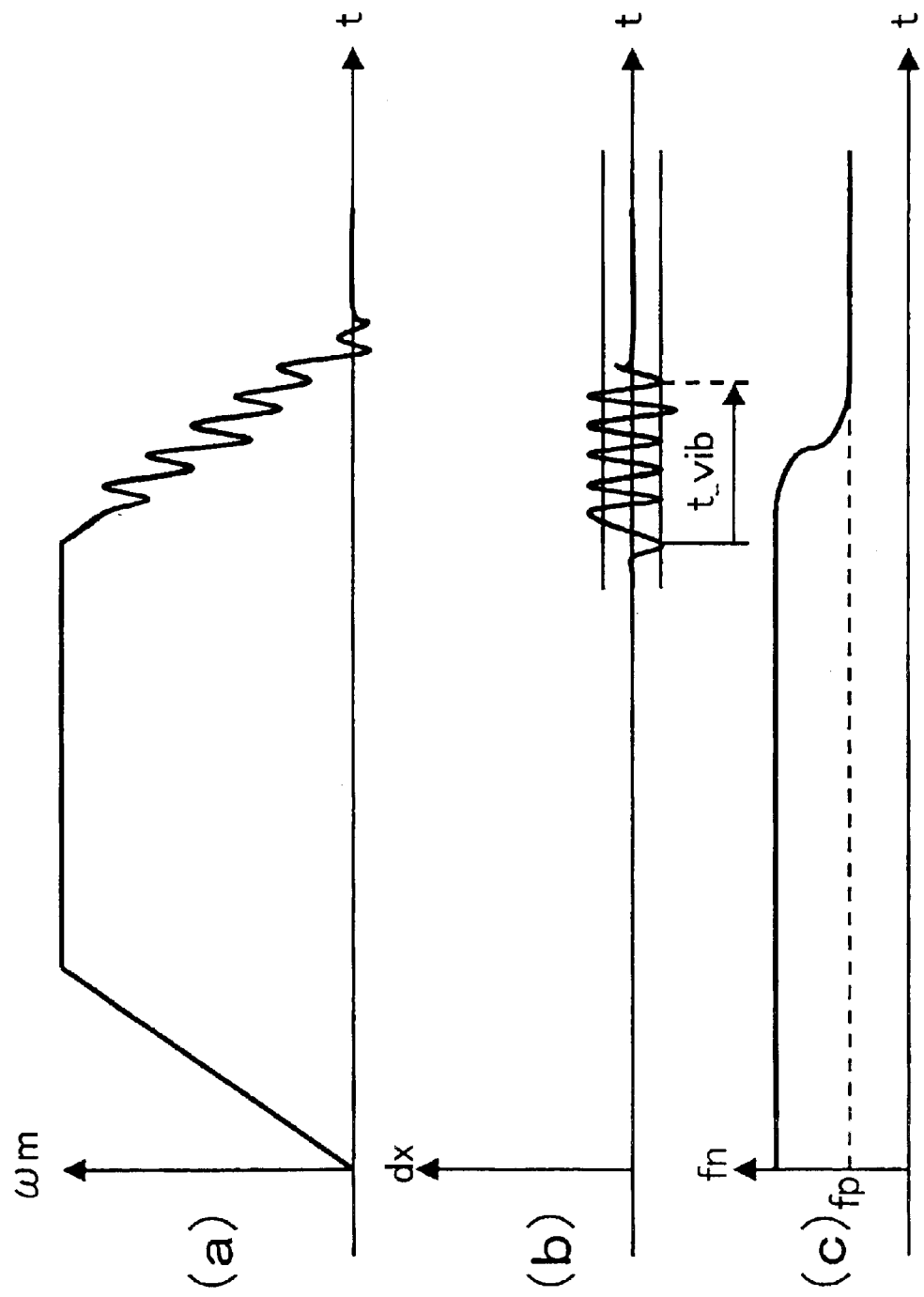
FIG. 25 is waveform diagrams showing an example of the time-related change of a detection speed, a vibration component and a notch frequency during the operation of the notch frequency correction section in accordance with Embodiment 6 of the present invention.

In Embodiment 6, a method for setting the predetermined time T_vib1 serving as a reference time required for the vibration continuation time measurement section 82 (see FIG. 2), a component of the first control parameter adjustment section 8, to set the continuous oscillation flag is described by using FIG. 25.

FIG. 25 shows waveforms at the time when the notch frequency correction section 14 operates. The portion (a) of FIG. 25 shows the time-related change of the detection speed ωm, the portion (b) shows the time-related change of the vibration component dx included in the detection speed ωm, and the portion (c) shows time-related change of the notch frequency fn. Since the notch frequency correction section 14 starts its correction operation after the generation of the vibration component dx, the vibration component dx appears definitely until the correction operation is completed. As shown in the portion (b) of FIG. 25, the period in which the vibration component dx is generated is the vibration continuation time t_vib. After the correction operation of the notch frequency correction section 14 is completed, the vibration component dx is suppressed by the notch filter 13; hence, by further incrementing the set number during the adjustment processing operation of the first control parameter adjustment section 8, the responsivity can be raised. However, as described in the above-mentioned Embodiment 1, if the vibration continuation time t_vib of the vibration component dx measured by the first control parameter adjustment section 8 becomes larger than the predetermined time T_vib1, the continuous oscillation flag is set, whereby the responsivity is not raised at the set selected at that time and the subsequent sets. For this reason, the notch frequency correction section 14 is required to ignore the vibration occurring during the correction of the notch frequency fn. Hence, it is desirable that the correction operation time of the notch frequency correction section 14 is examined beforehand and that a time longer than that is set as the predetermined time T_vib1.

In addition, while the notch frequency correction section 14 corrects the notch frequency, a disturbance occurs, for example, the responsive state becomes vibratory; hence, the responsive state cannot be judged as the stationary responsive state at that set. Therefore, it is necessary to make a judgment as to whether the short-time oscillation flag should be set or not and to make a judgment as to whether the COIN-crack flag should be set or not, while the operation is stable. The notch frequency correction section 14 carries out notch frequency correction operation when the control parameters were changed. After the operation is carried out the predetermined number of times mv1 after set change, the first control parameter adjustment section 8 selects the next set. In the period from the set change to the selection of the next set, operation is carried out a predetermined number of times mv6 smaller than the predetermined number of times mv1, and then a judgment as to whether the short-time oscillation flag should be set or not and a judgment as to whether the COIN-crack flag should be set or not are made. Therefore, the stationary responsive state at that set can be measured.

Next, the operation of the notch frequency storage section 15 will be described. When the first step processing section 85 (see FIG. 2), a component of the first control parameter adjustment section 8, stores a set number and the states of the respective flags at step 2a shown in FIG. 7, the notch frequency storage section 15 stores the notch frequency fn having been set in the notch filter 13 at that time so as to be related to the set number. When the first step processing section 85, a component of the first control parameter adjustment section 8, selects a set at step 2a, if the notch frequency fn related to the set has been stored, the stored notch frequency fn is set in the notch filter 13, the notch filter 143 of the notch frequency correction section 14 and the adaptation section 144. By setting the notch frequency fn as described above, the states of the notch filters 13 and 143 can be restored to the states stored for the set in the past.

Furthermore, in Embodiment 6, after the notch frequency fn is set in the notch filter 13, the notch filter 143 of the notch frequency correction section 14 and the adaptation section 144, the change of the notch frequency fn is prohibited until a predetermined time elapses. When the first control parameter adjustment section 8 detects the vibration continuation state and dampens the vibration once by carrying out driving by using the control parameters of the set number 1, the adaptation section 144 may react with the vibration component in the middle of the vibration dampening, resulting in re-correcting the notch frequency fn having been set in the notch filter 13, the notch filter 143 of the notch frequency correction section 14 and the adaptation section 144. Hence, by prohibiting the change of the notch frequency fn during the predetermined time after the notch frequency fn was set in the notch filter 13, the notch filter 143 of the notch frequency correction section 14 and the adaptation section 144, the correction of notch frequency fn can be carried out securely.

In the electric motor position control apparatus in accordance with Embodiment 6 of the present invention, the notch filter 13 for reducing the vibration component dx included in the detection speed ωm functions automatically as described above, whereby the vibration can be suppressed without measuring the frequency characteristics, such as the resonance frequency, of the control system of the electric motor 1 beforehand. As a result, the first control parameter adjustment section 8 can adjust the control parameters at high responsivity in consideration of the resonance of a controlled object.

Furthermore, in the electric motor position control apparatus in accordance with Embodiment 6, the detection speed ωm is input to the notch frequency correction section 14; however, even if the detection position θm and the torque command τ1* are input, a similar effect is obtained.

<<Embodiment 7>>

An electric motor position control apparatus in accordance with Embodiment 7 of the present invention will be described below by using FIGS. 26 to 28.

The system configuration of the electric motor position control apparatus in accordance with Embodiment 7 is the same as the system configuration in accordance with the above-mentioned Embodiment 1 shown in FIG. 1. In Embodiment 1, the configuration wherein the amplitude of the vibration component dx included in the detection speed ωm is measured at all times is explained; however, a configuration wherein the amplitude of the vibration component dx is not measured in a predetermined period may be used.

Explanation will be given below by using FIGS. 26, 27 and 28. In the explanation of Embodiment 7, components having the same configurations and functions as those of the components in accordance with the above-mentioned Embodiment 1 are designated by the same numerals and their explanations are omitted.

Figure 26:
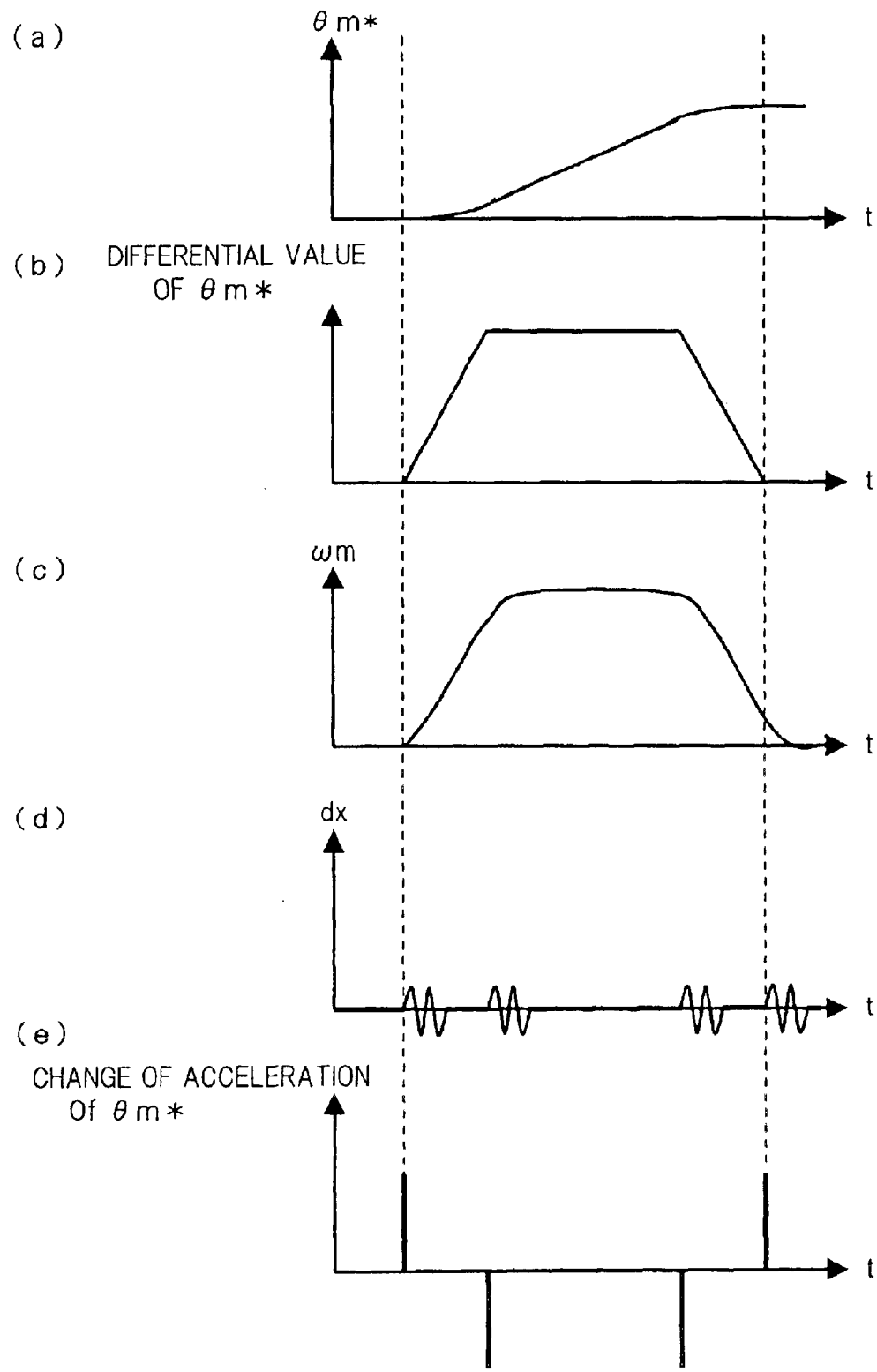
FIG. 26 is waveform diagrams showing first example of the time-related changes of a position command value, the differential value of the position command value, a detection speed, a vibration component and the acceleration of the position command value in accordance with Embodiment 7 of the present invention.

FIG. 26 is waveform diagrams showing first example of the time-related changes of (a) the position command value θm*, (b) the differential value of the position command value θm *, (c) the detection speed ωm, (d) the vibration component dx and (e) the acceleration of the position command value θm * in Embodiment 7. FIG. 27 is waveform diagrams showing second example of the time-related change of (a) the position command value θm *, (b) the differential value of the position command value θm *, (c) the detection speed ωm, (d) the vibration component dx and (e) the acceleration of the position command value θm * in Embodiment 7. FIG. 28 is waveform diagrams showing third example of the time-related change of (a) the position command value θm*, (b) the differential value of the position command value em*, (c) the detection speed ωm, (d) the vibration component dx and (e) the acceleration of the position command value θm* in Embodiment 7.

In the position command value θm* shown in the portion (a) of FIG. 26, when it is assumed that the electric motor to be controlled can have nearly followed the position command value θm*, the differential value of the position command value θm* shown in the portion (b) of FIG. 26 and the detection speed ωm shown in the portion (c) of FIG. 26 have almost the same waveform.

The result of passing the detection speed ωm through the high-pass filter in order to extract the vibration component dx of the detection speed ωm is the waveform of the vibration component dx shown in the portion (d) of FIG. 26. Although there is no vibration component in the portion (c) of FIG. 26, the vibration component dx is generated in the portion (d) of FIG. 26. This is because of the result of extracting harmonic components included at the change points of the acceleration of the detection speed ωm. In the case when the electric motor is controlled by the position command value θm* shown in the portion (a) of FIG. 26 so as to carry out the control parameter adjustment processing operation described in Embodiment 1, the vibration component dx included in the detection speed ωm is monitored at all times. For this reason, there is a possibility that the harmonic components included at the change points of the acceleration of the detection speed ωm, shown in the portion (d) of FIG. 26, are misjudged as vibration owing to oscillation.

As shown in tie portions (d) and (e) of FIG. 26, a predetermined period from the time when the change of the acceleration of the position command value θm* has a large value coincides with a period during which the vibration component dx has a large amplitude. Hence, by monitoring only the vibration component dx included in the detection speed ωm during the period excluding the predetermined period from the change point of the acceleration of the position command value θm*, misjudgment can be prevented.

Figure 27:
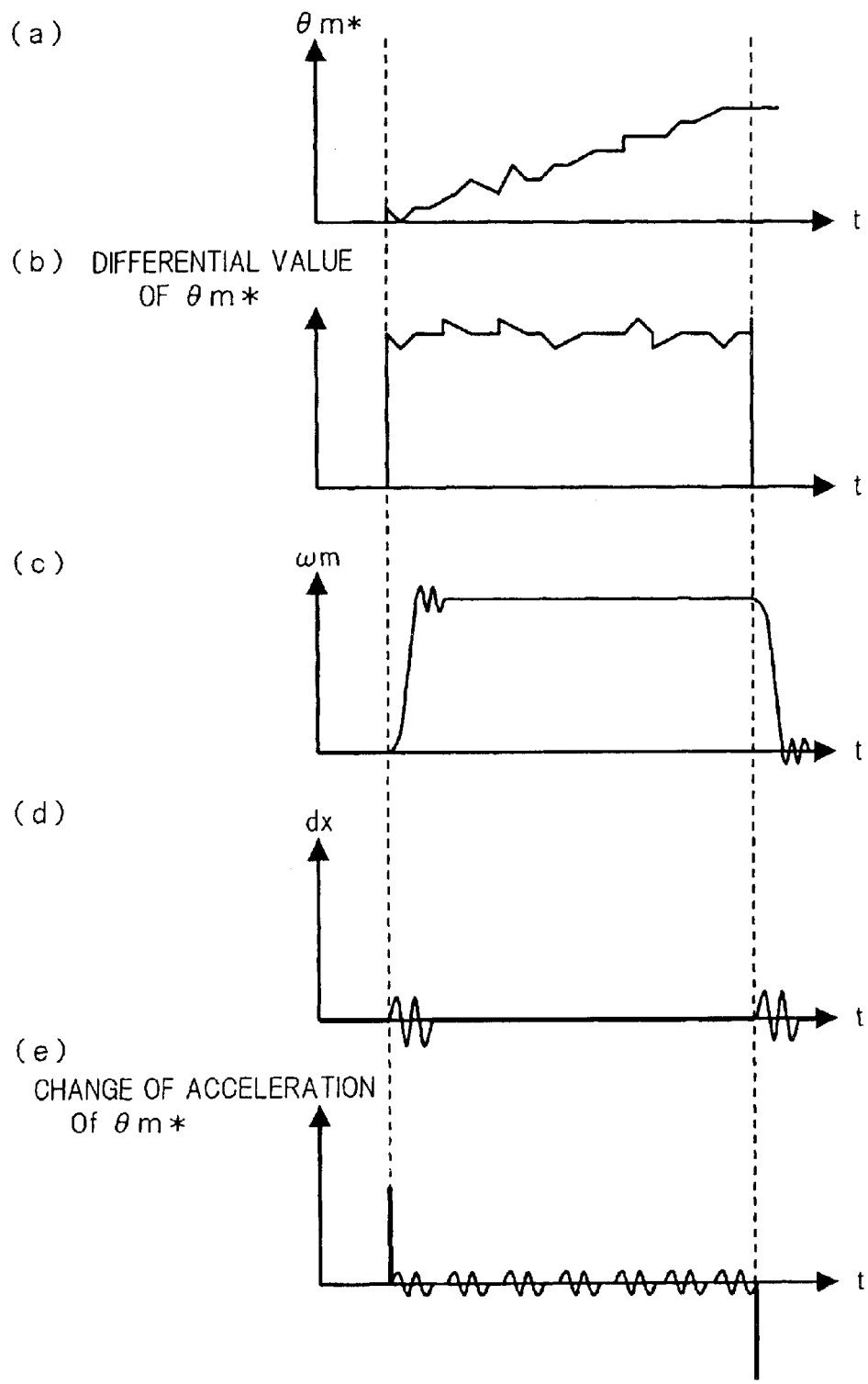
FIG. 27 is waveform diagrams showing second example of the time-related change of the position command value, the differential value of the position command value, the detection speed, the vibration component and the acceleration of the position command value in accordance with Embodiment 7 of the present invention.

Next, in the position command value θm* shown in the portion (a) of FIG. 27, a case is considered wherein the differential value of the position command value θm* has a square waveform and includes noise as shown in the portion (b) of FIG. 27.

When it is assumed that the electric motor 1 to be controlled can have nearly followed the position command value θm*, the differential value of the position command value θm* shown in the portion (b) of FIG. 27 and the detection speed ωm shown in the portion (c) of FIG. 27 have almost the same waveform. The result of passing the detection speed ωm through the high-pass filter in order to extract the vibration component dx of the detection speed ωm is shown in the portion (d) of FIG. 27. The portion (e) of FIG. 27 shows the change of the acceleration of the position command value θm*, obtained by calculation. Because the influence of the noise, it is difficult to have a correlation between the acceleration of the position command value θm* and the vibration component dx.

As understood from the portions (b) and (d) of FIG. 27, a predetermined period from the position command start time and the position command stop time coincides with a period during which the vibration component dx generates a large amplitude. In the case when the electric motor is controlled by the position command value θm* shown in the portion (a) of FIG. 27 so as to carry out the control parameter adjustment processing operation described in Embodiment 1, the vibration component dx included in the detection speed ωm is monitored at all times. For this reason, there is a possibility that the harmonic components included at the change points of the acceleration of the detection speed ωm, shown in the portion (d) of FIG. 27, are misjudged as vibration owing to oscillation. In this kind of case, by monitoring only the vibration component dx included in the detection speed ωm during the period excluding the predetermined period from the position command start time and the position command stop time, misjudgment can be prevented.

Figure 28:
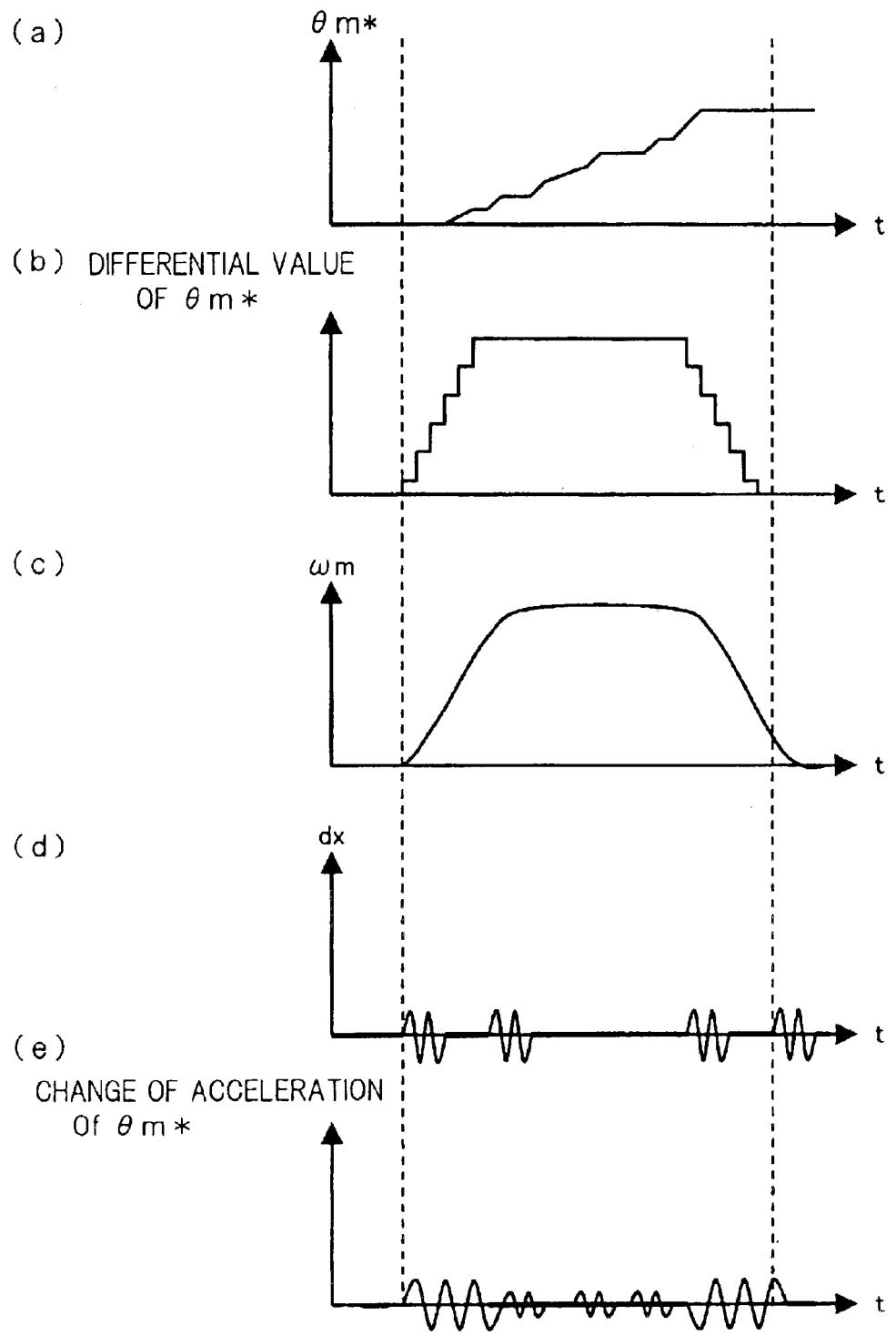
FIG. 28 is waveform diagrams showing third example of the time-related change of the position command value, the differential value of the position command value, the detection speed, the vibration component and the acceleration of the position command value in accordance with Embodiment 7 of the present invention.

Next, in the position command value θm* shown in the portion (a) of FIG. 28, a case is considered wherein the position command value θm* includes noise, just as in the case shown in the portion (a) of FIG. 26. When it is assumed that the electric motor to be controlled can have nearly followed the position command value θm*, the differential value of the position command value θm* shown in the portion (b) of FIG. 28 and the detection speed ωm shown in the portion (c) of FIG. 28 have almost the same waveform. The result of passing the detection speed ωm through the high-pass filter in order to extract the vibration component dx of the detection speed ωm is shown in the portion (d) of FIG. 28. The portion (e) of FIG. 28 shows the change of the acceleration of the position command value θm*, obtained by calculation. Because the influence of the noise, it is difficult to have a correlation between the change of the acceleration of the position command value θm* and the vibration component dx.

As understood from the waveform shown in the portion (d) of FIG. 28, in a predetermined period from the period having the position command and from the position command end time, the vibration component dx has a large amplitude. In the case when the electric motor is controlled by the position command value θm* shown in the portion (a) of FIG. 28 so as to carry out the control parameter adjustment processing operation described in Embodiment 1, the vibration component dx included in the detection speed θm is monitored at all times. For this reason, there is a possibility that the harmonic components included at the change points of the acceleration of the detection speed ωm, shown in the portion (d) of FIG. 28, are misjudged as vibration owing to oscillation. In this kind of case, by monitoring only the vibration component dx included in the detection speed ωm during the period excluding the predetermined period from the period having the position command period and from the position command end time, misjudgment can be prevented.

By selecting, on the basis of the command, the periods in which the vibration component is detected, misdetection of the vibration component is eliminated, whereby control parameter adjustment having excellent responsivity can be attained.

Furthermore, it is explained that the system configuration in accordance with Embodiment 7 is the same as the system configuration explained in Embodiment 1 and shown in FIG. 1; however, even if the system configuration in accordance with Embodiment 6 shown in FIG. 23 is used, a similar effect is obtained.

<<Embodiment 8>>

Figure 29:
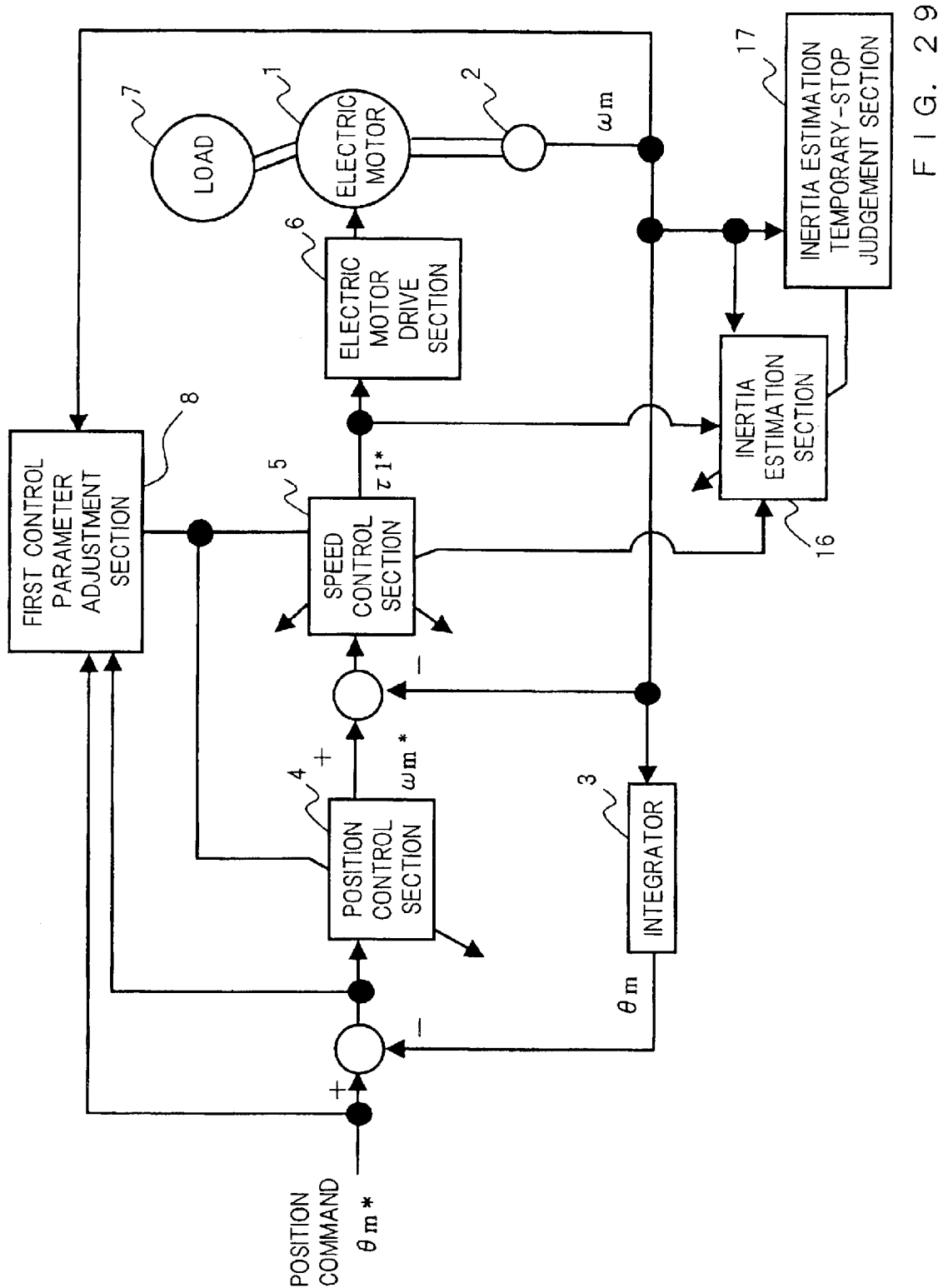
FIG. 29 is a block diagram showing the configuration of an electric motor position control apparatus in accordance with Embodiment 8 of the present invention.
Figure 30:
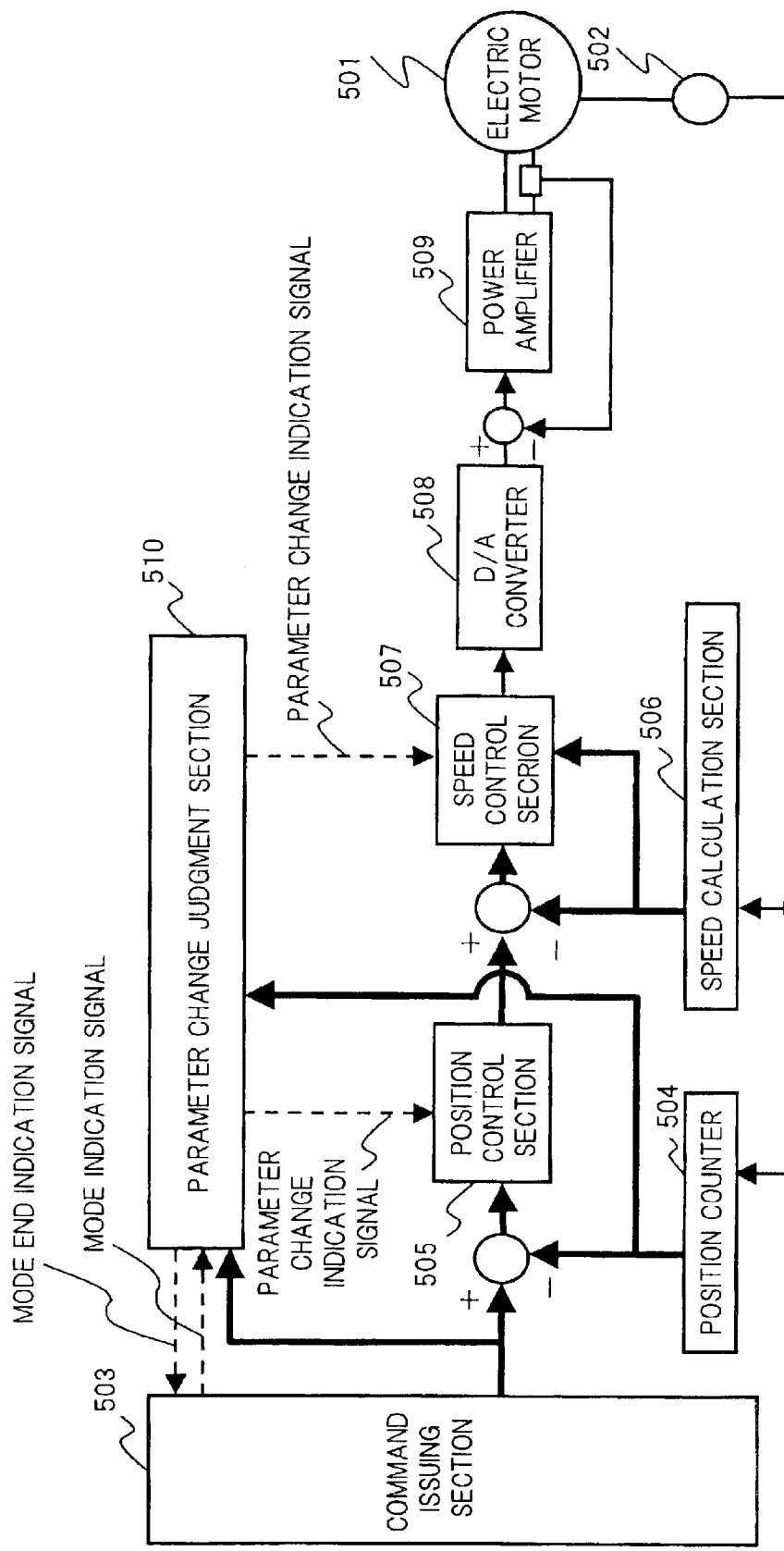
FIG. 30 is a block diagram showing the system configuration of the electric motor position control apparatus in accordance with the first prior art.
Figure 31:
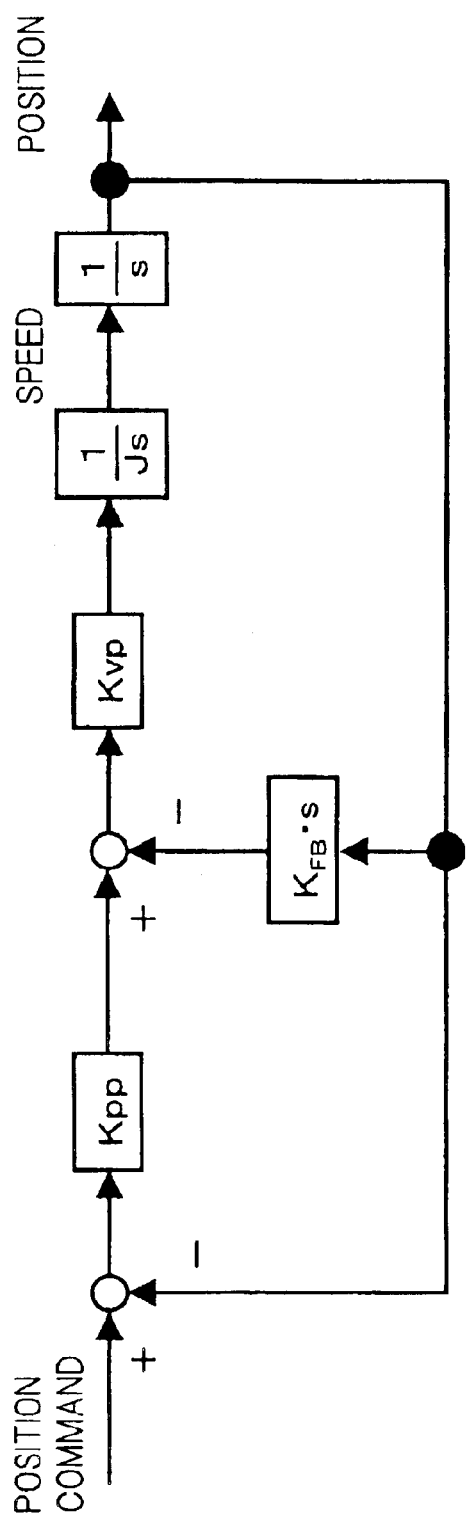
FIG. 31 is a diagram showing the control configuration of the electric motor position control apparatus in accordance with the first prior art at the time when the speed control section thereof carries out P-control.
Figure 32:
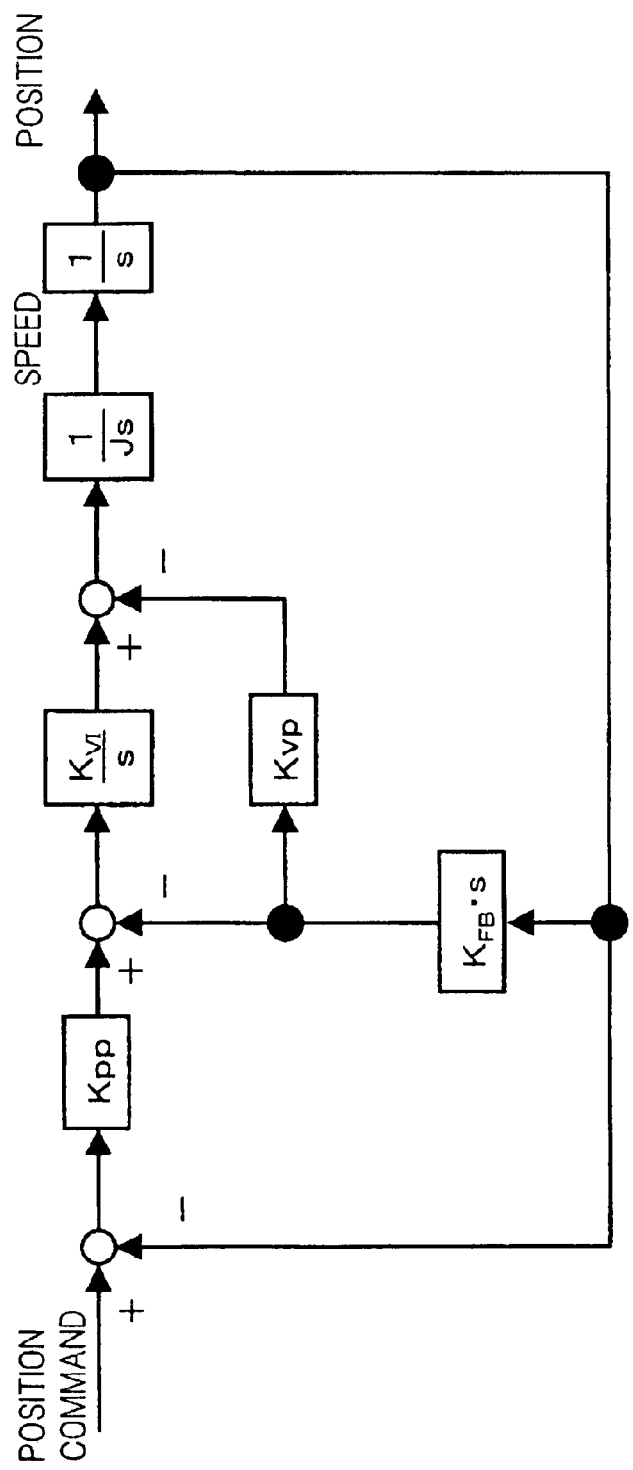
FIG. 32 is a block diagram showing the control configuration of the electric motor position control apparatus in accordance with the first prior art at the time when the integral gain of the speed control section is nonzero.
Figure 33:
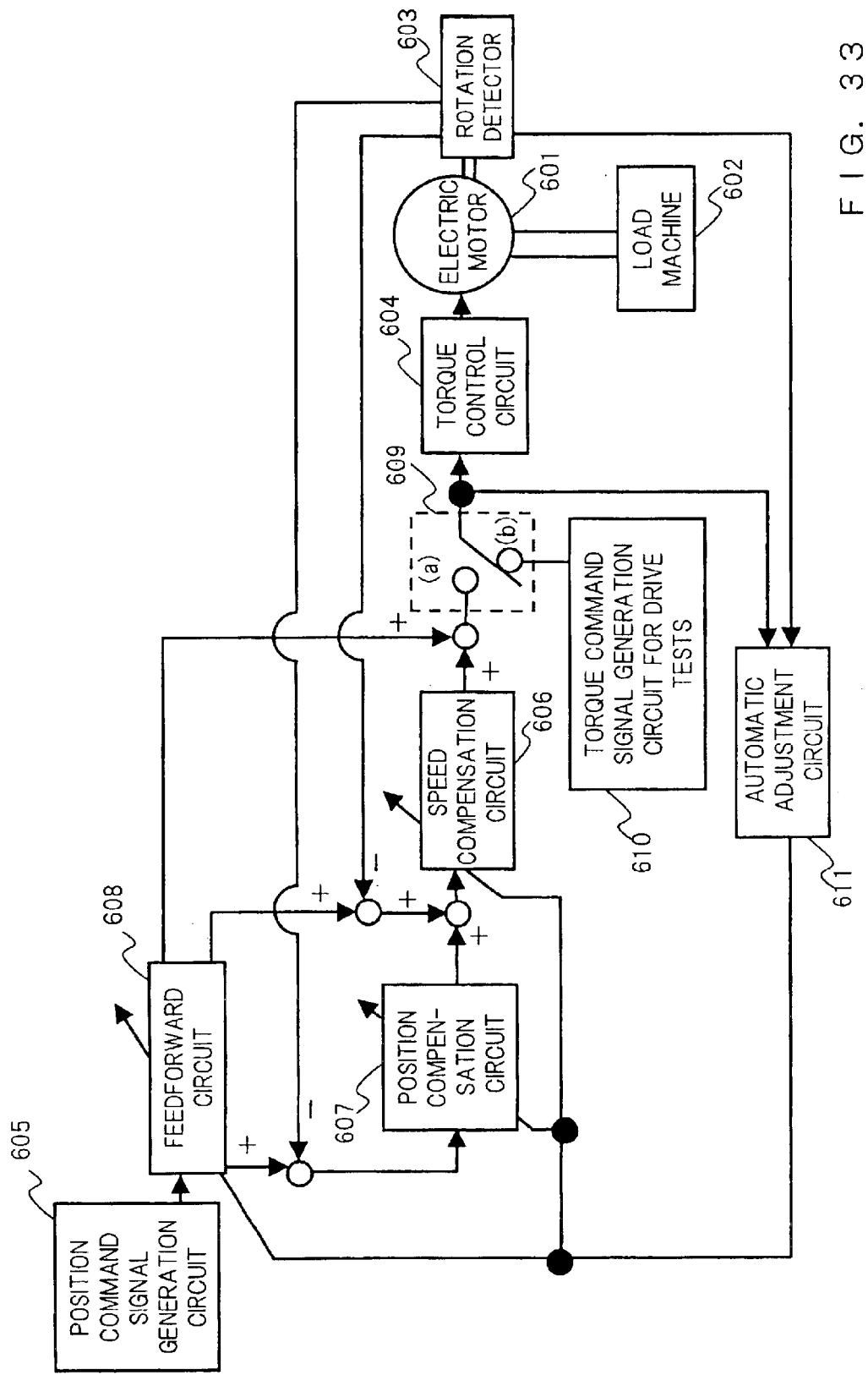
FIG. 33 is a block diagram showing the system configuration of the electric motor position control apparatus in accordance with the second prior art.

An electric motor position control apparatus in accordance with Embodiment 8 of the present invention will be described below by using FIG. 29. FIG. 29 is a block diagram showing the configuration of the control system of the electric motor position control apparatus in accordance with Embodiment 8 of the present invention. In the explanation of Embodiment 8, components having the same configurations and functions as those of the components in accordance with the above-mentioned Embodiment 1 are designated by the same numerals and their explanations are omitted. The configuration of the electric motor position control apparatus in accordance with Embodiment 8 is different from that of the above-mentioned Embodiment 1 in that an inertia estimation section 16 and an inertia estimation temporary-stop judgment section 17 are provided.

The operations of the inertia estimation section 16 and the inertia estimation temporary-stop judgment section 17 in accordance with Embodiment 8 will be described below.

The inertia estimation section 16 receives the detection speed cm and the torque command τ1* for controlling the electric motor 1 and estimates the total inertia of the electric motor 1 and the load 7 driven by the electric motor 1 by calculation. The total inertia estimated by calculation at the inertia estimation section 16 is input to the speed control section 5 and used to correct the control parameters of the speed control section 5.

The inertia estimation temporary-stop judgment section 17 receives the detection speed ωm and monitors the amplitude of the vibration component having a predetermined frequency or more and included in the detection speed ωm. When the inertia estimation temporary-stop judgment section 17 detects that the amplitude of the vibration component having a predetermined frequency or more has a predetermined value or more, it judges that the electric motor 1 is in a vibration state and stops the inertia estimation/calculation by the inertia estimation section 16 in a predetermined time. The vibration component having the predetermined frequency or more and included in the detection speed ωm is obtained by passing the detection speed ωm through a high-pass filter having the predetermined frequency as the cutoff frequency thereof, for example.

When it is assumed that the whole of the electric motor 1 and the load 7 driven by the electric motor 1 is formed of a rigid body, the relationship of the next equation (6) is established among the total inertia, applied torque i and detection speed ωm.

$$J = \tau/(\omega m)' \quad (6)$$

In the equation (6), J designates the total inertia of the electric motor 1 and the load 7 driven by the electric motor 1. In addition, (ωm)' is the differential value of the detection speed ωm, that is, an acceleration. Hence, the total inertia J can be calculated from the applied torque τ and the acceleration (ωm)'. By correcting the control parameters of the speed control section 5 by using the total inertia J calculated as described above, the response frequency can be maintained constant, and the relationship with the control parameters of the speed control section 5 can be maintained in a stable state.

In a vibration state, if its vibration frequency is not less than half the control period for speed detection, aliasing occurs; hence, the total inertia J cannot be calculated properly by using the equation (6). Therefore, if the control parameters of the speed control section 5 are corrected by using the value of the total inertia J calculated in the vibration state, the relationship with the control parameters of the position control section 4 becomes unstable, and vibration may not be suppressed in some cases.

In the electric motor position control apparatus in accordance with Embodiment 8, the inertia estimation temporary-stop judgment section 17 monitors the amplitude of the vibration component included in the detection speed ωm, and the state wherein this amplitude has a predetermined value or more is detected as a vibration state. In a predetermined time from the time when this vibration state is detected, the inertia estimation/calculation of the total inertia J by the inertia estimation section 16 is stopped. During the stop, the total inertia value immediately before the stop is held. In the case when the vibration state is not detected at the time when the predetermined time has passed, the inertia/calculation of the total inertia J by the inertia estimation section 16 is resumed.

By stopping the inertia estimation/calculation at the time when the vibration state is detected as described above, the electric motor position control apparatus in accordance with Embodiment 8 is configured so that the inertia estimation section 16 outputs only the correct inertia estimation/calculation value. Therefore, the electric motor position control apparatus in accordance with Embodiment 8 can maintain the relationship between the control parameters of the speed control section 5 and the control parameters of the position control section 4 in a stable state at all times.

In Embodiment 8, the electric motor position control apparatus having the system configuration shown in FIG. 29 has been explained as an example; however, even if the system configuration in accordance with Embodiment 6 shown in FIG. 23 is additionally provided with the inertia estimation section 16 and the inertia estimation temporary-stop judgment section 17, a similar effect is obtained.

In the position control apparatuses in accordance with Embodiments 1 to 8, a configuration wherein the detection speed ωm output from the speed detection section 2 is passed through the integrator 3 to obtain the detection position θm has been explained; however, the present invention is not limited to this kind of configuration; even if a configuration wherein a position detection section is provided instead of the speed detection section 2 and the detection speed ωm is obtained from the detection position θm output from this position detection section is used, effects similar to those of the above-mentioned respective embodiments are obtained.

In addition, in Embodiments 1 to 8, an example of a configuration has been explained wherein the first control parameter adjustment section 8, the second control parameter adjustment section 9, the third control parameter adjustment section 10 and the fourth control parameter adjustment section 12 have a plurality of sets of the proportional gain Kpp of the position control section 4 and the proportional gain Kvp and the integral time constant of the speed control section 5, shown in FIG. 5, and make adjustment so as to select one set of control parameters depending on the response state of the electric motor. However, the present invention is not limited to this kind of configuration; a set having any combination of parameters may be used, provided that the set includes the proportional gain Kpp of the position control section 4 and the proportional gain Kvp of the speed control section 5.

Furthermore, in Embodiments 1 to 8, a configuration has been explained wherein the first control parameter adjustment section 8, the second control parameter adjustment section 9, the third control parameter adjustment section 10 and the fourth control parameter adjustment section 12 adjust the proportional gain of the position control section 4 so as to set a control parameter when the detection speed ωm is smaller than the predetermined value ωm_th after step 4a, 4b or 4c. However, the present invention is not limited to this kind of configuration; even if a configuration wherein, when the detection speed ωm is smaller than the predetermined value ωm_th, both the proportional gain of the position control section 4 and the predetermined value ωm_th are changed and adjusted so as to set control parameters is used, effects similar to those of the above-mentioned respective embodiments are obtained.

Still further, in Embodiments 1 to 8, a configuration has been explained wherein the first control parameter adjustment section 8, the second control parameter adjustment section 9, the third control parameter adjustment section 10 and the fourth control parameter adjustment section 12 carry out processing from step 1a to step 6a, from step 1b to step 6b or from step 1c to step 6c. However, sufficient responsivity can be obtained even if the processing is carried out from step 1a to step 4a, from step 1b to step 4b or from step 1c to step 4c. Hence, a configuration wherein the first control parameter adjustment section 8, the second control parameter adjustment section 9, the third control parameter adjustment section 10 and the fourth control parameter adjustment section 12 carry out processing from step 1a to step 4a, from step 1b to step 4b or from step 1c to step 4c and stop the processing may be used.

Still further, the electric motor for use in Embodiments 1 to 8 is not limited to any specific kind; a DC motor and a permanent magnet synchronous motor may be used for example. In addition, the electric motor in accordance with the present invention is not limited to a rotary motor; a linear motor may be used.

Still further, in Embodiments 3 and 4, it has been explained that the processing from step 2c to step 6c carried out by the third step processing section 105, a component of the third control parameter adjustment section 10, is similar to the processing from step 2a to step 6a explained in Embodiment 1. However, even if the processing from step 2c to step 6c is made similar to the processing from step 2b to step 6b described in Embodiment 2, effects similar to those of Embodiments 3 and 4 are obtained.

Still further, in Embodiment 5, a configuration wherein the fourth step processing section 115, a component of the fourth control parameter adjustment section 12, carries out an operation similar to that of the first step processing section 85, a component of the first control parameter adjustment section 8 explained in Embodiment 1, is used. However, the present invention is not limited to this kind of configuration; a configuration wherein an operation similar to that of the first step processing section 95, a component of the second control parameter adjustment section 9 explained in Embodiment 2, is carried out, may be used.

Still further, in Embodiments 5 to 8, similar effects are obtained even if the first control parameter adjustment section 8 is replaced with the second control parameter adjustment section 9 explained in Embodiment 2.

Still further, in Embodiments 6 to 8, similar effects are obtained even if the first control parameter adjustment section 8 is replaced with one of the third control parameter adjustment section 10, the third control parameter adjustment section 10k and the fourth parameter adjustment section 12 explained in Embodiments 3 to 5.

As clarified by the above-mentioned detailed descriptions of the embodiments, the electric motor position control apparatus in accordance with the present invention has the following characteristics.

An electric motor position control apparatus in accordance with the present invention comprises:

a position/speed calculation section for calculating the speed of an electric motor from the detection position of the above-mentioned electric motor or for calculating the position of the above-mentioned electric motor from the detection speed of the above-mentioned electric motor, a position control section for making the above-mentioned detection position follow a position command value, a speed control section for making the above-mentioned detection speed follow a speed command value depending on the output of the above-mentioned position control section:

an electric motor drive section for driving the above-mentioned electric motor on the basis of a torque command value depending on the output of the above-mentioned speed control section, and a control parameter adjustment section having a plurality of sets of control parameters including at least the proportional gain of the above-mentioned position control section and the proportional gain of the above-mentioned speed control section, wherein set selection and the measurement operation of the response state of the above-mentioned electric motor to a position command at the time when the above-mentioned electric motor is controlled by using the control parameters of the selected set are carried out sequentially, and the control parameters of one set are set depending on the result of the measured response. The electric motor position control apparatus in accordance with the present invention configured as described above can change the control parameters as a set, whereby the number of adjustment times can be reduced and the control parameters can be adjusted in a short time.

In addition, the control parameter adjustment section in the electric motor position control apparatus in accordance with the present invention is configured so that:

when set selection and the measurement operation of the response state of the above-mentioned electric motor by controlling the above-mentioned electric motor by using the control parameters of the selected set are carried out sequentially, among the detection of a vibration component having a predetermined frequency or more and included in the detection position or the detection speed of the above-mentioned electric motor, the detection of a vibration component having a predetermined frequency or more and included in a torque command input to the above-mentioned electric motor drive section and the detection of the error between the position command value and the detection position after the end of the position command, the measurement operation including at least one vibration component detection is carried out sequentially from a set having a low proportional gain of the above-mentioned speed control section to a set having a higher proportional gain thereof; and in the response result measured until it is detected that the period in which the amplitude of the above-mentioned vibration component has a first predetermined value or more is a first predetermined time or more, in the period from the start of a position command to the start of the next command, (1) condition (1) wherein the period in which the amplitude of the above-mentioned vibration component has the above-mentioned first predetermined value or more is less than the above-mentioned first predetermined time, in the period from the start of a position command to the start of the next command;

(2) condition (2) wherein the period in which the amplitude of the above-mentioned vibration component has the above-mentioned first predetermined value or more is less than a second predetermined time shorter than the above-mentioned first predetermined time, in the period from the start of a position command to the start of the next command; and (3) condition (3) wherein the number of times the error between the position command value and the detection position intersects a preset positioning tolerance is less than a predetermined first number of times, in the period from the end time of a position command to the start of the next command;

one of sets satisfying one or more of the above-mentioned three conditions, including at least the condition (1), is selected, and the control parameters of the selected set are set. In the electric motor position control apparatus in accordance with the present invention configured as described above, the measurement of the response state is stopped at the time when vibration continuation is detected, whereby the number of adjustment times can be reduced and the control parameters can be adjusted in a short time.

Furthermore, the control parameter adjustment section in the electric motor position control apparatus in accordance with the present invention is configured so that:

when set selection and the measurement operation of the response state of the above-mentioned electric motor by controlling the above-mentioned electric motor by using the control parameters of the selected set are carried out sequentially, among the detection of a vibration component having a predetermined frequency or more and included in the detection position or the detection speed of the above-mentioned electric motor, the detection of a vibration component having a predetermined frequency or more and included in a torque command input to the above-mentioned electric motor drive section and the detection of the error between the position command value and the detection position after the end of the position command, the measurement operation including at least one vibration component detection is is carried out sequentially; and in the set selection, (A) first selection: in the case when it is detected that the period in which the amplitude of the vibration component has a first predetermined value or more is a first predetermined time or more, in the period from the start of a position command to the start of the next command, among the sets wherein the response states have already been measured and it is not detected that the time in which the amplitude of the vibration component has the above-mentioned first predetermined value or more is the above-mentioned first predetermined time or more, a set having the highest proportional gain of the speed control section is selected next; or in the case when the proportional gain of the speed control section corresponding to the above-mentioned condition does not exist, a set having the proportional gain of the speed control section, the value of which is between the lowest proportional gain of the speed control section in all the sets and the proportional gain of the speed control section having been set at present, is selected next;

(B) second selection: in the case when it is not detected that the period in which the amplitude of the vibration component has the above-mentioned first predetermined value or more is the above-mentioned first predetermined time or more, in the period from the start of a position command to the start of the next command, among the sets wherein the response states have already been measured and it is detected that the period in which the amplitude of the vibration component has the above-mentioned first predetermined value or more is the above-mentioned first predetermined time or more, a set having the lowest proportional gain of the speed control section is selected next; or in the case when the proportional gain of the speed control section corresponding to the above-mentioned condition does not exist, a set having the proportional gain of the speed control section, the value of which is between the highest proportional gain of the speed control section in all the sets and the proportional gain of the speed control section having been set at present, is selected next; the two selections are repeated;

in the above-mentioned selections, when no set is available as a set to be selected next, in the measured response result, (1) condition (1) wherein the period in which the amplitude of the above-mentioned vibration component has the above-mentioned first predetermined value or more is less than the above-mentioned first predetermined time, in the period from the start of a position command to the start of the next command;

(2) condition (2) wherein the period in which the amplitude of the above-mentioned vibration component has the above-mentioned first predetermined value or more is less than a second predetermined time shorter than the above-mentioned first predetermined time, in the period from the start of a position command to the start of the next command; and (3) condition (3) wherein the number of times the error between the position command value and the detection position intersects a preset positioning tolerance is less than a predetermined first number of times, in the period from the end time of a position command to the start of the next command;

one of sets satisfying one or more of the above-mentioned three conditions, including at least the condition (1), is selected, and the control parameters of the selected set are set. In the electric motor position control apparatus in accordance with the present invention configured as described above; at the time when no set is available as a set to be selected next after the set selection is repeated, one preferable set is selected on the basis of the result of the response obtained up to that time, and the control parameters of the selected set are set, whereby adjustment to preferable control parameters can be attained in a short time.

Still further, the control parameter adjustment section in the electric motor position control apparatus in accordance with the present invention is configured to select first a start set designated externally. In the electric motor position control apparatus in accordance with the present invention configured as described above, any given start set can be designated, whereby the number of adjustment times can be reduced and the control parameters can be adjusted in a short time.

Still further, the electric motor position control apparatus in accordance with the present invention is configured so as to be provided with a load configuration pattern input section having a plurality of load configuration patterns related to a start set, one of the above-mentioned plurality of load configuration patterns being designated externally, and wherein the above-mentioned control parameter adjustment section is configured so as to first select the start set related to the load configuration pattern input from the above-mentioned load configuration pattern input section. In the electric motor position control apparatus in accordance with the present invention configured as described above, the start set best suited for the load configuration pattern input has been determined whereby the number of adjustment times can be reduced and the control parameters can be adjusted in a short time.

Still further, the control parameter adjustment section in the electric motor position control apparatus in accordance with the present invention is configured so that, when it is detected that the period in which the amplitude of a vibration component has the above-mentioned first predetermined value or more is the above-mentioned first predetermined time or more, in the period from the start of a position command to the start of the next command, the control parameters of a set, having the proportional gain of the speed control section lower than the proportional gain of the present speed control section, are set immediately, the above-mentioned electric motor is controlled a second predetermined number of times, and then the next set is selected. In the electric motor position control apparatus in accordance with the present invention configured as described above, even in the case when vibration occurs during the control parameter adjustment, the vibration can be dampened securely in a short time, and the control parameter adjustment can be adjusted safely.

Still further, the control parameter adjustment section in the electric motor position control apparatus in accordance with the present invention is configured so as to have a plurality of sets of control parameters including the proportional gain of the position control section and the proportional gain of the speed control section on the basis of at least one of the above-mentioned position command value, the above-mentioned speed command value, the above-mentioned detection position and the above-mentioned detection speed, wherein set selection and the measurement operation of the response state of an electric motor to a position command at the time when the above-mentioned electric motor is controlled by using the control parameters of the selected set are carried out sequentially, one set of control parameters is selected depending on the measured response state, and the control parameters of the selected set are set. In the electric motor position control apparatus in accordance with the present invention configured as described above, the control parameters are adjusted on the basis of at least one of the position command value, the speed command value, the detection position and the detection speed, whereby the control parameters can be adjusted so that control having excellent responsivity for the position command can be attained.

Still further, an electric motor position control apparatus in accordance with the present invention comprises:

a position/speed calculation section for calculating the speed of an electric motor from the detection position of the above-mentioned electric motor or for calculating the position of the above-mentioned electric motor from the detection speed of the above-mentioned electric motor, a position control section for making the above-mentioned detection position follow a position command value, a speed control section for making the above-mentioned detection speed follow a speed command value depending on the output of the above-mentioned position control section:

an electric motor drive section for driving the above-mentioned electric motor on the basis of a torque command value depending on the output of the above-mentioned speed control section, and a control parameter adjustment section having a plurality of sets of control parameters including at least the proportional gain of the above-mentioned position control section and the proportional gain of the above-mentioned speed control section, wherein the above-mentioned control parameter adjustment section is configured so that:

when set selection and the measurement operation of the response state of the above-mentioned electric motor by controlling the above-mentioned electric motor by using the control parameters of the selected set are carried out sequentially, among the detection of a vibration component having a predetermined frequency or more and included in the detection position or the detection speed of the above-mentioned electric motor, the detection of a vibration component having a predetermined frequency or more and included in a torque command input to the above-mentioned electric motor drive section and the detection of the error between the position command value and the detection position after the end of the position command, the measurement operation including at least one vibration component detection is carried out sequentially; and in the measured result, (1) condition (1) wherein the period in which the amplitude of the vibration component has the above-mentioned first predetermined value or more is less than the first predetermined time, in the period from the start of a position command to the start of the next command;

(2) condition (2) wherein the period in which the amplitude of the above-mentioned vibration component has the first predetermined value or more is less than a second predetermined time shorter than the above-mentioned first predetermined time, in the period from the start of a position command to the start of the next command; and (3) condition (3) wherein the number of times the error between the position command value and the detection position intersects a preset positioning tolerance is less than a predetermined first number of times, in the period from the end time of a position command to the start of the next command;

one of sets satisfying one or more of the above-mentioned three conditions, including at least the condition (1), is selected; when it is detected that the period in which the amplitude of the above-mentioned vibration component has the above-mentioned first predetermined value or more is the above-mentioned first predetermined time or more, in the period from the start of a position command to the start of the next command, while the above-mentioned electric motor is controlled a third predetermined number of times from the time when the control parameters of the selected set are set, among the sets satisfying one or more of the above-mentioned three conditions, including at least the condition (1) and excluding the present set, a set having the highest proportional gain of the above-mentioned speed control section is selected newly, and the control parameters of the newly selected set are set. In the electric motor position control apparatus in accordance with the present invention configured as described above, after the control parameters of the selected set are set, the electric motor is controlled a predetermined number of times thereby to make a reconfirmation as to whether vibration occurs or not, whereby stable control parameters can be set securely.

An electric motor position control apparatus in accordance with another aspect of the present invention comprises:

a position/speed calculation section for calculating the speed of an electric motor from the detection position of the above-mentioned electric motor or for calculating the position of the above-mentioned electric motor from the detection speed of the above-mentioned electric motor, a position control section for making the above-mentioned detection position follow a position command value, a speed control section for making the above-mentioned detection speed follow a speed command value depending on the output of the above-mentioned position control section:

an electric motor drive section for driving the above-mentioned electric motor on the basis of a torque command value depending on the output of the above-mentioned speed control section, and a control parameter adjustment section having a plurality of sets of control parameters including at least the proportional gain of the above-mentioned position control section and the proportional gain of the above-mentioned speed control section, wherein the above-mentioned control parameter adjustment section is configured so that:

when set selection and the measurement operation of the response state of the above-mentioned electric motor by controlling the above-mentioned electric motor by using the control parameters of the selected set are carried out sequentially, among the detection of a vibration component having a predetermined frequency or more and included in the detection position or the detection speed of the above-mentioned electric motor, the detection of a vibration component having a predetermined frequency or more and included in a torque command input to the above-mentioned electric motor drive section and the detection of the error between the position command value and the detection position after the end of the position command, the measurement operation including at least one vibration component detection is carried out sequentially; and in the measured response result, (1) condition (1) wherein the period in which the amplitude of the above-mentioned vibration component has the above-mentioned first predetermined value or more is less than the first predetermined time, in the period from the start of a position command to the start of the next command;

(2) condition (2) wherein the period in which the amplitude of the above-mentioned vibration component has the above-mentioned first predetermined value or more is less than a second predetermined time shorter than the above-mentioned first predetermined time, in the period from the start of a position command to the start of the next command; and (3) condition (3) wherein the number of times the error between the position command value and the detection position intersects a preset positioning tolerance is less than a predetermined first number of times, in the period from the end time of a position command to the start of the next command;

one of sets satisfying one or more of the above-mentioned three conditions, including at least the condition (1), is selected, and the control parameters of the selected set are set, next, at least the proportional gain of the above-mentioned speed control section among the control parameters having been set at present is fixed, and the remaining control parameters are changed, whereby the parameters other than the fixed parameter are set depending on the response state of the above-mentioned electric motor to the position command at the time when the above-mentioned electric motor is controlled. In the electric motor position control apparatus in accordance with the present invention configured as described above, the apparatus is configured so that, after the control parameters are adjusted as a set, the control parameters are adjusted individually, whereby adjustment having high responsivity can be attained.

Still further, an electric motor position control apparatus in accordance with another aspect of the present invention comprises:

a position/speed calculation section for calculating the speed of an electric motor from the detection position of the above-mentioned electric motor or for calculating the position of the above-mentioned electric motor from the detection speed of the above-mentioned electric motor, a position control section for making the above-mentioned detection position follow a position command value, a speed control section for making the above-mentioned detection speed follow a speed command value depending on the output of the above-mentioned position control section:

an electric motor drive section for driving the above-mentioned electric motor on the basis of a torque command value depending on the output of the above-mentioned speed control section, and a control parameter adjustment section wherein a target value of a time until the error between the above-mentioned detection position and the above-mentioned position command value enters a preset positioning tolerance after the end of a position command is set externally, wherein the above-mentioned control parameter adjustment section is configured so that, in set selection and the measurement operation of the response state of the above-mentioned electric motor by using the control parameters of the selected set, when the time until the error between the above-mentioned detection position and the above-mentioned position command value enters the positioning tolerance after the end of the position command becomes not more than the above-mentioned target value having been set externally, the set selection is stopped, and the control parameters at that time are set. In the electric motor position control apparatus in accordance with the present invention configured as described above, the adjustment of the control parameters is stopped at the time when the target index input externally is satisfied in the adjustment process of the control parameters, and the control parameters obtained at that time are set as the result of the adjustment, whereby the control parameters can be adjusted in a short time.

Still further, an electric motor position control apparatus in accordance with the present invention is provided with:

a notch filter disposed in a position control system or a speed control system and having a variable notch center frequency, and a notch frequency correction section for sequentially correcting the notch frequency of the above-mentioned notch filter to reduce frequency components having a predetermined frequency or more and included in the above-mentioned detection position or the above-mentioned detection speed or to reduce frequency components having a predetermined frequency or more and included in a torque command to be input to the above-mentioned electric motor drive section. In the electric motor position control apparatus in accordance with the present invention configured as: described above, a notch filter for suppressing oscillation owing to the resonance frequency of a controlled object is generated automatically, whereby control parameter adjustment having high responsivity can be attained without measuring the frequency response of the controlled object.

Still further, an electric motor position control apparatus in accordance with the present invention is provided with:

a notch filter disposed in a position control system or a speed control system and having a variable notch center frequency, a notch frequency correction section for sequentially correcting the notch frequency of the above-mentioned notch filter to reduce frequency components having a predetermined frequency or more and included in the above-mentioned detection position or the above-mentioned detection speed or to reduce frequency components having a predetermined frequency or more and included in a torque command to be input to the electric motor drive section, and a notch frequency storage section that, when a selected set is changed, stores the above-mentioned set immediately before the change and the notch frequency immediately before the change so as to be related to each other, and that, when a newly selected set is the same as a set selected in the past, resets the notch frequency stored so as to be related to the above-mentioned set selected in the past as the notch frequency of the above-mentioned notch filter. In the electric motor position control apparatus in accordance with the present invention configured as described above, even in the case when the notch frequency of the notch filter is changed owing to vibration or the like during control parameter adjustment, it can be returned to the notch frequency obtained at the time when control is carried out by using the set selected in the past.

Still further, an electric motor position control apparatus in accordance with the present invention is provided with:

a notch filter disposed in a position control system or a speed control system and having a variable notch frequency, a notch frequency correction section for sequentially correcting the notch frequency of the above-mentioned notch filter to reduce frequency components having a predetermined frequency or more and included in the above-mentioned detection position or the above-mentioned detection speed or to reduce frequency components having a predetermined frequency or more and included in a torque command to be input to the above-mentioned electric motor drive section, and a notch frequency storage section that, when a selected set is changed, stores the set immediately before the change and the notch frequency immediately before the change so as to be related to each other, and that, when a newly selected set is the same as a set selected in the past, resets the notch frequency stored so as to be related to the above-mentioned set selected in the past as the notch frequency of the above-mentioned notch filter, and then prohibits the change of the notch frequency of the above-mentioned notch filter in a fourth predetermined time. In the electric motor position control apparatus in accordance with the present invention configured as described above, after the notch frequency of the notch filter is returned to the notch frequency obtained at the time when control is carried out by using the set selected in the past, the notch frequency can be prevented from being changed by vibration in the middle of vibration dampening, whereby the notch frequency can be returned securely.

Still further, the control parameter adjustment section of an electric motor position control apparatus in accordance with the present invention is configured to detect a vibration component having a predetermined frequency or more and included in the detection position or the detection speed of the electric motor or to detect a frequency component having a predetermined frequency or more and included in a torque command to be input to the electric motor drive section. In the electric motor position control apparatus in accordance with the present invention configured as described above, incorrect detection of the frequency component having a predetermined frequency or more and included in the detection position or the detection speed is prevented, whereby control parameter adjustment having high responsivity can be attained.

Still further, an electric motor position control apparatus in accordance with another aspect of the present invention comprises:

a position/speed calculation section for calculating the speed of an electric motor from the detection position of the above-mentioned electric motor or for calculating the position of the above-mentioned electric motor from the detection speed of the above-mentioned electric motor, a position control section for making the above-mentioned detection position follow a position command value, a speed control section for making the above-mentioned detection speed follow a speed command value depending on the output of the above-mentioned position control section:

an electric motor drive section for driving the above-mentioned electric motor on the basis of a torque command value depending on the output of the above-mentioned speed control section, an inertia estimation section for estimating the total inertia of the above-mentioned electric motor and a load driven by the above-mentioned electric motor on the basis of the acceleration calculated from the above-mentioned detection speed and the above-mentioned torque command value, an inertia estimation temporary-stop judgment section for stopping the inertia estimation/calculation of the above-mentioned inertia estimation section in a predetermined time since when it is detected that the amplitude of a vibration component having a predetermined frequency or more and included in the detection position or the detection speed of the above-mentioned electric motor or the amplitude of a vibration component having a predetermined frequency or more and included in the torque command to be input to the electric motor drive section has a predetermined value or more, and a control parameter adjustment section having a plurality of sets of control parameters including at least the proportional gain of the above-mentioned position control section and the proportional gain of the above-mentioned speed control section, wherein a set is selected and the response state of the above-mentioned electric motor to a position command at the time when the above-mentioned electric motor is controlled by using the control parameters of the selected set, and the control parameters of one set are set depending on this response state. In the electric motor position control apparatus in accordance with the present invention configured as described above, when it is detected that the amplitude of a vibration component having a predetermined frequency or more and included in the detection position has a predetermined value or more, the inertia estimation operation is stopped temporarily, whereby the inertia estimation operation can be stabilized, and control parameter adjustment having stability can be attained.

Although the present invention has been described with respect to its preferred embodiments in some detail, the disclosed contents of the preferred embodiments may change in the details of the structure thereof, and may changes in the combination and sequence of the components may be attained without departing from the scope and spirit of the claimed invention.

What is claimed is:

1. An electric motor position control apparatus comprising:

a position/speed calculation section for calculating speed of an electric motor from a detection position of said electric motor or for calculating a position of said electric motor from a detection speed of said electric motor, a position control section for making said detection position follow a position command value, a speed control section for making said detection speed follow a speed command value depending on the output of said position control section:

an electric motor drive section for driving said electric motor on the basis of a torque command value depending on the output of said speed control section, and a control parameter adjustment section having a plurality of sets of control parameters including at least the proportional gain of said position control section and the proportional gain of said speed control section, wherein set selection and the measurement operation of the response state of said electric motor to a position command at the time when said electric motor is controlled by using the control parameters of the selected set are carried out sequentially, and the control parameters of one set are set depending on the result of the measured response, wherein said control parameter adjustment section is configured so that:

when set selection and the measurement operation of the response state of said electric motor by controlling said electric motor by using the control parameters of the selected set are carried out sequentially, among the detection of a vibration component having a predetermined frequency or more and included in the detection position or the detection speed of said electric motor, the detection of a vibration component having a predetermined frequency or more and included in a torque command input to said electric motor drive section and the detection of the error between the position command value and the detection position after the end of the position command, the measurement operation including at least one vibration component detection is carried out sequentially from a set having a low proportional gain of said speed control section to a set having a higher proportional gain thereof; and in the measured response result, (1) condition (1) wherein the period in which the amplitude of said vibration component has first predetermined value or more is less than said first predetermined time, in the period from the start of a position command to the start of the next command;

(2) condition (2) wherein the period in which the amplitude of said vibration component has said first predetermined value or more is less than a second predetermined time shorter than said first predetermined time, in the period from the start of a position command to the start of the next command; and (3) condition (3) wherein the number of times the error between the position command value and the detection position intersects a preset positioning tolerance is less than a predetermined first number of times, in the period from the end time of a position command to the start of the next command;

one of sets satisfying one or more of said three conditions, including at least the condition (1), is selected, and the control parameters of the selected set are set.

2. An electric motor position control apparatus comprising:

a position/speed calculation section for calculating speed of an electric motor from a detection position of said electric motor or for calculating a position of said electric motor from a detection speed of said electric motor, a position control section for making said detection position follow a position command value, a speed control section for making said detection speed follow a speed command value depending on the output of said position control section:

an electric motor drive section for driving said electric motor on the basis of a torque command value depending on the output of said speed control section, and a control parameter adjustment section having a plurality of sets of control parameters including at least the proportional gain of said position control section and the proportional gain of said speed control section, wherein set selection and the measurement operation of the response state of said electric motor to a position command at the time when said electric motor is controlled by using the control parameters of the selected set are carried out sequentially, and the control parameters of one set are set depending on the result of the measured response, wherein said control parameter adjustment section is configured so that:

when set selection and the measurement operation of the response state of said electric motor by controlling said electric motor by using the control parameters of the selected set are carried out sequentially, among the detection of a vibration component having a predetermined frequency or more and included in the detection position or the detection speed of said electric motor, the detection of a vibration component having a predetermined frequency or more and included in a torque command input to said electric motor drive section and the detection of the error between the position command value and the detection position after the end of the position command, the measurement operation including at least one vibration component detection is carried out sequentially from a set having a low proportional gain of said speed control section to a set having a higher proportional gain thereof; and in the response result measured until it is detected that the period in which the amplitude of said vibration component has a first predetermined value or more is a first predetermined time or more, in the period from the start of a position command to the start of the next command, (1) condition (1) wherein the period in which the amplitude of said vibration component has said first predetermined value or more is less than said first predetermined time, in the period from the start of a position command to the start of the next command;

(2) condition (2) wherein the period in which the amplitude of said vibration components has said first predetermined value or more is less than a second predetermined time shorter than said first predetermined time, in the period from the start of a position command to the start of the next command; and (3) condition (3) wherein the number of times the error between the position command value and the detection position intersects a preset positioning tolerance is less than a predetermined first number of times, in the period from the end time of a position command to the start of the next command;

one of sets satisfying one or more of said three conditions, including at least the condition (1), is selected, and the control parameters of the selected set are set.

3. An electric motor position control apparatus comprising:

a position/speed calculation section for calculating speed of an electric motor from a detection position of said electric motor or for calculating a position of said electric motor from a detection speed of said electric motor, a position control section for making said detection position follow a position command value, a speed control section for making said detection speed follow a speed command value depending on the output of said position control section:

an electric motor drive section for driving said electric motor on the basis of a torque command value depending on the output of said speed control section, and a control parameter adjustment section having a plurality of sets of control parameters including at least the proportional gain of said position control section and the proportional gain of said speed control section, wherein set selection and the measurement operation of the response state of said electric motor to a position command at the time when said electric motor is controlled by using the control parameters of the selected set are carried out sequentially, and the control parameters of one set are set depending on the result of the measured response, wherein said control parameter adjustment section is configured so that:

when set selection and the measurement operation of the response state of said electric motor by controlling said electric motor by using the control parameters of the selected set are carried out sequentially, among the detection of a vibration component having a predetermined frequency or more and included in the detection position or the detection speed of said electric motor, the detection of a vibration component having a predetermined frequency or more and included in a torque command input to said electric motor drive section and the detection of the error between the position command value and the detection position after the end of the position command, the measurement operation including at least one vibration component detection is carried out sequentially; and in the set selection, (A) first selection: in the case when it is detected that the period in which the amplitude of the vibration component has a first predetermined value or more is a first predetermined time or more, in the period from the start of a position command to the start of the next command, among the sets wherein the response states have already been measured and it is not detected that the time in which the amplitude of the vibration component has said first predetermined value or more is said first predetermined time or more, a set having the highest proportional gain of said speed control section is selected next; or in the case when the proportional gain of said speed control section corresponding to said condition does not exist, a set having the proportional gain of said speed control section, the value of which is between the lowest proportional gain of said speed control section in all the sets and the proportional gain of said speed control section having been set at present, is selected next;

(B) second selection: in the case when it is not detected that the period in which the amplitude of the vibration component has said first predetermined value or more is said first predetermined time or more, in the period from the start of a position command to the start of the next command, among the sets wherein the response states have already been measured and it is detected that the period in which the amplitude of the vibration component has said first predetermined value or more is said first predetermined time or more, a set having the lowest proportional gain of said speed control section is selected next; or in the case when the proportional gain of said speed control section corresponding to said condition does not exist, a set having the proportional gain of said speed control section, the value of which is between the highest proportional gain of said speed control section in all the sets and the proportional gain of said speed control section having been set at present, is selected next; the two selections are repeated;

in said selections, when no set is available as a set to be selected next, in the measured response result, (1) condition (1) wherein the period in which the amplitude of said vibration component has said first predetermined value or more is less than said first predetermined time, in the period from the start of a position command to the start of the next command;

(2) condition (2) wherein the period in which the amplitude of said vibration component has said first predetermined value or more is less than a second predetermined time shorter than said first predetermined time, in the period from the start of a position command to the start of the next command; and (3) condition (3) wherein the number of times the error between the position command value and the detection position intersects a preset positioning tolerance is less than a predetermined first number of times, in the period from the end time of a position command to the start of the next command;

one of sets satisfying one or more of said three conditions, including at least the condition (1), is selected, and the control parameters of the selected set are set.

4. An electric motor position control apparatus in accordance with any one of claims 1 to 3, wherein said control parameter adjustment section is configured to select first a start set designated externally.

5. An electric motor position control apparatus in accordance with any one of claims 1 to 3, further comprising a load configuration pattern input section having a plurality of load configuration patterns related to a start set, one of said plurality of load configuration patterns being designated externally, wherein said control parameter adjustment section is configured so as to first select the start set related to the load configuration pattern input from said load configuration pattern input section.

6. An electric motor position control apparatus in accordance with any one of claims 1 to 3 wherein said control parameter adjustment section sequentially carries out set selection and the measurement operation of the response state of said electric motor to a position command at the time when said electric motor is controlled by using the control parameters of the selected set, among sets satisfying one or more of said three conditions, including at least the condition (1), a set having the highest proportional gain of said speed control section is selected, and the control parameters of the selected set are set.

7. An electric motor position control apparatus in accordance with any one of claims 1 to 3, wherein said control parameter adjustment section is configured so that, when it is detected that the period in which the amplitude of a vibration component has said first predetermined value or more is said first predetermined time or more, in the period from the start of a position command to the start of the next command, the control parameter of a set, having the proportional gain of said speed control section lower than the proportional gain of the present speed control section, is set immediately, said electric motor is controlled a second predetermined number of times, and then the next set is selected.

8. An electric motor position control apparatus in accordance with any one of claims 1 to 3, wherein said control parameter adjustment section is configured so as to have a plurality of sets of control parameters including the proportional gain of said position control section and the proportional gain of said speed control section on the basis of at least one of said position command value, said speed command value, said detection position and said detection speed, wherein set selection and the measurement operation of the response state of an electric motor to a position command at the time when said electric motor is controlled by using the control parameters of the selected set are carried out sequentially, one set of control parameters is selected depending on the measured response state, and the control parameters of the selected set are set.

9. An electric motor position control apparatus in accordance with any one of claims 1 to 3, wherein said control parameter adjustment section has a plurality of sets of control parameters including at least the proportional gain of said speed control section, the proportional gain of said position control section at the time after the end of said position command and when the detection speed of said electric motor is larger than a second predetermined value and the proportional gain of said position control section at the time after the end of said position command and when the detection speed of said electric motor is not more than said second predetermined value.

10. An electric motor position control apparatus in accordance with any one of claims 1 to 3, wherein said control parameter adjustment section has a plurality of sets of control parameters including at least the proportional gain of said speed control section, the proportional gain of said position control section at the time after the end of said position command and when the detection speed of said electric motor is larger than a second predetermined value and the proportional gain of said position control section at the time after the end of said position command and when the detection speed of said electric motor is not more than said second predetermined value, in the switching of the proportional gain of said position control section at the time after the end of said position command and when the detection speed of said electric motor is not more than said second predetermined value, in the case when the proportional gain of said position control section at the time after the end of said position command and when the detection speed of said electric motor is larger than said second predetermined value is larger than the proportional gain of said position control section at the time after the end of said position command and when the detection speed of said electric motor is not more than said second predetermined value, the switching is done gradually over a predetermined time after the end of said position command and since when the detection speed of said electric motor is not more than said second predetermined value.

11. An electric motor position control apparatus in accordance with any one of claims 1 to 3, wherein said control parameter adjustment section has a function of setting the control parameters of the present set and controlling said electric motor a third predetermined number of times and then setting the control parameters of a set selected next, and said control parameter adjustment section is configured so as to detect condition (2) and condition (3) of said three conditions only after control is carried out a fourth predetermined number of times smaller than said third predetermined number of times after the control parameters of the selected set are set.

12. An electric motor position control apparatus in accordance with any one of claims 1 to 3, comprising:

a notch filter disposed in a position control system or a speed control system and having a variable notch center frequency, and a notch frequency correction section for sequentially correcting the notch frequency of said notch filter to reduce frequency components having a predetermined frequency or more and included in said detection position or said detection speed or to reduce frequency components having a predetermined frequency or more and included in a torque command to be input to said electric motor drive section.

13. An electric motor position control apparatus in accordance with any one of claims 1 to 3, comprising:
a notch filter disposed in a position control system or a speed control system and having a variable notch center frequency,
a notch frequency correction section for sequentially correcting the notch frequency of said notch filter to reduce frequency components having a predetermined frequency or more and included in said detection position or said detection speed or to reduce frequency components having a predetermined frequency or more and included in a torque command to be input to said electric motor drive section, and
a notch frequency storage section that, when a selected set is changed, stores said set immediately before the change and the notch frequency immediately before the change so as to be related to each other, and that, when a newly selected set is the same as a set selected in the past, resets the notch frequency stored so as to be related to said set selected in the past as the notch frequency of said notch filter.

14. An electric motor position control apparatus in accordance with any one of claims 1 to 3, comprising:
a notch filter disposed in a position control system or a speed control system and having a variable notch frequency,
a notch frequency correction section for sequentially correcting the notch frequency of said notch filter to reduce frequency components having a predetermined frequency or more and included in said detection position or said detection speed or to reduce frequency components having a predetermined frequency or more and included in a torque command to be input to said electric motor drive section, and
a notch frequency storage section that, when a selected set is changed, stores the set immediately before the change and the notch frequency immediately before the change so as to be related to each other, and that, when a newly selected set is the same as a set selected in the past, resets the notch frequency stored so as to be related to said set selected in the past as the notch frequency of said notch filter, and then prohibits the change of the notch frequency of said notch filter in a fourth predetermined time.

15. An electric motor position control apparatus in accordance with any one of claims 1 to 3, wherein
said control parameter adjustment section is configured to detect a vibration component having a predetermined frequency or more and included in the detection position or the detection speed of said electric motor or to detect a frequency component having a predetermined frequency or more and included in a torque command to be input to said electric motor drive section.

16. An electric motor position control apparatus in accordance with any one of claims 1 to 3, wherein the period in which said position command satisfies predetermined conditions is a period excluding the period of a predetermined time from the time when the change of the acceleration of said position command has a predetermined value or more.

17. An electric motor position control apparatus in accordance with any one of claims 1 to 3, wherein the period in which said position command satisfies said predetermined conditions is:
(1) a period until a predetermined time elapses from the time when the time-related change of said position command was made from zero to nonzero, and
(2) a period excluding the period until the predetermined time elapses from the time when the time-related change of said position command was made from nonzero to zero.

18. An electric motor position control apparatus in accordance with any one of claims 1 to 3, the period in which said position command satisfies said predetermined conditions is:
(1) a period in which the time-related change of said position command is nonzero, and
(2) a period excluding the period until the predetermined time elapses from the time when the time-related change of said position command was made from nonzero to zero.

19. An electric motor position control apparatus comprising:
a position/speed calculation section for calculating speed of an electric motor from a detection position of said electric motor or for calculating a position of said electric motor from a detection speed of said electric motor,
a position control section for making said detection position follow a position command value,
a speed control section for making said detection speed follow a speed command value depending on the output of said position control section:
an electric motor drive section for driving said electric motor on the basis of a torque command value depending on the output of said speed control section, and
a control parameter adjustment section having a plurality of sets of control parameters including at least the proportional gain of said position control section and the proportional gain of said speed control section, wherein
said control parameter adjustment section is configured so that:
when set selection and the measurement operation of the response state of said electric motor by controlling said electric motor by using the control parameters of the selected set are carried out sequentially, among the detection of a vibration component having a predetermined frequency or more and included in the detection position or the detection speed of said electric motor, the detection of a vibration component having a predetermined frequency or more and included in a torque command input to said electric motor drive section and the detection of the error between the position command value and the detection position after the end of the position command, the measurement operation including at least one vibration component detection is carried out sequentially; and in the measured response result,
(1) condition (1) wherein the period in which the amplitude of said vibration component has said first predetermined value or more is less than said first predetermined time, in the period from the start of a position command to the start of the next command;
(2) condition (2) wherein the period in which the amplitude of said vibration component has said first predetermined value or more is less than a second predetermined time shorter than said first predetermined time, in the period from the start of a position command to the start of the next command; and (3) condition (3) wherein the number of times the error between the position command value and the detection position intersects a preset positioning tolerance is less than a predetermined first number of times, in the period from the end time of a position command to the start of the next command;

one of sets satisfying one or more of said three conditions, including at least the condition (1), is selected; when it is detected that the period in which the amplitude of said vibration component has said first predetermined value or more is said first predetermined time or more, in the period from the start of a position command to the start of the next command, while said electric motor is controlled a third predetermined number of times from the time when the control parameters of the selected set are set, among the sets satisfying one or more of said three conditions, including at least the condition (1) and excluding the present set, a set having the highest proportional gain of said speed control section is selected newly, and the control parameters of the newly selected set are set.

20. An electric motor position control apparatus comprising:

a position/speed calculation section for calculating speed of an electric motor from a detection position of said electric motor or for calculating a position of said electric motor from a detection speed of said electric motor, a position control section for making said detection position follow a position command value, a speed control section for making said detection speed follow a speed command value depending on the output of said position control section:

an electric motor drive section for driving said electric motor on the basis of a torque command value depending on the output of said speed control section, and a control parameter adjustment section having a plurality of sets of control parameters including at least the proportional gain of said position control section and the proportional gain of said speed control section, wherein said control parameter adjustment section is configured so that:

when set selection and the measurement operation of the response state of said electric motor by controlling said electric motor by using the control parameters of the selected set are carried out sequentially, among the detection of a vibration component having a predetermined frequency or more and included in the detection position or the detection speed of said electric motor, the detection of a vibration component having a predetermined frequency or more and included in a torque command input to said electric motor drive section and the detection of the error between the position command value and the detection position after the end of the position command, the measurement operation including at least one vibration component detection is carried out sequentially; and in the measured response result, (1) condition (1) wherein the period in which the amplitude of said vibration component has first predetermined value or more is less than the first predetermined Lime, in the period from the start of a position command to the start of the next command;

(2) condition (2) wherein the period in which the amplitude of said vibration component has said first predetermined value or more is less than a second predetermined time shorter than said first predetermined time, in the period from the start of a position command to the start of the next command; and (3) condition (3) wherein the number of times the error between the position command value and the detection position intersects a preset positioning tolerance is less than a predetermined first number of times, in the period from the end time of a position command to the start of the next command;

one of sets satisfying one or more of said three conditions, including at least the condition (1), is selected, and the control parameters of the selected set are set, next, at least the proportional gain of said speed control section among the control parameters having been set at present is fixed, and the remaining control parameters are changed, whereby the parameters other than the fixed parameter are set depending on the response state of said electric motor to the position command at the time when said electric motor is controlled.

21. An electric motor position control apparatus in accordance with claim 20 wherein said control parameter adjustment section has a plurality of sets of control parameters including at least the proportional gain of said position control section, the proportional gain of said position control section at the time after the end of said position command and when the detection speed of said electric motor is larger than a second predetermined value and the proportional gain of said position control section at the time after the end of said position command and when the detection speed of said electric motor is not more than said second predetermined value, and said control parameter adjustment section is configured so that:

when set selection and the measurement operation of the response state of said electric motor by controlling said electric motor by using the control parameters of the selected set are carried out sequentially, among the detection of a vibration component having a predetermined frequency or more and included in the detection position or the detection speed of said electric motor, the detection of a vibration component having a predetermined frequency or more and included in a torque command input to said electric motor drive section and the detection of the error between the position command value and the detection position after the end of the position command, the measurement operation including at least one vibration component detection is carried out sequentially; in the measured response result, (1) condition (1) wherein the period in which the amplitude of said vibration component has first predetermined value or more is less than said first predetermined time, in the period from the start of said position command to the start of the next command;

(2) condition (2) wherein the period in which the amplitude of said vibration component has said first predetermined value or more is less than a second predetermined time shorter than said first predetermined time, in the period from the start of said position command to the start of the next command; and (3) condition (3) wherein the number of times the error between said position command value and said detection position intersects a preset positioning tolerance is less than a predetermined number of times, after the end time of said position command, one of sets satisfying one or more of said three conditions, including at least the condition (1), is selected, and the control parameters of the selected set are set, next, among the control parameters having been set at present, only the proportional gain of said position control section at the time after the end of said position command and when the detection speed of said electric motor is not more than said second predetermined value is changed in a predetermined range, and the response state at the time when said electric motor is controlled is measured; in the measured response result, the proportional gain of said position control section satisfying condition (2) and condition (3) among said three conditions and making the time until the error between said detection position and said position command value enters a preset positioning tolerance after the end of said position command shortest is set.

22. An electric motor position control apparatus in accordance with claim 20, wherein said control parameter adjustment section has a plurality of sets of control parameters including at least the proportional gain of said position control section, the proportional gain of said position control section at the time after the end of said position command and when the detection speed of said electric motor is larger than a predetermined value and the proportional gain of said position control section at the time after the end of said position command and when the detection speed of said electric motor is not more than a second predetermined value, and said control parameter adjustment section is configured so that:

when set selection and the measurement operation of the response state of said electric motor by controlling said electric motor by using the control parameters of the selected set are carried out sequentially, among the detection of a vibration component having a predetermined frequency or more and included in the detection position or the detection speed of said electric motor, the detection of a vibration component having a predetermined frequency or more and included in a torque command input to said electric motor drive section and the detection of the error between the position command value and the detection position after the end of the position command, the measurement operation including at least one vibration component detection is carried out sequentially; in the measured response result, (1) condition (1) wherein the period in which the amplitude of said vibration component has first predetermined value or more is less than said first predetermined time, in the period from the start of said position command to the start of the next command;

(2) condition (2) wherein the period in which the amplitude of said vibration component has said first predetermined value or more is less than a second predetermined time shorter than said first predetermined time, in the period from the start of said position command to the start of the next command; and (3) condition (3) wherein the number of times the error between said position command value and said detection position intersects a preset positioning tolerance is less than a predetermined number of times, after the end time of said position command, one of sets satisfying one or more of said three conditions, including at least the condition (1), is selected, and the control parameters of the selected set are set, next, among the control parameters having been set at present, only the proportional gain of said position control section at the time after the end of said position command and when the detection speed of said electric motor is not more than said second predetermined value is changed in increasing order thereof in a predetermined range, and the response state at the time when said electric motor is controlled is measured, at the time after the end of said position command and when the number of times the error between said detection position and said position command value intersects a preset positioning tolerance is not less than a predetermined number of times, the change of said proportional gain of said position control section is stopped, at the time of stop, the proportional gain of said position control section satisfying condition (2) and condition (3) among said three conditions and making the time until the error between said detection position and said position command value enters a preset positioning tolerance after the end of said position command shortest is set.

23. An electric motor position control apparatus in accordance with claim 20, wherein said control parameter adjustment section has a plurality of sets of control parameters including at least the proportional gain of said position control section, the proportional gain of said position control section at the time after the end of said position command and when the detection speed of said electric motor is larger than a second predetermined value and the proportional gain of said position control section at the time after the end of said position command and when the detection speed of said electric motor is not more than said second predetermined value, and said control parameter adjustment section is configured so that:

when set selection and the measurement operation of the response state of said electric motor by controlling said electric motor by using the control parameters of the selected set are carried out sequentially, among the detection of a vibration component having a predetermined frequency or more and included in the detection position or the detection speed of said electric motor, the detection of a vibration component having a predetermined frequency or more and included in a torque command input to said electric motor drive section and the detection of the error between the position command value and the detection position after the end of the position command, the measurement operation including at least one vibration component detection is carried out sequentially; in the measured response result, (1) condition (1) wherein the period in which the amplitude of said vibration component has first predetermined value or more is less than said first predetermined time, in the period from the start of said position command to the start of the next command;

(2) condition (2) wherein the period in which the amplitude of said vibration component has said first predetermined value or more is less than a second predetermined time shorter than said first predetermined time, in the period from the start of said position command to the start of the next command; and (3) condition (3) wherein the number of times the error between said position command value and said detection position intersects a preset positioning tolerance is less than a predetermined number of times, after the end time of said position command, one of sets satisfying one or more of said three conditions, including at least the condition (1), is selected, and the control parameters of the selected set are set, next, the proportional gain of said position control section at the time after the end of said position command and when the detection speed of said electric motor is not more than said second predetermined value and the predetermined value of said detection speed for determining the proportional gain of said position control section are used as variables and changed in respectively different predetermined ranges, and the response state at the time when said electric motor is controlled is measured; in the measured response result, the proportional gain of said position control section satisfying condition (2) and condition (3) among said three conditions and making the time until the error between said detection position and said position command value enters a preset positioning tolerance after the end of said position command shortest and the predetermined value of said detection speed for determining the proportional gain of said position control section are set.

24. An electric motor position control apparatus in accordance with any one of claims 19 to 23, wherein said control parameter adjustment section has a function of setting the control parameters of the present set and controlling said electric motor a third predetermined number of times and then setting the control parameters of a set selected next, and said control parameter adjustment section is configured so as to detect condition (2) and condition (3) of said three conditions only after control is carried out a fourth predetermined number of times smaller than said third predetermined number of times after the control parameters of the selected set are set.

25. An electric motor position control apparatus in accordance with any one of claims 19 to 23, comprising:

a notch filter disposed in a position control system or a speed control system and having a variable notch center frequency, a notch frequency correction section for sequentially correcting the notch frequency of said notch filter to reduce frequency components having a predetermined frequency or more and included in said detection position or said detection speed or to reduce frequency components having a predetermined frequency or more and included in a torque command to be input to said electric motor drive section, and a notch frequency storage section that, when a selected set is changed, stores the set immediately before the change and the notch frequency immediately before the change so as to be related to each other, and that, when a newly selected set is the same as a set selected in the past, resets the notch frequency stored so as to be related to said set selected in the past as the notch frequency of said notch filter.

26. An electric motor position control apparatus in accordance with any one of claims 19 to 23 comprising:

a notch filter disposed in a position control system or a speed control system and having a variable notch frequency, a notch frequency correction section for sequentially correcting the notch frequency of said notch filter to reduce frequency components having a predetermined frequency or more and included in said detection position or said detection speed or to reduce frequency components having a predetermined frequency or more and included in a torque command to be input to said electric motor drive section, and a notch frequency storage section that, when a selected set is changed, stores the set immediately before the change and the notch frequency immediately before the change so as to be related to each other, and that, when a newly selected set is the same as a set selected in the past, resets the notch frequency stored so as to be related to said set selected in the past as the notch frequency of said notch filter, and then prohibits the change of the notch frequency of said notch filter in a fourth predetermined time.

27. An electric motor position control apparatus in accordance with any one of claims 19 to 23, wherein said control parameter adjustment section is configured to detect a vibration component having a predetermined frequency or more and included in the detection position or the detection speed of said electric motor or to detect a frequency component having a predetermined frequency or more and included in a torque command to be input to said electric motor drive section.

28. An electric motor position control apparatus in accordance with any one of claims 19 to 23, wherein the period in which said position command satisfies predetermined conditions is a period excluding the period of a predetermined time from the time when the change of the acceleration of said position command has a predetermined value or more.

29. An electric motor position control apparatus in accordance with any one of claims 19 to 23, wherein the period in which said position command satisfies said predetermined conditions is:

(1) a period until a predetermined time elapses from the time when the time-related change of said position command was made from zero to nonzero, and (2) a period excluding the period until the predetermined time elapses from the time when the time-related change of said position command was made from nonzero to zero.

30. An electric motor position control apparatus in accordance with any one of claims 19 to 23, wherein the period in which said position command satisfies said predetermined conditions is:

(1) a period in which the time-related change of said position command is nonzero, and (2) a period excluding the period until the predetermined time elapses from the time when the time-related change of said position command was made from nonzero to zero.

31. An electric motor position control apparatus comprising:

a position/speed calculation section for calculating the speed of an electric motor from the detection position of said electric motor or for calculating the position of said electric motor from the detection speed of said electric motor, a position control section for making said detection position follow a position command value, a speed control section for making said detection speed follow a speed command value depending on the output of said position control section:

an electric motor drive section for driving said electric motor on the basis of a torque command value depending on the output of said speed control section, an inertia estimation section for estimating the total inertia of said electric motor and a load driven by said electric motor on the basis of the acceleration calculated from said detection speed and said torque command value, an inertia estimation temporary-stop judgment section for stopping the inertia estimation/calculation of said inertia estimation section for a predetermined time since when it is detected that the amplitude of a vibration component having a predetermined frequency or more and included in the detection position or the detection speed of said electric motor or the amplitude of a vibration component having a predetermined frequency or more and included in the torque command to be input to the electric motor drive section has a predetermined value or more, and a control parameter adjustment section having a plurality of sets of control parameters including at least the proportional gain of said position control section and the proportional gain of said speed control section, wherein a set is selected and the response state of said electric motor to a position command at the time when said electric motor is controlled by using the control parameters of the selected set, and the control parameters of one set are set depending on this response state.

* * * * *

UNITED STATES PATENT AND TRADEMARK OFFICE
CERTIFICATE OF CORRECTION

PATENT NO. : 6,844,693 B2
DATED : January 18, 2005
INVENTOR(S) : Toru Tazawa et al.

It is certified that error appears in the above-identified patent and that said Letters Patent is hereby corrected as shown below:

Title page,
Item [56], References Cited, FOREIGN PATENT DOCUMENTS,
the last reference should read -- JP   2003- 204689  7/2003 --;

Column 46,
Line 13, after "claims 1 to 3", insert -- wherein --;

Column 48,
Line 2, "Lime" should read -- time --.

Signed and Sealed this

Seventh Day of June, 2005

JON W. DUDAS
*Director of the United States Patent and Trademark Office*